US008984125B2

(12) United States Patent
Kanemasa et al.

(10) Patent No.: US 8,984,125 B2
(45) Date of Patent: Mar. 17, 2015

(54) COMPUTER PROGRAM, METHOD, AND INFORMATION PROCESSING APPARATUS FOR ANALYZING PERFORMANCE OF COMPUTER SYSTEM

(75) Inventors: Yasuhiko Kanemasa, Kawasaki (JP); Calton Pu, Atlanta, GA (US); Qingyang Wang, Atlanta, GA (US)

(73) Assignees: Fujitsu Limited, Kawasaki (JP); The Georgia Tech Research Corporation, Atlanta, GA (US)

(*) Notice: Subject to any disclaimer, the term of this patent is extended or adjusted under 35 U.S.C. 154(b) by 197 days.

(21) Appl. No.: 13/587,544

(22) Filed: Aug. 16, 2012

(65) Prior Publication Data

US 2014/0052841 A1   Feb. 20, 2014

(51) Int. Cl.
| | | |
|---|---|---|
| *G06F 15/16* | (2006.01) | |
| *G06F 15/173* | (2006.01) | |
| *H04L 29/08* | (2006.01) | |
| *G06F 11/34* | (2006.01) | |
| *G06F 9/50* | (2006.01) | |

(52) U.S. Cl.
CPC ........ *H04L 67/1029* (2013.01); *H04L 67/1002* (2013.01); *G06F 11/34* (2013.01); *G06F 11/3419* (2013.01); *G06F 11/3433* (2013.01); *G06F 9/5083* (2013.01)
USPC ............ 709/224; 709/201; 709/223; 709/226

(58) Field of Classification Search
CPC . G06F 11/34; G06F 11/3419; G06F 11/3433; G06F 9/5083; H04L 67/1029; H04L 67/1002
USPC ................... 709/201, 223–224, 226
See application file for complete search history.

(56) References Cited

U.S. PATENT DOCUMENTS

| | | | | |
|---|---|---|---|---|
| 4,403,286 A | * | 9/1983 | Fry et al. ................ | 718/105 |
| 4,495,562 A | * | 1/1985 | Yamaji et al. ............ | 718/105 |
| 5,812,780 A | * | 9/1998 | Chen et al. .............. | 709/224 |
| 5,875,464 A | * | 2/1999 | Kirk ...................... | 711/129 |
| 6,601,084 B1 | * | 7/2003 | Bhaskaran et al. ....... | 718/105 |

(Continued)

FOREIGN PATENT DOCUMENTS

JP    2004-302547    10/2004

OTHER PUBLICATIONS

"White Paper—Fujitsu Primergy Server—Basics of Disk I/O Performance", Fujitsu Technology Solutions, Version 1.0, May 9, 2011 (pp. 1-15).

(Continued)

*Primary Examiner* — Patrice Winder
*Assistant Examiner* — Angela Widhalm
(74) *Attorney, Agent, or Firm* — Staas & Halsey LLP

(57) ABSTRACT

In an information processing apparatus, a comparing unit determines whether the response time of each transaction falls within an acceptable time range that is specified previously. For each time window, a first calculation unit calculates a load of processes executed in parallel by the servers in a specified tier, based on transaction data of individual transactions. Further, a second calculation unit calculates a total progress quantity in each time window, based on the transaction data of transactions whose respective response times are determined to fall within the acceptable time range. A determination unit determines a specific load value as a threshold at which the total progress quantity begins to decrease in spite of an increase of the load.

8 Claims, 34 Drawing Sheets

(56) References Cited

U.S. PATENT DOCUMENTS

| | | | |
|---|---|---|---|
| 6,725,343 B2* | 4/2004 | Barroso et al. | 711/145 |
| 7,376,459 B2* | 5/2008 | Rosenfeld | 600/544 |
| 7,496,653 B2* | 2/2009 | Bournas | 709/223 |
| 7,657,501 B1* | 2/2010 | Brown et al. | 707/999.002 |
| 7,827,361 B1* | 11/2010 | Karlsson et al. | 711/147 |
| 8,006,230 B2* | 8/2011 | Agarwal et al. | 717/120 |
| 8,087,029 B1* | 12/2011 | Lindholm et al. | 718/105 |
| 8,185,912 B1* | 5/2012 | Leonard | 719/314 |
| 8,296,424 B2* | 10/2012 | Malloy et al. | 709/224 |
| 8,341,014 B2* | 12/2012 | Bobak et al. | 705/7.12 |
| 8,539,404 B2* | 9/2013 | Craig et al. | 716/106 |
| 2005/0096877 A1 | 5/2005 | Shimazaki et al. | |
| 2005/0256971 A1 | 11/2005 | Colrain et al. | |
| 2007/0143460 A1* | 6/2007 | Ben-David et al. | 709/223 |
| 2008/0016508 A1* | 1/2008 | Goto et al. | 718/102 |
| 2008/0209445 A1* | 8/2008 | Iyengar et al. | 719/320 |
| 2008/0222472 A1* | 9/2008 | Grise et al. | 714/738 |
| 2009/0178047 A1* | 7/2009 | Astley et al. | 718/104 |
| 2010/0005468 A1 | 1/2010 | Chang et al. | |
| 2010/0250642 A1* | 9/2010 | Yellin et al. | 709/201 |
| 2011/0093253 A1* | 4/2011 | Kraft et al. | 703/21 |
| 2011/0161980 A1* | 6/2011 | English et al. | 718/105 |
| 2014/0058763 A1* | 2/2014 | Zizzamia et al. | 705/4 |

OTHER PUBLICATIONS

Cao et al., "Web server performance modeling using an M/G/K*PS. queue", *Telecommunications*, 2003, ICT 2003, 10$^{th}$ International Conference (vol. 2), pp. 1501-1506 with abstract page.

Extended European Search Report dated Feb. 18, 2014 in Appln. No. 12188994.3 (7 pp).

Patent Abstracts of Japan, Publication No. 2004-302547, Published Oct. 28, 2004.

* cited by examiner

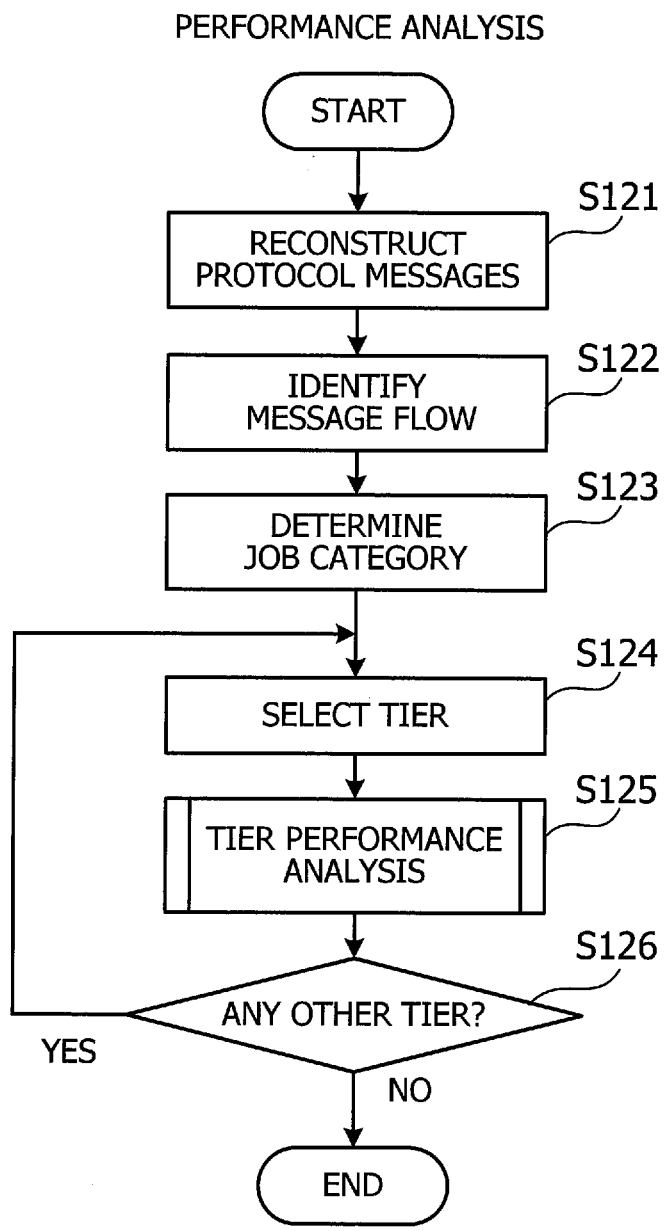

FIG. 8

122 MESSAGE DATA STORAGE UNIT

| # | 122a | 122b | 122c | 122d | 122e | 122f | 122g |
|---|---|---|---|---|---|---|---|
| 1 | 2009/09/07 | 12:12:04.787360 | (132290-1) | 194.185.39.24:51272 -> 194.23.5.226:10443 | | Request HTTP, POST /cgi-bin/AXXPF3943? type=0016&_zid=AXXG131308&_sid=LigkVcFasr8A&_uid=1192 | |
| 2 | 2009/09/07 | 12:12:04.871576 | (132291) | 194.23.6.227:39931 -> 194.23.7.168:8002 | | TCP Connect | |
| 3 | 2009/09/07 | 12:12:04.872326 | (132291) | 194.23.6.230:39372 <-194.23.7.168:8002 | | TCP Close request_size=488 reply_size=528 | |
| 4 | 2009/09/07 | 12:12:04.872575 | (132291-28991) | 194.23.6.227:39931 -> 194.23.7.168:8002 | | Request IIOP,AXXG13130/INF/H01 | |
| 5 | 2009/09/07 | 12:12:04.882010 | (131268-307) | 194.23.8.169:52245 -> 194.23.8.198:1521 | | Request Oracle,select1 into :b0 from DUAL | |
| 6 | 2009/09/07 | 12:12:04.882560 | (131268-307) | 194.23.8.169:52245 <-194.23.8.198:1521 | | Response Oracle,16 | |
| 7 | 2009/09/07 | 12:12:04.883208 | (131268-308) | 194.23.8.169:52245 <-194.23.8.198:1521 | | Request Oracle,DATA | |
| 8 | 2009/09/07 | 12:12:04.883657 | (131268-308) | 194.23.8.169:52245 <-194.23.8.198:1521 | | Response Oracle,6 | |
| 9 | 2009/09/07 | 12:12:04.887500 | (131268-309) | 194.23.8.169:52245 -> 194.23.8.198:1521 | | Request Oracle, select name into :b0 from customerwhere (branch_id=TO_NUMBER(:b1) and account_number=TO_NUMBER(:b2)) | |
| 10 | 2009/09/07 | 12:12:04.887900 | (131268-309) | 194.23.8.169:52245 <-194.23.8.198:1521 | | Response Oracle,16 | |
| 11 | 2009/09/07 | 12:12:04.888899 | (131268-310) | 194.23.8.169:52245 -> 194.23.8.198:1521 | | Request Oracle, select TO_CHAR(last_update, 'YYYY/MM/DD HH24:MI:SS') into :b0 from access_log where (branch_id=TO_NUMBER(:b1) and account_number=TO_NUMBER(:b2)) | |
| 12 | 2009/09/07 | 12:12:04.889199 | (131268-310) | 194.23.8.169:52245 <-194.23.8.198:1521 | | Response Oracle,16 | |
| 13 | 2009/09/07 | 12:12:04.891445 | (131268-311) | 194.23.8.169:52245 -> 194.23.8.198:1521 | | Request Oracle, select b.name,NVL(b.email,''),NVL(TO_CHAR(b.last_logon_time, 'YYYY/MM/DD HH24:MI:SS'),''), TO_CHAR(a.balance,'FM9999999999999999'),TO_CHAR(a.account_type) into :b0,:b1,:b2,:b3,:b4 from account a ,customer b where (((b.branch_id=a.branch_id and b.account_number=a.account_number) and b.branch_id=TO_NUMBER(:b5)) and b.account_number=TO_NUMBER(:b6)) | |
| 14 | 2009/09/07 | 12:12:04.891844 | (131268-311) | 194.23.8.169:52245 <-194.23.8.198:1521 | | Response Oracle,16 | |
| 15 | 2009/09/07 | 12:12:05.002368 | (131268-312) | 194.23.8.169:52245 -> 194.23.8.198:1521 | | Request Oracle, update access_logset last_update=TO_DATE(:b0, 'YYYY/MM/DD HH24:MI:SS') where (branch_id=TO_NUMBER(:b1) and account_number=TO_NUMBER(:b2)) | |
| 16 | 2009/09/07 | 12:12:05.003016 | (131268-312) | 194.23.8.169:52245 <-194.23.8.198:1521 | | Response Oracle,8 | |
| 17 | 2009/09/07 | 12:12:05.007109 | (131268-313) | 194.23.8.169:52245 -> 194.23.8.198:1521 | | Request Oracle,DATA | |
| 18 | 2009/09/07 | 12:12:05.008458 | (131268-313) | 194.23.8.169:52245 <-194.23.8.198:1521 | | Response Oracle,8 | |
| 19 | 2009/09/07 | 12:12:05.010455 | (132291-28991) | 194.23.6.227:39931 <-194.23.7.168:8002 | | Response IIOP,0 | |
| 20 | 2009/09/07 | 12:12:05.023634 | (132290-1) | 194.185.39.24:51272 <-194.23.5.226:10443 | | Response HTTP,200 | |

FIG. 10

EXEMPLARY JOB CATEGORIES OF HTTP PROTOCOL

| JOB CATEGORY | COMMAND | JOB DETAILS (LOCAL ADDRESS IN URL + CGI PARAMETERS TO RETAIN) |
|---|---|---|
| W1 | GET | /RUBBOS/SERVLET/EDU.RICE.RUBBOS.SERVLETS.STORIESOFTHEDAY |
| W2 | GET | /RUBBOS/SERVLET/EDU.RICE.RUBBOS.SERVLETS.VIEWSTORY |
| W3 | GET | /RUBBOS/SERVLET/EDU.RICE.RUBBOS.SERVLETS.SEARCH |
| W4 | GET | /RUBBOS/BROWSE.HTML |
| W5 | GET | /RUBBOS/SERVLET/EDU.RICE.RUBBOS.SERVLETS.SEARCH?TYPE=0 |
| W6 | GET | /RUBBOS/SERVLET/EDU.RICE.RUBBOS.SERVLETS.SEARCH?TYPE=1 |
| W7 | GET | /RUBBOS/SERVLET/EDU.RICE.RUBBOS.SERVLETS.VIEWCOMMENT?COMMENT_TABLE=COMMENTS |
| W8 | GET | /RUBBOS/SERVLET/EDU.RICE.RUBBOS.SERVLETS.OLDERSTORIES |
| W9 | GET | /RUBBOS/SERVLET/EDU.RICE.RUBBOS.SERVLETS.BROWSECATEGORIES |
| W10 | GET | /RUBBOS/SERVLET/EDU.RICE.RUBBOS.SERVLETS.BROWSESTORIESBYCATEGORY |
| W11 | GET | /RUBBOS/SERVLET/EDU.RICE.RUBBOS.SERVLETS.SEARCH?TYPE=2 |
| W12 | GET | /RUBBOS/SERVLET/EDU.RICE.RUBBOS.SERVLETS.VIEWCOMMENT?COMMENT_TABLE=OLD_COMMENTS |

FIG. 11

EXEMPLARY JOB CATEGORIES OF DATABASE PROTOCOL

| JOB CATEGORY | COMMAND | JOB DETAILS | (SQL STATEMENT ABSTRACTED BY USING CONVERSION RULES) |
|---|---|---|---|
| D1 | EXECREADREQ | SELECT .. FROM STORIES, USERS WHERE .. | |
| D2 | EXECREADREQ | SELECT .. FROM COMMENTS WHERE .. ORDER BY .. | |
| D3 | EXECREADREQ | SELECT .. FROM COMMENTS, USERS WHERE .. | |
| D4 | EXECREADREQ | SELECT .. FROM COMMENTS WHERE .. | |
| D5 | EXECREADREQ | SELECT .. FROM CATEGORIES | |
| D6 | EXECREADREQ | SELECT .. FROM STORIES WHERE .. ORDER BY .. | |
| D7 | EXECREADREQ | SELECT .. FROM OLD_COMMENTS WHERE .. | |
| D8 | EXECREADREQ | SELECT .. FROM OLD_COMMENTS WHERE .. ORDER BY .. | |
| D9 | EXECREADREQ | SELECT .. FROM OLD_COMMENTS, USERS WHERE .. | |
| D10 | EXECREADREQ | SELECT .. FROM OLD_STORIES, USERS WHERE .. | |

COMPUTER PROGRAM, METHOD, AND INFORMATION PROCESSING APPARATUS FOR ANALYZING PERFORMANCE OF COMPUTER SYSTEM

FIELD

The embodiments discussed herein relate to a computer-readable medium storing a computer program, method, and information processing apparatus for analyzing a computer system.

BACKGROUND

A multi-tier computer system includes a plurality of computers organized to share the processing workload in a hierarchical way. Each tier accepts and executes a plurality of processes concurrently. Generally, the number of such concurrent processes (referred to herein as the "load") may vary in a dynamic fashion within a previously specified load limit. For example, a load limit parameter designates the maximum number of processes that a tier is allowed to execute in parallel. The load of a tier may sometimes stick to a specific level designated by its load limit parameter. In any case, the servers are not allowed to increase their load levels beyond the given load limit of their tier. It is noted that the total processing performance of a multi-tier system is susceptible to what combination of load limit parameters is set to the tiers. For example, when too small a load limit parameter is given, the tier would become a bottleneck in the whole system and cause a performance degradation. It is therefore important to configure the tiers with proper load limit parameters.

One known method for determining appropriate load limit parameters is to run a series of repetitive benchmarks by using a load generation mechanism. For example, a server system is subjected to a process of throughput and response measurement in different load conditions to obtain a transaction density plot of the server system. See, for example, Japanese Laid-open Patent Publication No. 2004-302547.

The optimal load level for maximizing system performance depends sensitively on various conditions. While optimal load limit parameters may be obtained by using a conventional technique, there are still some disturbing factors that would hamper the system from exerting its full performance. For example, the processing time of jobs in a tier of the system may vary in a dynamic fashion. The rate of incoming processing requests may rise and drop drastically, thus placing a varying workload on the multi-tier system. In such cases, the use of relatively higher load limit parameters increases performance margin and thus enables stable operation of the system.

It is noted, however, that raising the load limit parameters too much will slow down the average response of the system. This is because the load may rise so much that the parallel processing loses its effectiveness, while the tier has to distribute its limited amount of hardware resources to an increased number of parallel processes. As a result, the response time may increase from 10 ms to 20 ms, for example. While the time length is twofold, the increase on this order does no harm to the end-user experience since most people would not perceive the difference. It is thus possible to increase the stability of the system by raising the server's load limit parameters above optimal values, as long as the response times can be controlled within an acceptable range.

The conventional techniques are, however, unable to find the upper bound of load limit parameters that keep the response times within an acceptable range. That is, it is practically difficult to determine to what extent the load limit parameters can be increased without sacrificing the response time of the system.

SUMMARY

According to an aspect of the embodiments, there is provided a computer-readable medium encoded with a program that causes a computer to perform a procedure including: determining whether a response time of each transaction falls within an acceptable time range that is specified previously, based on transaction data that records a plurality of transactions executed in a coordinated way by a plurality of servers in a multi-tier system during a given analysis period, the transaction data indicating execution periods of processes executed by the servers in each tier of the multi-tier system; dividing the given analysis period into a plurality of time windows and calculating, for each window, a load of the processes executed in parallel by the servers in a specified tier, based on the transaction data of the individual transactions; calculating, based on the transaction data of the transactions whose response times are determined to fall within the acceptable time range, a total progress quantity in each time window by adding up progress quantities of the processes executed, as part of the transactions whose response times are determined to fall within the acceptable time range, by the servers in the specified tier during a time window; and determining, based on the calculated load and total progress quantity of each time window, a first load value as a first threshold at which the total progress quantity begins to decrease in spite of an increase of the load.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a flowchart illustrating an exemplary procedure of performance analysis;

FIG. 8 illustrates an exemplary data structure of a message data storage unit;

FIG. 10 illustrates exemplary job categories of HTTP protocol;

FIG. 11 illustrates exemplary job categories of database protocol;

DESCRIPTION OF EMBODIMENTS

Figure 1:
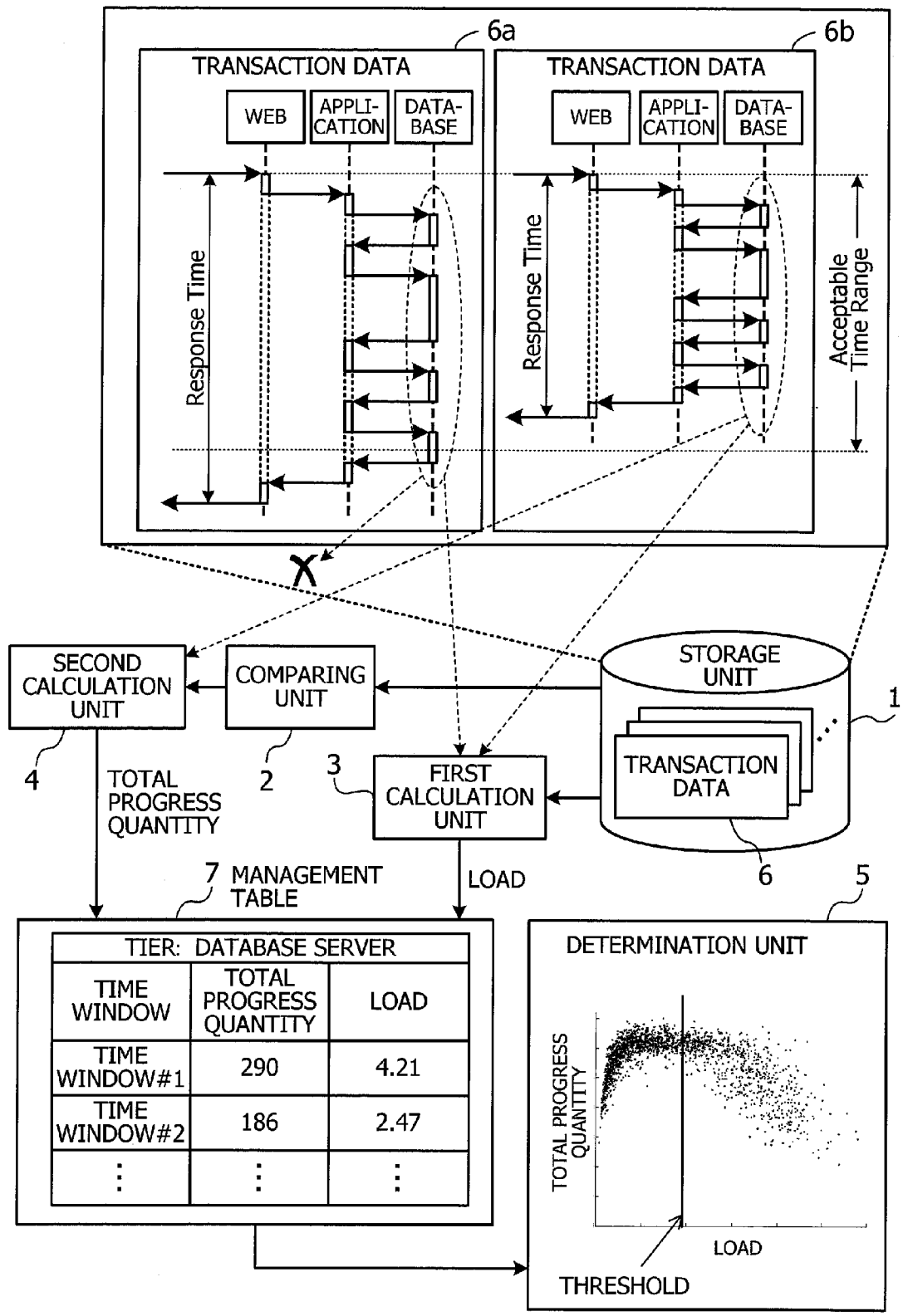
FIG. 1 illustrates an exemplary functional structure of an information processing apparatus according to a first embodiment.

Several embodiments of the present invention will be described below with reference to the accompanying drawings, wherein like reference numerals refer to like elements throughout. Each of those embodiments may be combined with other embodiments as long as there is no contradiction between them.

(A) First Embodiment

This section describes a first embodiment designed to calculate a total progress quantity of processes executed in transactions whose respective response times fall within an acceptable time range and determine a threshold of load at which the total progress quantity begins decreasing in spite of an increase in the load. The threshold determined in this way serves as an upper bound of load limit parameters for ensuring that the response times of transactions fall within an acceptable range.

FIG. 1 illustrates an exemplary functional structure of an information processing apparatus according to the first embodiment. The illustrated information processing apparatus includes a storage unit 1, a comparing unit 2, a first calculation unit 3, a second calculation unit 4, and a determination unit 5.

The storage unit 1 stores transaction data 6 that records a plurality of transactions executed in a coordinated way by a plurality of servers in a multi-tier system during a given analysis period. Specifically, the transaction data 6 indicates execution periods of processes executed by the servers in each tier of the system.

Based on the transaction data 6, the comparing unit 2 determines whether the response time of each transaction exceeds an acceptable time range that is specified previously. For example, the response time of a transaction denotes the time from reception of a request to transmission of a response by a server in the topmost tier of the multi-tier system. The acceptable time range is previously specified to have a reasonable width for users (e.g., such that average users would not find it to be slow).

The analysis period is divided into a plurality of segments called "time windows." For each of these time windows, the first calculation unit 3 calculates a load of processes executed in parallel by the servers in a specified tier, based on the transaction data of individual transactions. The term "load" is used here to mean the number of processes executed concurrently, or any other quantity equivalent to such number. The load may be obtained by adding up processing times spent for execution of processes in a time window and dividing the resulting total processing time by the length of a time window. The aforementioned "specified tier" may refer to a tier accommodating one or more servers that have reached their performance limit. The first calculation unit 3 populates a management table 7 with the calculated load values by entering them to relevant data fields corresponding to individual time windows. The management table 7 may be, for example, a data table stored in a memory or any other storage devices.

The second calculation unit 4 calculates a total progress quantity in each time window, based on the transaction data of transactions whose respective response times are determined to fall within the acceptable time range. The term "total progress quantity" refers to a sum of progress quantities of processes executed in the transactions whose response times fall within the acceptable time range, of all processes executed by the servers in the specific tier during a time window. The second calculation unit 4 populates the management table 7 with the calculated total progress quantities by entering them to relevant data fields corresponding to individual time windows.

Based on the load and total progress quantity in each time window, the determination unit 5 determines a specific load value as a threshold at which the total progress quantity begins to decrease in spite of an increase of the load. More specifically, the determination unit 5 retrieves load values and total progress quantities of different time windows from the management table 7. The determination unit 5 obtains a minimum value and a maximum value among the retrieved load values, and divides the range between the minimum and maximum values into a plurality of subranges. Then, for each load subrange, the determination unit 5 calculates an average of total progress quantities in the time windows whose load values fall within the load subrange. The determination unit 5 compares the calculated average total progress quantities of each two adjacent load subranges, thereby determining a threshold of the load at which the total progress quantity begins to decrease in spite of an increase of the load.

In operation of the above-described information processing apparatus, the comparing unit 2 determines whether the response time of each transaction exceeds an acceptable time range that is specified previously. Referring to the example of FIG. 1, first transaction data 6a indicates an excessive response time, whereas second transaction data 6b indicates a response time that falls within the acceptable time range. For each time window, the first calculation unit 3 calculates a load of processes executed in parallel by the servers in a specified tier, based on the transaction data of individual transactions. In the example of FIG. 1, the database tier is subjected to the calculation of server load. Further, the second calculation unit 4 calculates a total progress quantity in each time window, based on the transaction data of transactions whose respective response times are determined to fall within the acceptable time range. For example, the first transaction data 6a is not subjected to the calculation of total progress quantities because the pertinent transaction was executed with an excessive response time. The second transaction data 6b, on the other hand, indicates a transaction whose response time falls within the acceptable time range. Its corresponding progress quantity of database servers is thus taken into the total progress quantity. The determination unit 5 then determines a threshold of the load at which the total progress quantity begins to decrease in spite of an increase of the load.

The threshold determined above serves as an upper bound of load limit parameters for ensuring that the response time falls within an acceptable range. More specifically, the time windows may include: (i) time windows in which every transaction was finished in an allowable time range, and (ii) time windows in which some transactions spent more time than that. In the former group of time windows, the average processing time of processes increases as the load goes beyond the range at which the tier exerts its maximum performance. Since a large number of processes are executed in parallel in this situation, the increase of processing times does not affect very much the total progress quantity. For the latter group of time windows, the calculation of total progress quantity excludes, progress quantities of transactions whose response times exceed the acceptable time range. In contrast to this, the calculation of load involves those slow-response transactions. Accordingly, an increase of the load and a consequent slowdown in transaction responses will lead to a decrease of the total progress quantity. In other words, the noted load threshold at which the total progress quantity begins to decrease is also a point where the transactions begin to have an excessive response time. This is why the above threshold is supposed to serve as the upper bound of load limit parameters satisfying requirements for the response time.

The proposed method makes it possible to determine an upper bound of the range of load within which the system can deliver its expected performance. Severs may be set up with a load limit parameter selected in the range between a minimum load with which the system exhibits its maximum performance and the upper bound determined in the way described above. This setup permits the system to improve its operational margin for increased processing requests, while maintaining the performance level that the system is expected to deliver.

The comparing unit 2, first calculation unit 3, second calculation unit 4, and determination unit 5 discussed above in FIG. 1 may be implemented as part of the functions performed by one or more processors such as central processing units (CPU) in the proposed information processing apparatus. The storage unit 1 may be implemented in random access memory (RAM) or hard disk drive (HDD) in the information processing apparatus.

The functional blocks seen in FIG. 1 are interconnected by arrows or lines representing their communication paths. It is noted, however, that the proposed information processing apparatus is not limited by this specific example of communication paths. The person skilled in the art would appreciate that the information processing apparatus may actually have other communication paths.

(B) Second Embodiment

Described below is a second embodiment which assumes the use of server throughput as an exemplary implementation of the total progress quantity discussed in the first embodiment. The second embodiment also uses a service level agreement (SLA) as an example of the acceptable time range used to evaluate transaction response times in the above first embodiment. SLA is a part of a service contract between a service provider and their customers where the level of service is formally defined. Specifically, the second embodiment assumes that the acceptable time range of response to user requests is specified as part of SLA. The second embodiment also uses "jobs" of servers as an example of processes analyzed in the first embodiment.

As will be described below, the second embodiment is intended to solve a couple of shortcomings of existing techniques. Conventional techniques are supposed to determine load limit parameters for a server system to deliver its best performance. Such load limit parameters permit the servers to maximize their performance, but may produce the following problems.

The first problem is that it is unable to know how much headroom is available for individual servers to raise their load limit parameters beyond the point at which the server system supposedly exhibits its best performance. Generally, smaller load limit parameters are suitable for the cases in which the system has enough hardware power to spare, or the system is well performing as expected. One reason for this is that the average response time becomes worse when the load has increased too much for the parallel processing to remain effective, because a limited amount of hardware resources has to be shared by many concurrent processes. Another reason is that a higher load gives rise to various overheads that could cause a throughput degradation.

Since the optimal load level for maximizing system performance depends sensitively on various conditions, the system may not always be able to exert its full performance even when it is given an optimal load limit parameter. For one thing, the processing time of jobs in a tier of the system may vary in a dynamic fashion. For another, the rate of incoming processing requests may change drastically, thus causing inconstant workloads on the multi-tier system. In such cases, the use of relatively higher load limit parameters gives an additional performance margin and thus enables stable operation of the system. This solution may also slow down the system's response since the load of processes increases with the raised load limit parameter. For example, the response time may increase from 10 ms to 20 ms. While the time length is twofold, the increase on this order does no harm since the end users would not perceive the difference. Generally the allowable response time of individual requests from end users is specified as SLA. This means that there are no problems with the increased response times as long as they satisfy the SLA. That is, the tiers allow their load to increase until the consequent slowdown of responses reaches a point at which they begin to violate the SLA for some user requests. As be seen from the above, the existing techniques provide no effective solutions for estimating an upper bound of allowable load limit parameters.

The second problem is that, even if it is not impossible to estimate an upper bound of allowable load limit parameters, the estimation process would need to execute a large number of performance measurement cycles. The number of such performance measurement cycles for finding an optimal load limit parameter is calculated as a product of the following factors: (i) measurement cycles performed to seek maximum performance, using one particular load limit parameter value combined with successively increasing input load levels, and (ii) repeating the above measurement (i) with various combinations of load limit parameters for individual tiers to seek an optimal combination for the system performance.

The burden of the latter performance measurements drastically increase with the number of tiers because many combinations of load limit parameters have to be attempted in those tiers. While the combinations of parameters may be reduced by applying some known optimal search strategies, it is still unavoidable to repeat a large number of performance measurement cycles for the latter purpose. After all, the analysis needs a large number of measurement cycles (i.e., as many as the product of the above two factors).

The second embodiment takes several measures to solve the above difficulties. Firstly, the second embodiment realizes the following techniques as its basis: (i) precise measurement to determine the relationship between load and throughput in each tier, (ii) message-to-message mapping across different tiers and different protocols used in a series of processes derived from a single user request, and (iii) isolation of bottleneck tiers.

According to the second embodiment, a bottleneck tier is isolated and subjected to a procedure of determining a range (lower bound and upper bound) of load limit parameters that satisfy a given requirement. The second embodiment concentrates on the bottleneck tier on the following grounds.

Firstly, a multi-tier system, with no bottleneck tiers, has enough performance margin to finish every process in a short time. Each tier has only to execute a relatively small number of concurrent jobs. In this situation, the multi-tier system as a whole is insensitive to load limit parameters. That is, the system performs as expected no matter what load limit parameters are given.

Secondly, when there is a bottleneck in a tier, the performance of the system is greatly affected by the load limit parameter of that tier, whereas those of the other tiers do not influence the system performance very much. The tiers below the bottleneck tier have a performance margin and execute a relatively small number of concurrent jobs. These tiers perform as expected no matter what load limit parameters are given. The tiers above the bottleneck tier also perform as expected as long as their load limit parameters are somewhat above those of the bottleneck tier. While this setup of load limit parameters may produce some processing overhead in pertinent tiers, its effect on the performance of the multi-tier system as a whole would be negligibly small because those upper tiers maintain their performance margin.

According to the second embodiment, a load limit parameter suitable for a bottleneck tier in the multi-tier system is determined in the following steps:

1. Collecting many samples of measurement data from the bottleneck tier in question.
2. Calculating a load and an SLA-satisfiable throughput for each piece of measurement data.
3. Determining an appropriate range (upper and lower bounds) of load levels for maximizing SLA-satisfiable throughput, by analyzing the relationship between load and SLA-satisfiable throughput from the calculated values.

Here, the terms "load" and "SLA-satisfiable throughput" are defined as follows:

(i) Load
Load denotes the average number of jobs concurrently executed during a specific section of time.

(ii) SLA-satisfiable Throughput
SLA-satisfiable throughput is a specific version of throughput of a bottleneck tier that is calculated from measurement data of user requests executed with satisfactory response times in terms of SLA. More specifically, the calculation procedure examines the response time of each user request received by the topmost tier. If the response time does not satisfy the SLA, then the calculation of throughput of the bottleneck tier does not take into account the jobs derived from the pertinent user request. The throughput calculated from the remaining jobs on the bottleneck tier is referred to herein as the SLA-satisfiable throughput.

The above-noted three steps 1-3 yield appropriate lower and upper bounds of load limit parameters for the following reasons: Regarding first the lower bound of load limit parameters, the throughput increases with the load as long as the parallel processing mechanism works effectively. The increase of throughput stops when the effect of parallelism dies, and the load at that point is considered to be the minimum load for producing maximum throughput. Accordingly, this minimum load point is chosen as the lower bound of load limit parameters. This concept similarly applies to SLA-satisfiable throughput.

Regarding the upper bound of load limit parameters, the load may go beyond the above-noted point without causing any further increase of throughput, and in this situation, an additional load only ends up with a longer average response time of jobs on the tier. This means that the upper tiers are forced to wait a longer time, which finally comes to the surface as an increased time of the topmost tier's response to end-user requests. This increase of response times, however, does no harm as long as it is within the specified range of SLA. In other words, it is allowed to increase the load until the topmost tier becomes less responsive to end-user requests and fails to satisfy the SLA for some of them. SLA-satisfiable throughput maps such SLA violation in the topmost tier onto other tier's throughput. The load level that maximizes this SLA-satisfiable throughput is thus chosen as the upper bound of allowable load limit parameters.

To realize the functions described above, the second embodiment takes an approach of observing external behavior of applications on the network. Specifically, the second embodiment captures Internet Protocol (IP) packets flowing over the network by using network taps or port mirroring functions of switches and reconstructs protocol messages from the captured packets to obtain necessary measurement data. The port mirroring function is to duplicate IP packets passing through particular ports on a switch and forward a copy of those IP packets to another specified port. A network tap is a device attached to a network link in order to split a transmission signal off from the link and output the signal through its monitoring port. The protocol messages mentioned above conform to specific protocol standards. Where appropriate, the following description may refer to those protocol messages simply as "messages."

The processing performance per unit time of a computer is called "throughput." The second embodiment uses this term "throughput" to refer to what has been described above as "total progress quantity" in the first embodiment.

The following description assumes that the second embodiment is implemented in a web three-tier system as an example of a multi-tier system. This web three-tier system is a computer system formed from web servers, application servers, and database servers organized in a multiple-tier structure. A web browser is running on an end-user computer, which issues processing requests in the form of Hyper Text Transfer Protocol (HTTP) messages. Those processing requests are received by a web server. If the requests are directed to static content, the web server directly responds to them by sending the requested content back to the requesting end-user computer. If the processing requests include a request for dynamic content that is to be produced by some programs, the web server forwards that request to an application server. Upon receipt of this request, the application server executes the requested processing with a program described in Java™ language or the like.

During the course of this processing, the application server may need some data managed in a database. In that case, the application server issues a request to a relevant database server to obtain necessary data.

The second embodiment provides the functions of obtaining the following information from the three-tier Web system under observation: (i) Exact load and throughput of servers in each tier within a specified time frame, and (ii) Response time of each HTTP request that has invoked jobs in a tier.

According to the second embodiment, the analysis server captures incoming requests to each server and their corresponding responses from each server. Based on the captured data, the analysis server analyzes each tier in terms of the load and throughput.

The analysis server determines the response time of each HTTP request that invoked jobs on the tiers. Specifically, the analysis server uses the captured data to identify the relationship between calling jobs in a tier and called jobs in another tier. Then based on the identified job-to-job relationship, the analysis server obtains a precise picture of relationships among a series of messages exchanged during each transaction. The analysis server also obtains information about the response time of each HTTP request. To obtain the exact load values in later analysis, the precise start and end times of jobs, or time stamps of messages, have to be recorded.

Figure 2:
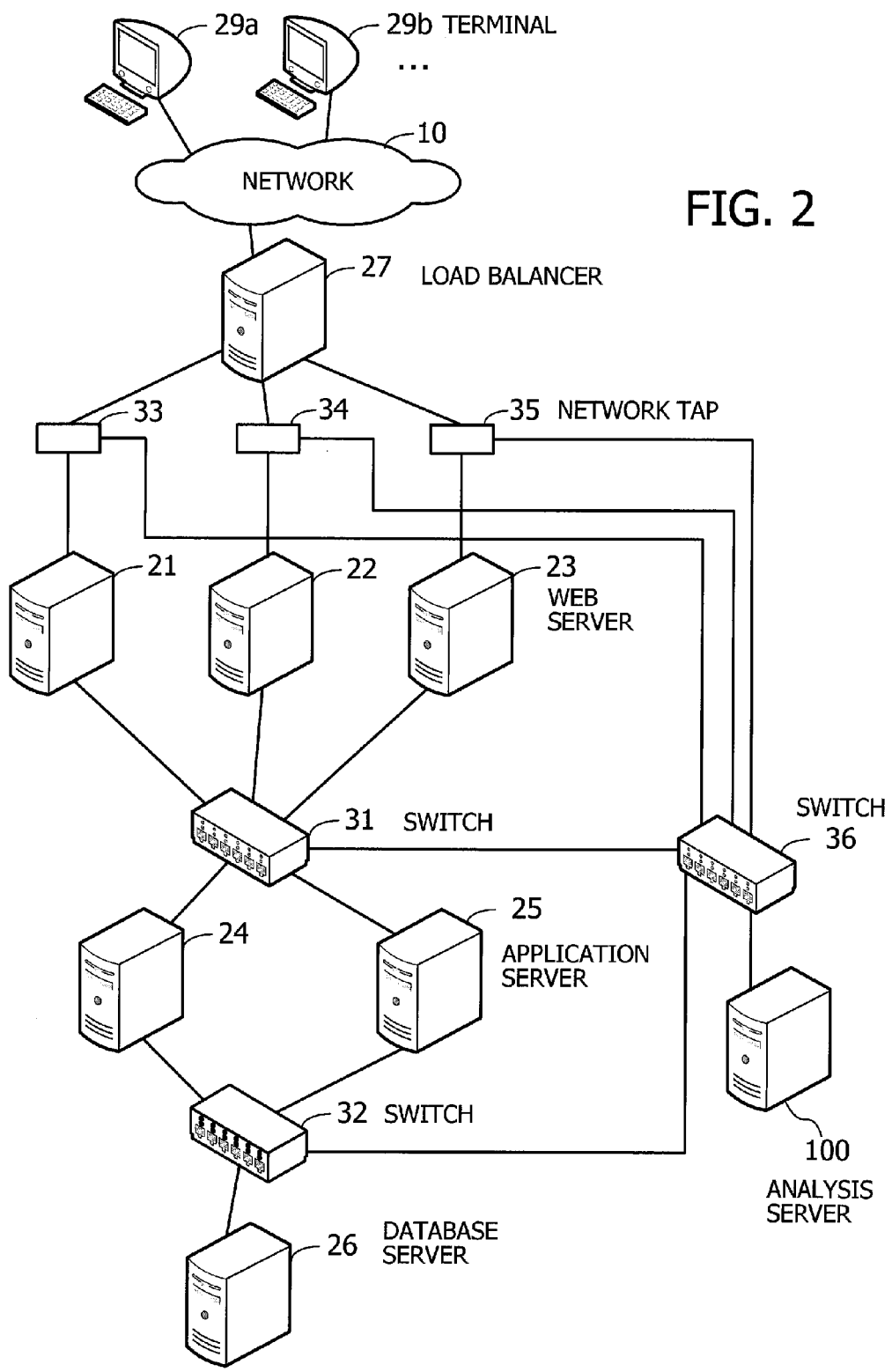
FIG. 2 illustrates an overall structure of a system according to a second embodiment.

FIG. 2 illustrates an overall structure of a system according to the second embodiment. The illustrated system includes, among others, an analysis server 100, three web servers 21, 22, and 23, two application servers 24 and 25, a database server 26, and a load balancer 27. The web servers 21, 22, and 23 and application servers 24 and 25 are linked to each other via a switch 31. The application servers 24 and 25 and database server 26 are linked to each other via another switch 32. The load balancer 27 is coupled to the web servers 21, 22, and 23 via network taps 33, 34, and 35, respectively.

The switches 31 and 32 have port mirroring functions. Specifically, each switch 31 and 32 has a port dedicated for port mirroring. There are link connections from those mirroring ports to the switch 36. Port mirroring at the switch 31 provides the switch 36 with a copy of each packet transmitted between the web servers 21, 22, and 23 and application servers 24 and 25. Similarly, port mirroring at the switch 32 provides the switch 36 with a copy of each packet transmitted between the application servers 24 and 25 and database server 26.

Each network tap 33, 34, and 35 has a monitoring port for connection to the switch 36. Specifically, one network tap 33 provides the switch 36 with a copy of each packet transmitted between the web server 21 and load balancer 27. Another network tap 34 provides the switch 36 with a copy of each packet transmitted between the web server 22 and load balancer 27. Yet another network tap 35 provides the switch 36 with a copy of each packet transmitted between the web server 23 and load balancer 27.

The switch 36 is coupled to the analysis server 100 and forwards packets from other switches 31 and 33 and network taps 33, 34, and 35 to the analysis server 100.

The load balancer 27 is connected to a plurality of terminals 29a, 29b, . . . via a network 10. The terminals 29a, 29b, . . . may send their service requests toward the web servers 21, 22, and 23. The load balancer 27 receives those requests and distributes them to appropriate web servers. For example, the load balancer 27 distributes the requests in such a way that the workload will be shared evenly by the web servers 21, 22, and 23.

As seen from the above, the terminals 29a, 29b, . . . are allowed to make access to web servers 21, 22, and 22 via the network 10 and load balancer 27. The users of those terminals 29a, 29b, . . . interact with the system through, for example, a graphical user interface (GUI) provided by the web servers 21, 22, and 23.

The analysis server 100 manages operation of the web servers 21, 22, and 23, application servers 24 and 25, and database server 26. To this end, the analysis server 100 collects necessary information through the switch 36. More specifically, the analysis server 100 receives and records communication packets supplied from the switch 36. This operation is called "packet capturing." The analysis server 100 has a network interface capable of receiving IP packets forwarded from the switch 36, as well as a hard disk drive whose capacity is large enough to record those forwarded IP packets. Preferably, the analysis server 100 has a sufficient CPU performance for capturing IP packets without fail. The analysis server 100 subjects the captured IP packets to a process of extracting messages.

The web servers 21, 22, and 23 accept processing requests (messages) that web browsers on the terminals 29a, 29b, . . . may issue to the system. Here the web servers 21, 22, and 23 and terminals 29a, 29b, . . . are assumed to use the HTTP protocol to communicate their messages. The embodiment is, however, not limited by this assumption and may use other protocols as well. Where appropriate, the processing requests issued from terminals 29a, 29b, . . . to the web servers 21, 22, and 23 are referred to herein as "HTTP requests." Similarly, their corresponding responses are referred to herein as "HTTP responses." Those HTTP requests and responses are an example of processing requests.

In response to an HTTP request for static content from a terminal 29a, 29b, . . . , the receiving web server 21, 22, or 23 produces an HTTP response by itself and transmits it back to the requesting terminal. In the case of a request for dynamic content, the receiving web server 21, 22, or 23 produces a processing request (message) that specifies necessary processing operations and sends it to an application server 24 or 25.

It is assumed here that the web servers 21, 22, and 23 and application servers 24 and 25 communicate messages by using the Internet Inter-ORB Protocol (IIOP), where ORB stands for "Object Request Broker." The second embodiment is, however, not limited by this assumption and may allow the use of other protocols as well. Where appropriate, the processing requests issued from web servers 21, 22, and 23 to application server 24 and 25 are referred to herein as "IIOP requests." Similarly, their corresponding responses are referred to herein as "IIOP responses." The web servers 21, 22, and 23 produce an HTTP response when they receive an IIOP response corresponding to their previously sent IIOP request. This HTTP response is transmitted back to the requesting terminal 29a, 29b, . . . that made the original HTTP request.

The application servers 24 and 25 produce a query for a necessary processing operation on the basis of an IIOP request received from a web server 21, 22, or 23, and sends it to the database server 26. Such queries produced by the application servers 24 and 25 are written in the form of, for example, Structured Query Language (SQL) statements, and transmitted to the database server by using a proprietary protocol specific to the database server 26. Where appropriate, those queries from application servers to database server are referred to herein as "DB requests." Similarly, their corresponding responses are referred to herein as "DB responses." The application servers 24 and 25 receive a database response corresponding to their previous database request. Based on this DB response, the application servers 24 and 25 create an IIOP response and send it back to the requesting web server 21, 22, or 23.

The database server 26 receives a DB request from application servers 24 and 25 and executes SQL statements contained in the received DB request, making access to a database for data retrieval and update operations. Based on the execution result, the database server 26 creates a DB response and sends it back to the requesting application server 24 or 25 that made the original DB request.

The web, application, and database tiers exchange messages with each other, as described above. While there are several ways to collect those messages, the second embodiment is configured to capture IP packets flowing over the network to collect message information.

In the rest of the description, the wording "each server" may be used to refer to the web servers 21, 22, and 23, application servers 24 and 25 and database server 26 individually. Also the wording "the servers" may be used to refer to those servers collectively, unless otherwise qualified. It is noted that the web servers 21, 22, and 23 are positioned higher than the application servers 24 and 25 and database server 26 in the tier hierarchy. The application servers 24 and 25 are positioned higher than the database server 26. The analysis server 100 is previously provided with the information defining such hierarchical relationships among the servers.

Figure 3:
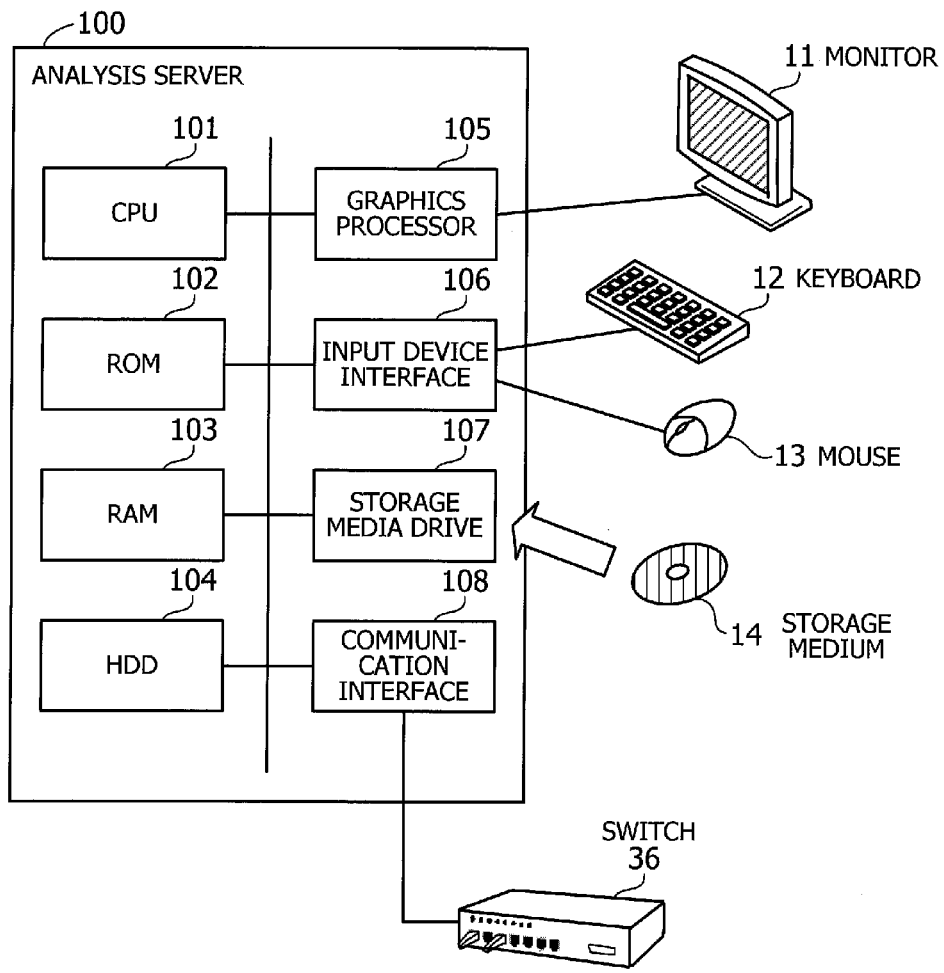
FIG. 3 illustrates an example hardware configuration of an analysis server used in the second embodiment.

FIG. 3 illustrates an example hardware configuration of the analysis server 100 used in the second embodiment. The illustrated analysis server 100 includes a CPU 101, a read only memory (ROM) 102, a RAM 103, an HDD 104, a graphics processor 105, an input device interface 106, a storage media drive 107, and a communication interface 108.

The CPU 101 controls the entire system of the illustrated analysis server 100. The ROM 102 stores, for example, basic input/output system (BIOS) programs for the analysis server 100. The RAM 103 serves as temporary storage for at least part of operating system (OS) programs and application programs executed by the CPU 101, as well as for various data that the CPU 101 needs to execute processing. The HDD 104 stores OS programs and application programs. The HDD 104 also stores various data that the CPU 101 needs to execute processing. It is noted that other data storage devices such as a solid state drive (SSD) may be used in place of, or in addition to the HDD 104.

The graphics processor 105 is connected to a monitor 11. The graphics processor 105 produces video images in accordance with commands from the CPU 101 and displays them on a screen of the monitor 11. The input device interface 106 is connected to input devices such as a keyboard 12 and a mouse 13 and supplies signals from those input devices to the CPU 101.

The storage media drive 107 is a device used to read data out of a storage medium 14. For example, the functions that the analysis server 100 is supposed to provide may be encoded as computer programs to be run on a computer system. Those programs may be recorded on a computer-readable medium, such as the illustrated storage medium 14, for the purpose of distribution. It is noted that computer-readable media include all computer-readable media, with the sole exception being a transitory, propagating signal. The programs may also be stored in a program distribution server (not illustrated) which is linked to the switch 36. In this case, the analysis server 100 can download programs from the program distribution server via the switch 36.

The storage medium 14 for the above purpose may be, for example, a magnetic storage device, optical disc, magneto-optical storage medium, or semiconductor memory device. Magnetic storage devices include, for example, HDD, flexible disks (FD), and magnetic tapes. The optical discs include, for example, compact disc (CD), CD-Recordable (CD-R), CD-Rewritable (CD-RW), digital versatile disc (DVD), DVD-R, DVD-RW, and DVD-RAM. Magneto-optical storage media include magneto-optical discs (MO), for example. Semiconductor memory devices may be, for example, flash memory, including Universal Serial Bus (USB) flash drives.

The communication interface 108 is connected to the switch 36 via a twisted pair (TP) cable, fiber-optic cable, or the like. The communication interface 108 may communicate data with other information processing devices (not illustrated) via the switch 36. The communication interface 108 also receives from the switch 36 a copy of communication packets exchanged between the servers.

The above-described hardware platform may be used to realize the processing functions of the second embodiment. While FIG. 3 only illustrates the analysis server 100, the same hardware configuration may also be applied to the web servers 21, 22, and 23, application servers 24 and 25, database server 26, and terminals 29a, 29b, and so on. Further, the information processing apparatus discussed in the first embodiment can also be implemented on this computer hardware platform of FIG. 3.

Figure 4:
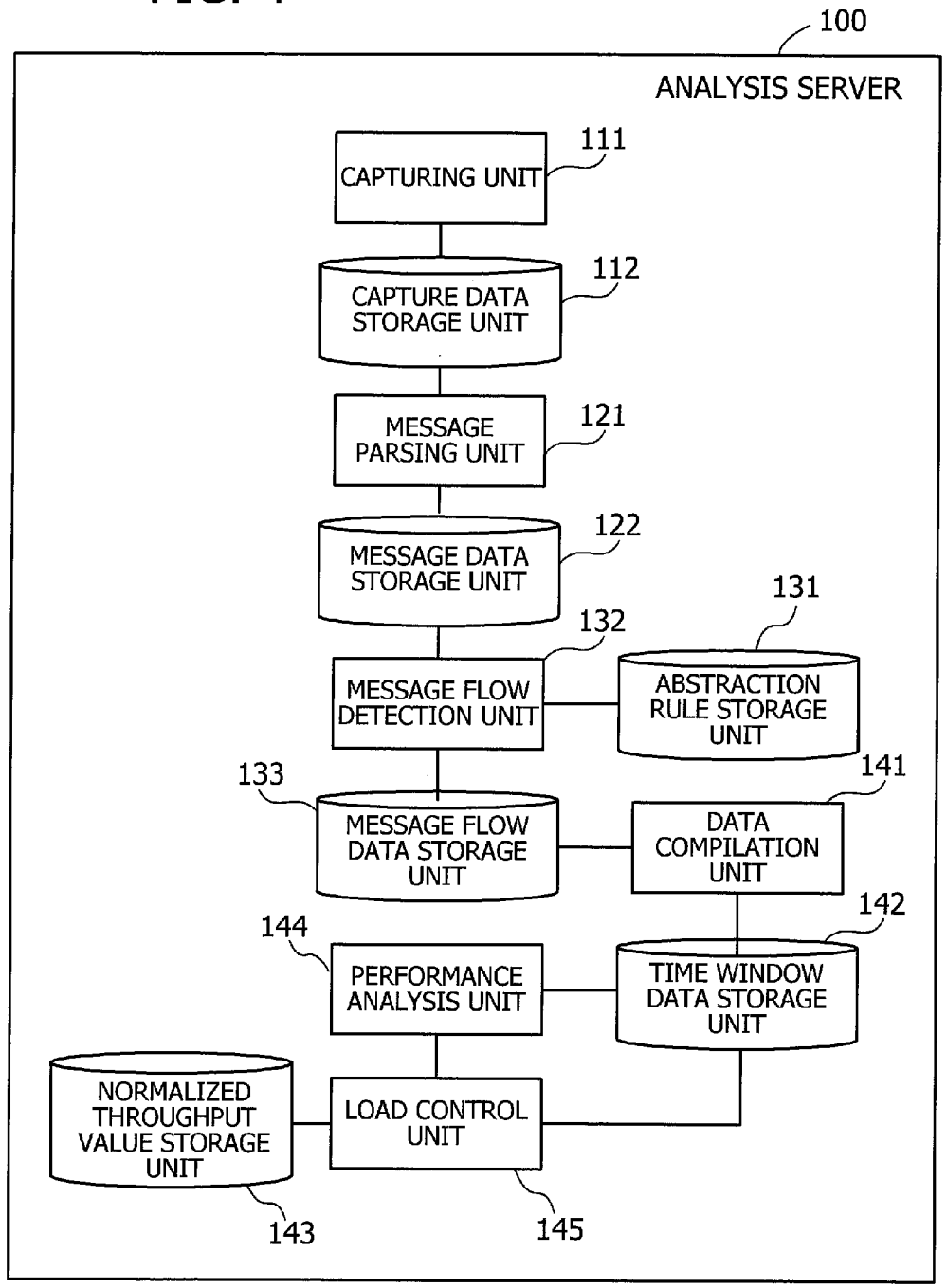
FIG. 4 is a block diagram illustrating an example of functions provided in the analysis server according to the second embodiment.

FIG. 4 is a block diagram illustrating an example of functions provided in the analysis server according to the second embodiment. Specifically, the illustrated analysis server 100 includes a capturing unit 111, a capture data storage unit 112, a message parsing unit 121, a message data storage unit 122, an abstraction rule storage unit 131, a message flow detection unit 132, a message flow data storage unit 133, a data compilation unit 141, a time window data storage unit 142, a normalized throughput value storage unit 143, a performance analysis unit 144, and a load control unit 145.

The capturing unit 111 receives, via the switch 36, a copy of each communication packet transmitted from the mirror port of each switch 31 and 32, as well as from network taps 33 to 35. The capturing unit 111 stores the received communication packets in a capture data storage unit 112, adding a time stamp indicating the current time to each communication packet to be stored. The capture data storage unit 112 provides a storage space for communication packets captured by the capturing unit 111. This capture data storage unit 112 may be implemented, for example, as part of the storage space of the RAM 103 or HDD 104 in the analysis server 100.

The message parsing unit 121 parses received packets to reconstruct each original message transmitted by the web servers 21, 22, and 23, application servers 24 and 25, database server 26, and terminals 29a, 29b, and so on. The message parsing unit 121 then stores the reconstructed messages in a message data storage unit 122. The message data storage unit 122 provides a storage space for those reconstructed messages. For example, this message data storage unit 122 may be implemented as part of the storage space of the RAM 103 or HDD 104.

The abstraction rule storage unit 131 stores abstraction rules that describe how to abstract the content of request messages. For example, the abstraction rules include those for combining similar request messages that request the same kind of processes (e.g., jobs that belong to a particular category) into a single form of content. The abstraction rules, when applied to each request message, permit the analysis server 100 to recognize request messages having common abstract content as being directed to the same job category. For example, this abstraction rule storage unit 131 may be implemented as part of the storage space of the RAM 103 or HDD 104.

Messages are stored as time-series data in the message data storage unit 122. The message flow detection unit 132 determines the type of processes (jobs) initiated by those messages, on the basis of relevant abstraction rules stored in the abstraction rule storage unit 131. For example, the message flow detection unit 132 executes the aforementioned abstraction of request messages with given abstraction rules and recognizes request messages having common abstract content as being directed to the same job category. After the abstraction of request messages, the message flow detection unit 132 extracts messages resulting from a transaction (a series of processing operations) executed by the web servers 21, 22, and 23, application servers 24 and 25, and database server 26. For example, the message flow detection unit 132 has a set of transaction models which are previously defined. The message flow detection unit 132 searches the message data storage unit 122 to extract a combination of messages (a message flow) that matches with a specific transaction model.

Further, the message flow detection unit 132 stores the extracted message flows in a message flow data storage unit 133 as message flow datasets. Specifically, a collection of request messages is stored as a message flow dataset, each request message having been given an indication of job category to record what kind of job was executed by that message. The message flow data storage unit 133 provides a storage space for such message flow datasets. For example, this message flow data storage unit 133 may be implemented as part of the storage space of the RAM 103 or HDD 104.

The data compilation unit 141 first divides a given analysis period into a plurality of time windows with a fine granularity (i.e., a small time step size). The data compilation unit 141 then retrieves a message flow dataset from the message flow data storage unit 133 and compiles those records on an individual time window basis. For example, the data compilation unit 141 calculates a throughput value and a load value for each time window, and for each tier, based on the records stored in the message flow data storage unit 133. The data compilation unit 141 stores the calculated throughput values and load values in a time window data storage unit 142. The time window data storage unit 142 provides a storage space for storing such load-throughput pairs of time windows, separately for each tier. For example, this time window data storage unit 142 may be implemented as part of the storage space of the RAM 103 or HDD 104.

The normalized throughput value storage unit 143 provides a storage space for normalized per-job throughput values of different job categories. For example, this normalized throughput value storage unit 143 may be implemented as part of the storage space of the RAM 103 or HDD 104.

The performance analysis unit 144 determines a saturation point. The term "saturation point" refers to a boundary that divides load values into to the following two ranges. In one range, throughput increases as load increases, whereas in the other range, there is little or no increase in throughput in spite of an increase of load. In other words, the saturation point is a threshold of load above which no more meaningful increase of throughput is expected even if the load is raised.

The performance analysis unit 144 isolates a server that is causing a performance bottleneck of the multi-tier system. For example, the performance analysis unit 144 evaluates the time duration in which the load exceeds the saturation point, and calculates the ratio of that duration to the given analysis period. If this ratio exceeds a predetermined threshold in a particular tier, then the performance analysis unit 144 determines that the server in that tier is likely to be a bottleneck. The performance analysis unit 144 then outputs its determination result by, for example, sending the load control unit 145 a piece of information indicating which tier or server is a bottleneck in the system.

The load control unit 145 analyzes the bottleneck tier in question to figure out an allowable load range of servers in that tier. This allowable load range is delimited by a specific lower bound and a specific upper bound. The lower bound is a boundary that divides load values into the following two ranges. In one range, throughput increases as load increases, whereas in the other range, there is little or no increase in throughput in spite of an increase of load. In other words, the lower bound is a saturation point above which no more meaningful increase of throughput is expected even if the load is raised. The upper bound, on the other hand, refers to a point of load at which the SLA-satisfiable throughput begins to decrease in spite of an increase of load.

The load control unit 145 also interacts with servers located above the bottleneck server to adjust the load of their processing requests to the bottleneck server in order to make its maximum load fall within a range of allowable load limit parameters. Suppose, for example, that the database server 26 is in condition of bottleneck. In this case, the load control unit 145 configures two application servers 24 and 25 in such a way that the total amount of their concurrent requests to the database server will fall within a range of allowable load limit parameters for the database server 26. For example, the load control unit 145 may specify the midpoint between lower and upper bounds delimiting the range of allowable load limit parameters.

Referring to FIG. 4, several functional blocks of the analysis server 100 are interconnected by solid lines representing a part of communication paths. It is noted, however, that the second embodiment is not limited by this specific example illustrated in FIG. 4. The person skilled in the art would appreciate that the analysis server 100 may actually have other communication paths.

Figure 5:
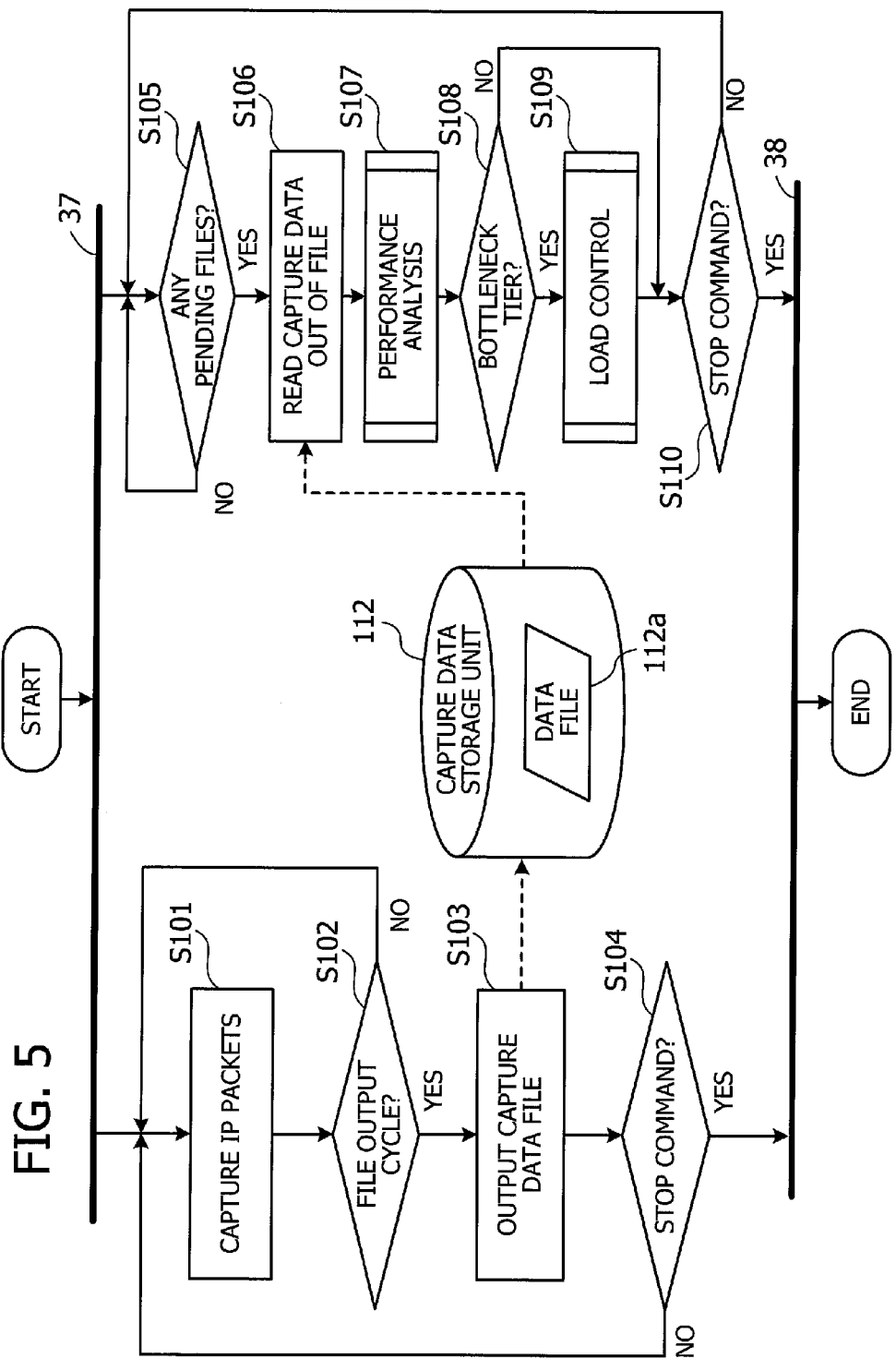
FIG. 5 is a flowchart illustrating an exemplary procedure of analysis.

The operation of each function of FIG. 4 will now be discussed in greater detail below. FIG. 5 is a flowchart illustrating an exemplary procedure of analysis. As seen, the flowchart of FIG. 5 includes two synchronization bars 37 and 38 to represent parallel processing similarly to those used in activity diagrams according to the Unified Modeling Language (UML). The upper synchronization bar 37 represents an operation called "fork," which indicates that one process flow is divided into two or more parallel flows. The lower synchronization bar 38, on the other hand, represents an operation called "join," which indicates that two or more process flows are joined together to a single flow.

Each step of FIG. 5 will now be described below in the order of step numbers.

(Step S101) The capturing unit 111 captures IP packets sent from mirror ports of switches 31 and 32, as well as those from network taps 33 to 35. For example, the capturing unit 111 temporarily stores captured IP packets in the RAM 103, together with their receive time stamps to record when the capturing unit 111 received each IP packet.

(Step S102) The capturing unit 111 determines whether a given file output cycle time has elapsed since the start of the capturing process or the previous output of a capture data file. The capturing unit 111 is previously configured to output a data file at intervals of, for example, 180 seconds. When this file output cycle time has elapsed, the capturing unit 111 proceeds to step S103. When it is in the middle of the cycle, the capturing unit 111 returns to step S101 to continue capturing IP packets.

(Step S103) The capturing unit 111 outputs the capture data from temporary storage (e.g., RAM 103) in the form of a data file 112*a*. For example, the capturing unit 111 creates a new data file 112*a* in the capture data storage unit 112 to output the captured data.

(Step S104) The capturing unit 111 determines whether a stop command is entered. For example, the analysis server 100 allows the administrator to submit a stop command through a keyboard 12 or a mouse 13 (FIG. 5). When there is a stop command, the capturing unit 111 terminates the capturing process. Otherwise, the capturing unit 111 brings the process back to step S101.

As a result of steps S101 to S104, a new data file 112*a* containing capture data is created and stored in the capture data storage unit 112 at each file output cycle.

(Step S105) The message parsing unit 121 examines whether the capture data storage unit 112 contains any pending data files 112*a* that have not been subjected to the performance analysis. As the capturing unit 111 supplies the capture data storage unit 112 with such data files at regular intervals (i.e., file output cycles), the message parsing unit 121 may find a pending data file at the same intervals. When there is a pending data file 112*a*, the message parsing unit 121 advances the process to step S106. When there are no pending data files, the message parsing unit 121 repeats step S105 until a pending file appears in the capture data storage unit 112.

(Step S106) The message parsing unit 121 reads capture data out of the newly selected data file 112*a* in the capture data storage unit 112.

(Step S107) The functional blocks constituting the analysis server 100 work together to execute a performance analysis. Details of this step S107 will be described later with reference to FIG. 7.

(Step S108) With the result of the performance analysis, the load control unit 145 determines whether any bottleneck tier has been detected. For example, the load control unit 145 recognizes that a bottleneck has been detected with a specific tier, when it is so informed by the performance analysis unit 144. In this case, the load control unit 145 advances the process to step S109. When there are no bottleneck tiers, the load control unit 145 skips to step S110.

(Step S109) The load control unit 145 analyzes the bottleneck tier to obtain its allowable load range. The load control unit 145 then selects a specific load limit parameter within the obtained allowable load range and assigns the selected load limit parameter to the servers constituting the bottleneck tier. This assignment of load limit parameters is achieved by using, for example, the function of remote access from the analysis server 100 to other servers. Details of this step S109 will be described later.

(Step S110) The message parsing unit 121 determines whether a stop command is entered. For example, the analysis server 100 allows the administrator to submit a stop command through a keyboard 12 or a mouse 13 (FIG. 5). When there is a stop command, the message parsing unit 121 terminates the capturing process. Otherwise, the message parsing unit 121 brings the process back to step S105.

As can be seen from the above, the captured data is accumulated for a fixed period (e.g., 180 ms) and subjected to a performance analysis at fixed intervals. As an alternative method, the data collection process (steps S101 to S104) and the analysis (steps S105 to S110) may be executed separately without synchronization. Preferably, however, the data collection process (steps S101 to S104) and the analysis (steps S105 to S110) are executed together in a synchronized way, just as done in FIG. 5, so that inappropriate load limit parameters can be detected in real time and thus corrected dynamically.

Figure 6:
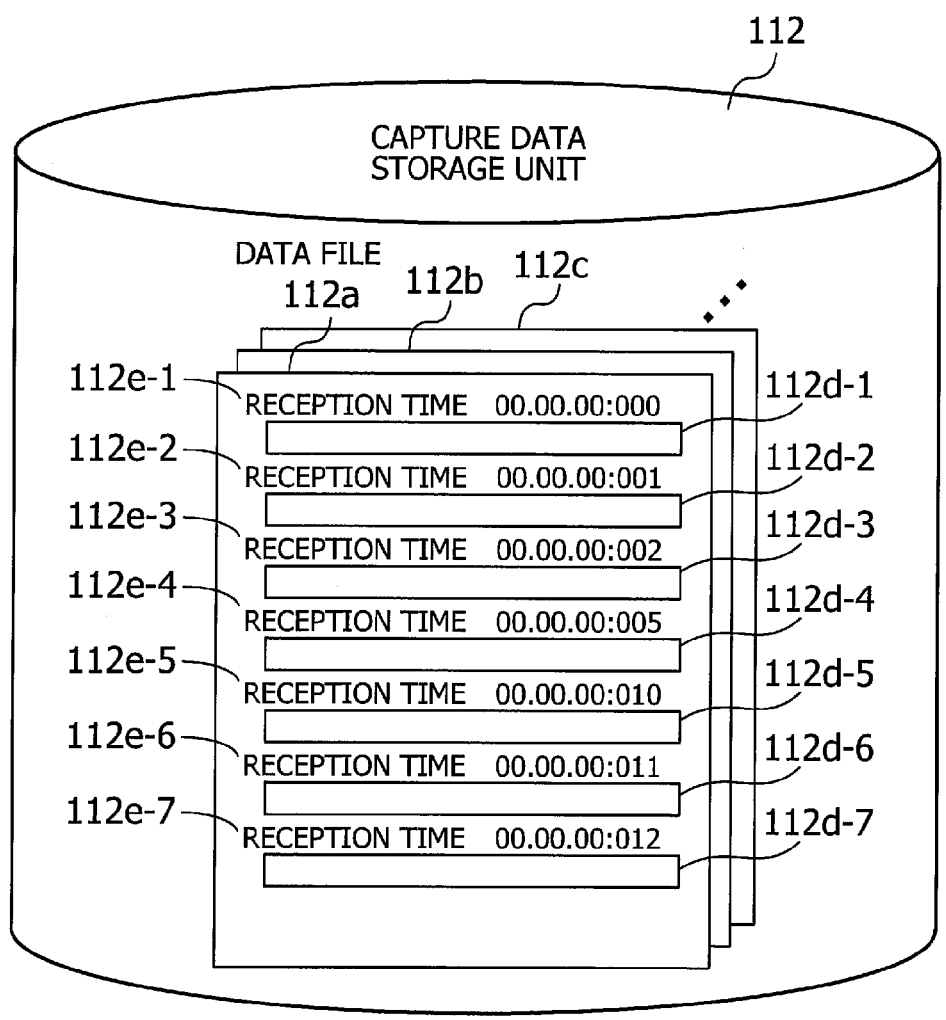
FIG. 6 illustrates an exemplary data structure of a capture data storage unit.

FIG. 6 illustrates an exemplary data structure of the capture data storage unit 112. The illustrated capture data storage unit 112 stores a plurality of data files 112*a*, 112*b*, 112*c*, and so on. The first data file 112*a*, for example, contains a plurality of IP packets 112*d*-1 to 112*d*-7. Each IP packet 112*d*-1 to 112*d*-7 is added a record of reception time 112*e*-1 to 112*e*-7. The other data files 112*b*, 112*c*, . . . also contain IP packets with reception time records similarly to the first data file 112*a*.

(a) Performance Analysis

Referring now to FIG. 7 and subsequent drawings, the description will provide details of a performance analysis. FIG. 7 is a flowchart illustrating an exemplary procedure of performance analysis. Each step of FIG. 7 will now be described below in the order of step numbers.

(Step S121) The message parsing unit 121 reconstructs messages on the basis of IP packets contained in the currently selected data file, and stores the reconstructed messages in the message data storage unit 122 in their temporal order.

(Step S122) The message flow detection unit 132 investigates messages stored in the message data storage unit 122 to detect message flows. The term "message flow" refers to a series of messages transmitted and received in the multi-tier system as a consequence of a single transaction request.

According to the second embodiment, different tiers use different communication protocols to send messages. When the multi-tier system receives a request from one of the terminals 29*a*, 29*b*, . . . , various messages are issued from relevant tiers with different protocols. Many of those messages, however, lack the information necessary for associating themselves with others. The second embodiment overcomes this difficulty by using a model matching technique to detect associations between those different protocol messages. For example, the message flow detection unit 132 has a prepared set of message flow models, so that the messages in the message data storage unit 122 can be compared with those models. If a group of messages matches with a particular model, the message flow detection unit 132 identifies that group of messages as a message flow.

(Step S123) The message flow detection unit 132 determines the job category of processes that the server of each tier executes in response to request messages in a detected message flow. The message flow detection unit 132 achieves this by, for example, performing abstraction of each request message according to abstraction rules stored in the abstraction rule storage unit 131, and then combining request messages having the same abstracted content as a single job category. Here the detected job category is given a specific identifier (job category name). Further, the message flow detection unit 132 stores the extracted message flows in a message flow data storage unit 133 as message flow datasets.

(Step S124) The performance analysis unit 144 selects a specific tier for the performance analysis. For example, the performance analysis unit 144 has a listing of protocols which are used to send request messages to the server of each tier constituting the multi-tier system. The listing includes protocol names such as "HTTP," "IIOP," and "Database" for a web three-tier system. The performance analysis unit 144 selects the tiers corresponding to those protocol names one by one.

(Step S125) The performance analysis unit 144 executes a performance analysis of the selected tier. Details of this step S107 will be described later with reference to FIG. 14.

(Step S126) The performance analysis unit 144 determines whether every tier has been subjected to the tier performance analysis. For example, the performance analysis unit 144 determines that there is no more tier to process when it has selected all tiers specified by the given listing of protocol names. When there is a pending tier, the performance analysis unit 144 returns to step S124 to select that tier. Otherwise, the performance analysis unit 144 exits from the present process of performance analysis.

As described above, the procedure of performance analysis begins with reconstruction of messages. The reconstructed messages are then stored in the message data storage unit 122. FIG. 8 illustrates an exemplary data structure of the message data storage unit 122. The illustrated message data storage unit 122 contains a plurality of reconstructed messages in the temporal order, which are also referred herein to as "time series data." Placed on the left of those messages in FIG. 8 are the line numbers indicating their locations within the message data storage unit 122. It is noted that FIG. 8 focuses on the processing requests and responses of tiers, as well as their associated messages, while omitting other messages which may actually be stored in the message data storage unit 122.

Each line of message text is formed from the following data fields: date field 122*a*, time field 122*b*, session number field 122*c*, source address field 122*d*, destination address field 122*e*, command type field 122*f*, and message field 122*g*. The date field 122*a* contains a date code indicating when the message was captured. The time field 122*b* contains a time code indicating at what time of day the message was captured. The session number field 122*c* contains a session number which is used to manage resources for message transmission and reception in the transaction system under analysis. The source address field 122*d* contains an IP address and a port number which indicate the source computer of the message. The destination address field 122*e* contains an IP address and a port number which indicate the destination computer of the message. The command type field 122*f* indicates the request/response property and protocol type (e.g., HTTP, IIOP, Database query) of a command. The message field 122*g* contains specific details of the message. For example, when the command type field 122*f* indicates that the message is a request, the message field 122*g* provides detailed content of that request.

The above-described data of messages in the message data storage unit 122 permits the message flow detection unit 132 to recognize what kind of messages were sent to which servers. The IP addresses seen in the message data storage unit 122 of FIG. 8 are each associated with a specific host device in the system of FIG. 2 as follows. IP address "194.23.5.226" identifies the web server 21. IP address "194.23.7.168" identifies the application server 24. IP address "194.23.8.198" identifies the database server. IP address "194.185.39.24" identifies the terminal 29*a*.

The above message parsing unit 110 is configured to fill in the date field 122*a* and time field 122*b* with the information obtained from time stamps of communication packets which are recorded at the time of capturing. The embodiments are, however, not limited by this specific configuration. In the case where, for example, communication packets carry with themselves a piece of information indicating their creation time or transmission time at the source server, the analysis server 100 may use that time information to populate the date field 122*a* and time field 122*b*. It is preferable, in this case, that the clocks in the servers are precisely synchronized with each other.

The message flow detection unit 132 detects a specific message flow from reconstructed messages and identifies the job category of jobs executed in response to request messages in the messages flow. The term "job category" refers to a group of requests that initiate similar kinds of processing operations. To determine such job categories, the message flow detection unit 132 performs abstraction of given request messages on the basis of abstraction rules provided in the abstraction rule storage unit 131.

Figure 9:
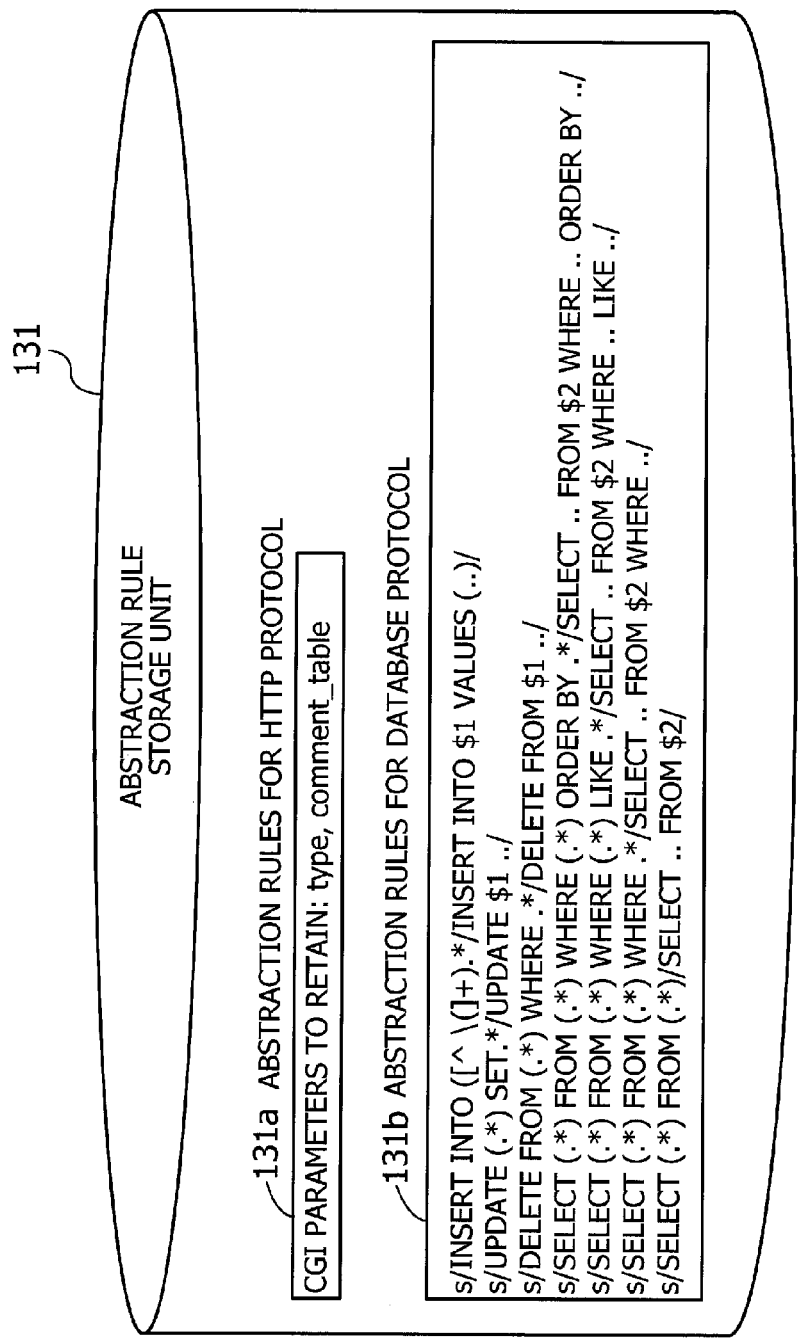
FIG. 9 illustrates an exemplary data structure of an abstraction rule storage unit.

FIG. 9 illustrates an exemplary data structure of the abstraction rule storage unit 131. The illustrated abstraction rule storage unit 131 stores a set of abstraction rules for each different protocol. In the case of, for example, HTTP protocol messages, the message flow detection unit 132 determines job categories from a command name, local address in URL, and Common Gateway Interface (CGI) parameters designated as "to retain." Command names include "GET" and "POST," for example. Local address in URL is what remains when the first portion "protocol_name://host name:port_number" is removed from a given URL. The illustrated abstraction rules 131*a* for HTTP protocol specify which CGI parameters to retain. In the example of FIG. 9, the abstraction rules 131*a* specify that two parameters named "type" and "comment_table" are to be retained while others are to be removed.

In the case of database protocol messages, the message flow detection unit 132 first replaces their protocol-specific command names and SQL statements in accordance with replacement rules described by using regular expressions, thereby abstracting the given messages. The message flow detection unit 132 then determines job categories based on the abstracted message content. That is, the illustrated abstraction rules 131*b* for database protocol define several specific replacement rules by using regular expressions. In the example of FIG. 9, those replacement rules follow the syntax of the Perl programming language. See, for example, the first line "s/INSERT INTO ([ˆ ¥(]+).*/INSERT INTO $1 VALUES ( . . . )/" of the replacement rules. The topmost letter "s" indicates a replacement. Character string "INSERT INTO ([ˆ ¥(]+).*" delimited by the first "/" and second "/" is the source string to be replaced with another string. Character string "INSERT INTO $1 VALUES ( . . . )" delimited by the second "/" and third "/" is the replacement string that is to replace the source string. The source string contains a character string inside the parentheses, which will be recorded as a variable. In the case of the first line, this variable is described as a regular expression "[ˆ¥(]+" representing one or more repetitions of any character other than the left parenthesis "(". Such character strings enclosed by the parentheses "(" and ")" are numbered and recorded in the left-to-right order. That is, the k-th recorded character string is given a variable named $k, where k is an integer greater than zero. Those variables are specified in the replacement string so that corresponding character strings in the source string will be inserted to the variables' respective positions in the replacement string.

Request messages are abstracted according to the above-described abstraction rules. The message flow detection unit 132 then recognizes request messages having the same abstracted content as being of the same job category.

FIG. 10 illustrates exemplary job categories of HTTP protocol. In this example of FIG. 10, a variety of job category names for HTTP protocol are each associated with a specific command name and abstracted job details. For example, job category "W1" is associated with a command named "GET"

and a description of job details which reads "/RUBBOS/SERVLET/EDU.RICE.RUBBOS.SERVLETS.STORIESOFTHEDAY."

FIG. 11 illustrates exemplary job categories of database protocol. In this example of FIG. 11, a variety of job category names for HTTP protocol are each associated with a specific command name and abstracted job details. For example, job category "D1" is associated with a command named "EXECREADREQ" and a description of job details which reads "SELECT . . . FROM STORIES, USERS WHERE . . . ."

Upon completion of the abstraction processing of messages, the message flow detection unit 132 seeks associated messages to detect a message flow formed from such associated messages. More specifically, a message flow is a time series of associated messages that are issued by the tiers using their specific protocols during the course of conducting a single particular transaction. Suppose, for example, that an upper-tier protocol sends a message to a lower-tier server. This message invokes some processing in the receiving server, thus causing the lower-tier protocol to send some messages. In this case, the initiating message from the upper-tier protocol is associated with the resulting messages from the lower-tier protocol. Such message-associating operation is conducted throughout those inter-tier protocols, from the lowest to the highest, thereby reproducing the entire sequence of message exchanges that constitute a transaction.

Figure 12:
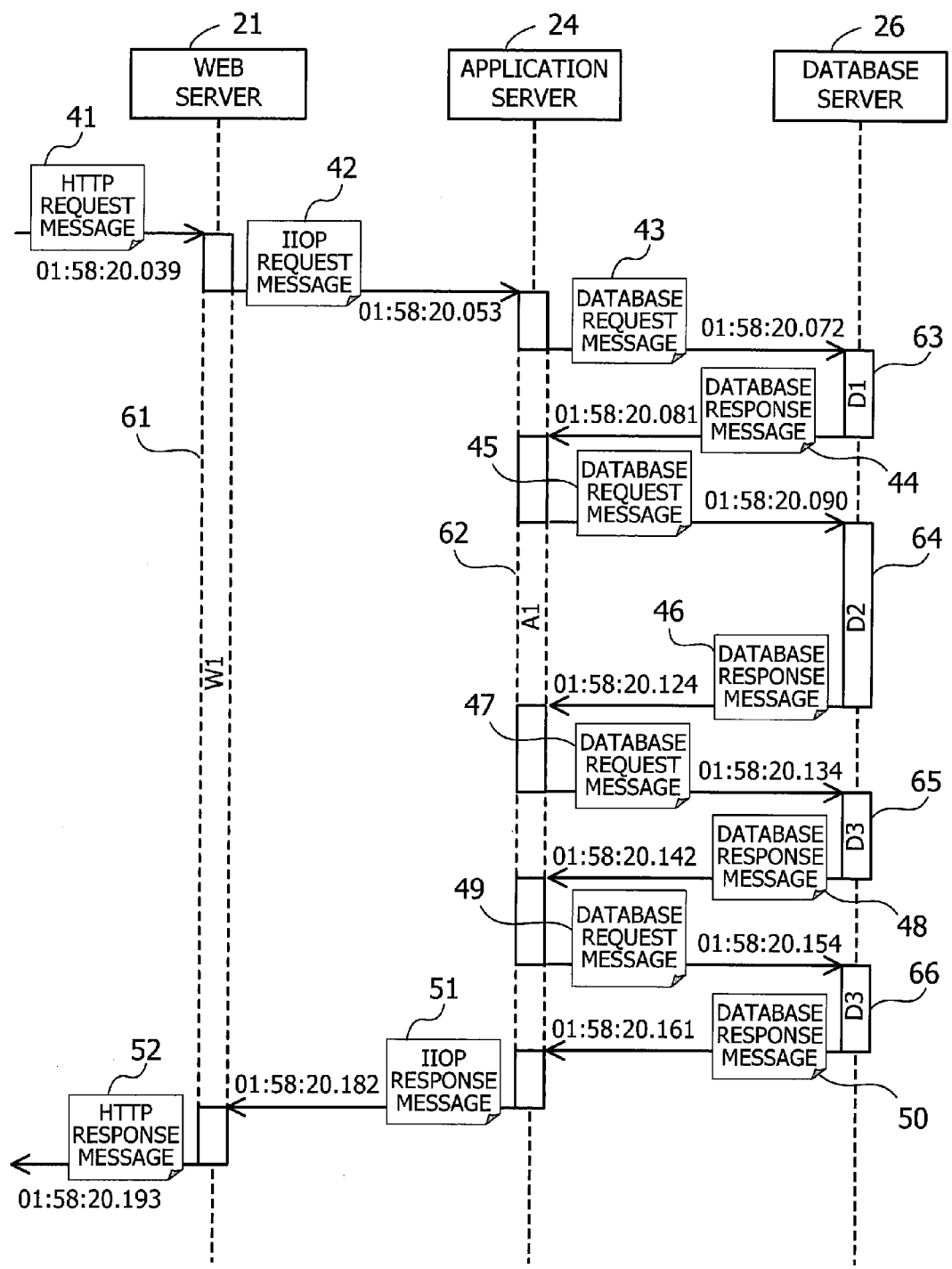
FIG. 12 illustrates an exemplary message flow in which job categories are identified.

FIG. 12 illustrates an exemplary message flow in which job categories are identified. In this example of FIG. 12, each solid-line box represents the period in which a server executes processing related to a given job, while each broken-line box represents the period in which the server is engaged in some other things not related to that job. The latter period actually means, for example, when the server waits for a response message from a lower-tier server after having sent a request message to that server.

Specifically, in the example of FIG. 12, one web server 21 starts executing a job 61 of job category W1 in response to an HTTP request message 41. During this course, the web server 21 sends an IIOP request message 42 to the application server 24. In response to this IIOP request message 42, the receiving application server 24 starts executing a job 62 of job category A1. During the job 62, the application server 24 sends a database request message 43 to the database server 26. The database server 26 thus starts executing a job 63 of job category D1 in response to the database request message 43. Upon completion of this job 63, the database server 26 then sends a database response message 44 back to the application server 24.

Subsequently, the application server 24 sends more database request messages 45, 47, and 49 to the database server 26, and the database server 26 returns their respective database response messages 46, 48, and 50 to the application server 24 individually. During this course, the database server 26 executes jobs 64, 65, and 66 respectively initiated by the three database request messages 45, 47, and 49.

The database response message 50 permits the application server 24 to resume the pending job 62 of job category A1. Upon completion of this job 62, the application server 24 sends an IIOP response message 51 to the web server 21. The IIOP response message 51 permits the web server 21 to resume its pending job 61 of job category W1. Upon completion of this job 61, the web server 21 sends an HTTP response message 52 to the terminal that originated the HTTP request message 41.

Figure 13:
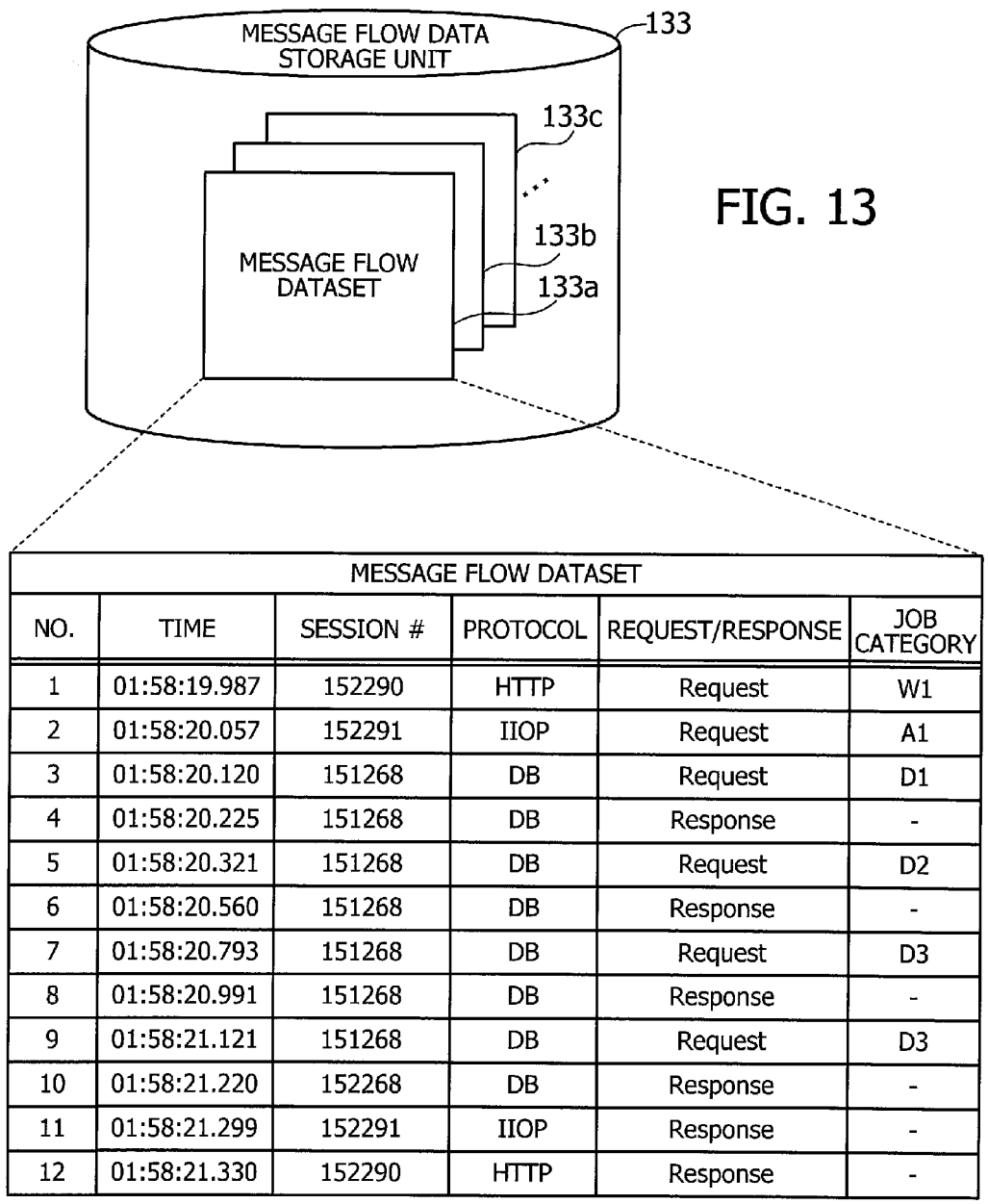
FIG. 13 illustrates an exemplary data structure of a message flow data storage unit.

The message flow detection unit 132 stores the information describing message flows in the message flow data storage unit 133. This information, or message flow datasets, includes job category information. FIG. 13 illustrates an exemplary data structure of the message flow data storage unit 133. The illustrated message flow data storage unit 133 stores a plurality of message flow datasets 133a, 133b, 133c, . . . corresponding to different transactions.

Specifically, each record of the message flow dataset 133a has multiple data fields named as follows: "Number" (No.), "Time," "Session Number" (Session#), "Protocol," "Request/Response," and "Job Category." The data values arranged in the horizontal direction are associated with each other, thus forming a record describing one message.

The number field contains a number for distinguishing the record from others. The time field indicates the capture time of a communication packet of the message. The session number field contains a session number for distinguishing a specific session used to transmit the message. The protocol field indicates the protocol of the message. The request/response field indicates whether the message is a request or a response. The job category field contains a job category name indicating what type of job is requested by the message if it is a request message. For example, the illustrated message flow dataset 133a includes a record with the following values: "1" in number field, "01:58:19.987" in time field, "152290" in session number field, "HTTP" in protocol field, "Request" in request/response field, and "W1" in job category field.

It is noted here that the time field in the example dataset of FIG. 13 indicates the time with a precision on the order of milliseconds. The embodiments are, however, not limited by this specific example. The time may be recorded in smaller time units (e.g., microseconds). It is also noted that the session number field of message flow datasets contains only a minimum amount of information necessary for identifying a particular request-response pair, whereas the original session number includes more information as seen from the session number field 122c in FIG. 8. The rest of this description uses the term "session number" to refer to its simplified version used in the message flow dataset 133a.

Each message flow dataset contains communication time information of individual messages constituting a message flow, which was measured on the basis of captured packets. When a processing request message arrives at a certain tier, and it causes the tier to send a processing request message to a lower tier, the relationship of those events can be recognized as successive message transmissions in the message flow. For example, when the message flow includes a request message of protocol "IIOP" followed by a request message of protocol "Database," this means that the latter "Database" request message was issued in connection with the former "IIOP" request message. Also, when it is observed that an upper tier issues a request message to a lower tier and receives a response message within a certain period of time, request messages produced by the lower tier during that period are considered to be caused by the upper tier's request message.

As can be seen from the above description, the second embodiment captures IP packets flowing over the network, obtains information about transmitted messages from the captured packets, and produces message flow datasets each indicating a series of processing operations. Advantageously the proposed method imposes no extra burden on the system under observation, thus making it possible to observe the real behavior of the system. Also the second embodiment captures data at a single server, and with a single source of time stamps, thus being free from the problem of time-base differences among servers.

It is noted that the second embodiment assumes that the messages carry no particular information that associates them with each other. For this reason, the message flow detection unit 130 uses transaction models with which an observed series of messages are compared. As another possible implementation, messages may be configured to have some indication of their association. For example, the topmost servers (i.e., web servers 21, 22, and 23 in the present case) may place an identifier of an ongoing transaction in their messages to indicate that those messages are transmitted as part of a specific transaction invoked by a received request message. In this case, the message flow detection unit 130 may be able to produce a message flow by extracting messages having the same identifier.

The embodiments are, however, not limited by the above-described method of producing message flow datasets. There are several other methods to obtain the exact transmission and reception times of each message flowing among a plurality of tiers related to individual transactions. For example, one method uses log files of messages transmitted and received by the web servers 21, 22, and 23, application servers 24 and 25, and database server 26 constituting a three-tier Web system. In this alternative method, each server associates a received message with other messages produced in connection with the received message and stores information on such association of messages as log records in an HDD or other storage device. The analysis server 100 collects those log records from the web servers 21, 22, and 23, application servers 24 and 25, and database server 26.

The above-described alternative method relies on the web servers 21, 22, and 23, application servers 24 and 25, and database server 26 in determining the association between a received request message and its consequent request messages to low-tier servers. This makes it easier for the analysis server 100 to find upper-tier messages and their associated lower-tier messages in a single transaction, and to create message flow datasets. To implement this method, however, it is preferable for the web servers 21, 22, and 23, application servers 24 and 25, and database server 26 to synchronize their internal clocks precisely with each other.

A message flow dataset is a collection of data records that indicate transmit and receive times of job-to-job request messages and response messages that the servers exchanged during a specific transaction in the multi-tier system. Such message flow datasets permit the analysis server 100 to determine the processing times of jobs executed on each server during a transaction. Accordingly, the message flow datasets serve as an example of the transaction data discussed in the first embodiment.

Figure 14:
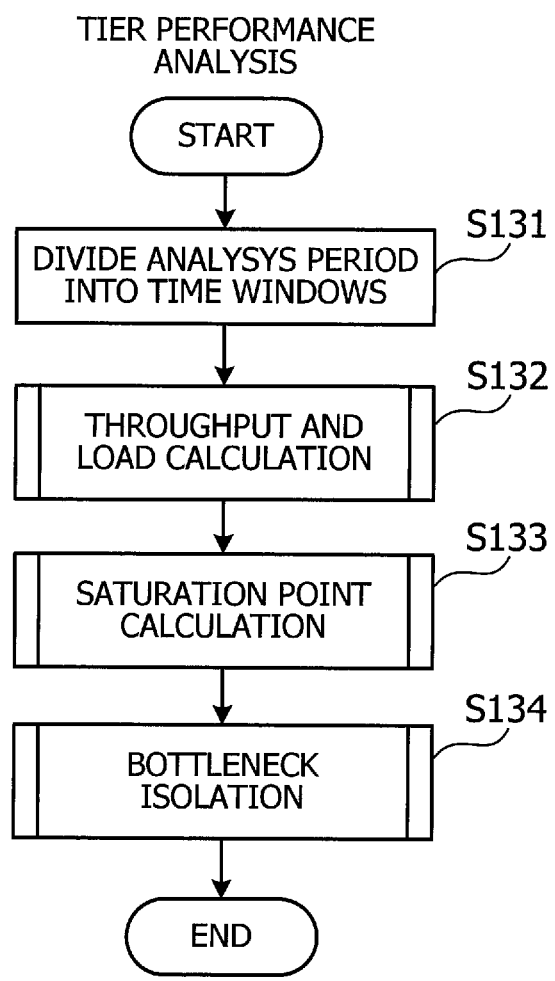
FIG. 14 is a flowchart illustrating an exemplary procedure of tier performance analysis

When every possible message flow is detected from messages in the message data storage unit 122 and made available in the message flow data storage unit 133, the analysis server 100 then proceeds to performance analysis of each tier constituting the web three-tier system. FIG. 14 is a flowchart illustrating an exemplary procedure of tier performance analysis. Each step of FIG. 14 will now be described below in the order of step numbers.

(Step S131) The data compilation unit 141 divides a given analysis period with a sufficiently fine granularity. This "analysis period" refers to the time period in which the capturing of IP packets has been conducted. The currently selected time series data in the capture data storage unit 112 has been produced from those IP packets. The dividing of the analysis period produces a plurality of time windows. For example, the time window data storage unit 142 stores information describing details of each time window.

(Step S132) The data compilation unit 141 calculates throughput and load values in each time window. Details of this step S132 will be described later with reference to FIG. 18.

(Step S133) The performance analysis unit 144 calculates a saturation point. Details of this step S133 will be described later with reference to FIG. 24.

(Step S134) The performance analysis unit 144 determines whether the currently selected tier is a performance bottleneck. Details of this step S134 will be described later with reference to FIG. 25. The performance analysis unit 144 then exits from the present process of tier performance analysis.

The following sections (a1) to (a4) will provide details of each of the four steps of FIG. 14.

(a1) Time Window Definition

The data compilation unit 141 divides a given analysis period into a plurality of time windows with a sufficiently fine granularity. In actual implementations of the second embodiment, it is considered appropriate to select a sufficiently small step size for the time windows since the load may vary in a very short time comparable to the average processing time of jobs. For example, the length of time windows is set to 100 ms.

Figure 15:
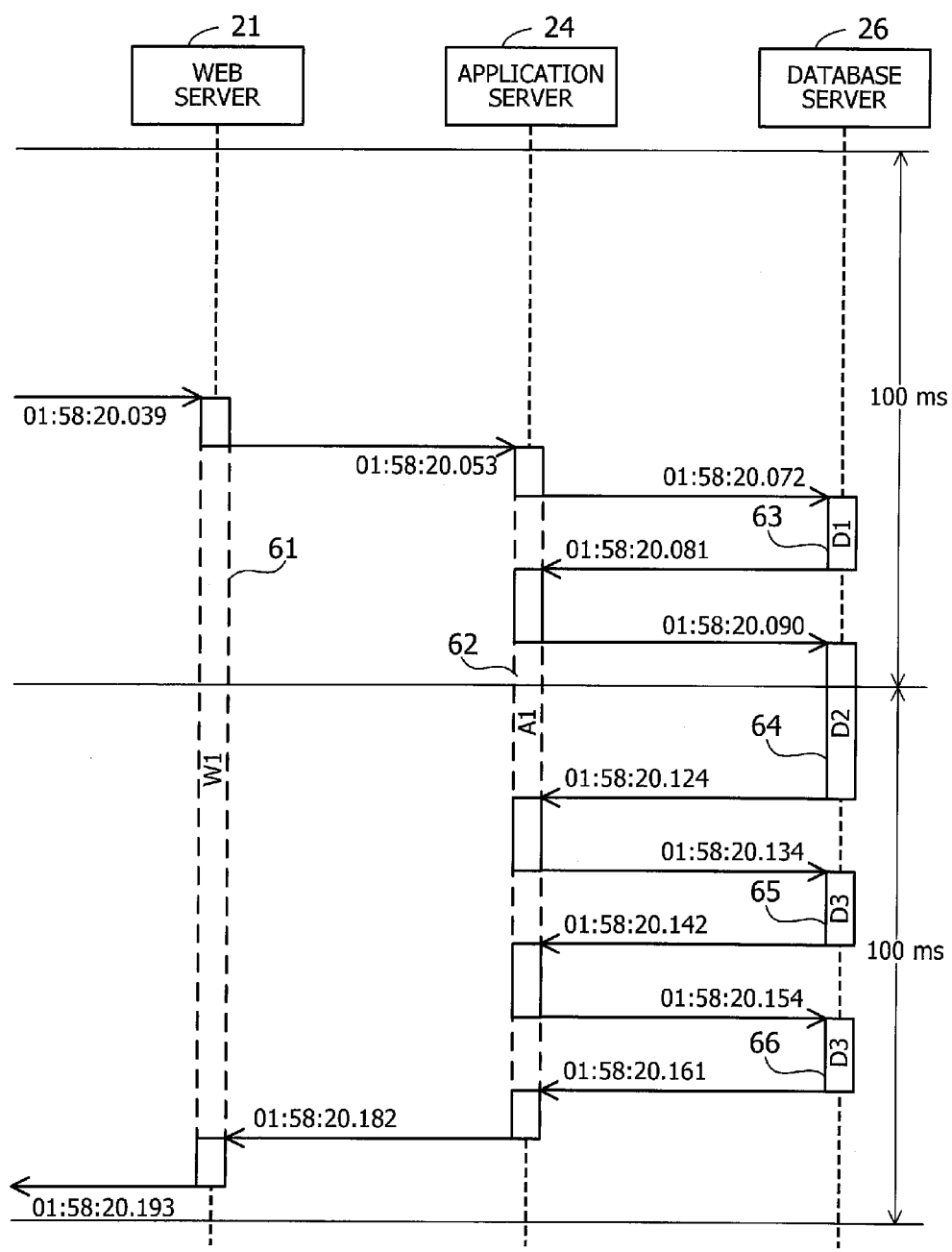
FIG. 15 illustrates an example of time windows.

FIG. 15 illustrates an example of time windows. In the example of FIG. 15, the analysis period is divided into a plurality of 100-ms time windows. According to the second embodiment, the time window length is previously set as a configuration parameter of the data compilation unit 141. As can be seen from FIG. 15, each job execution period is distributed at least one of those time windows. The resulting time series data of each time window is very short in length.

Figure 16:
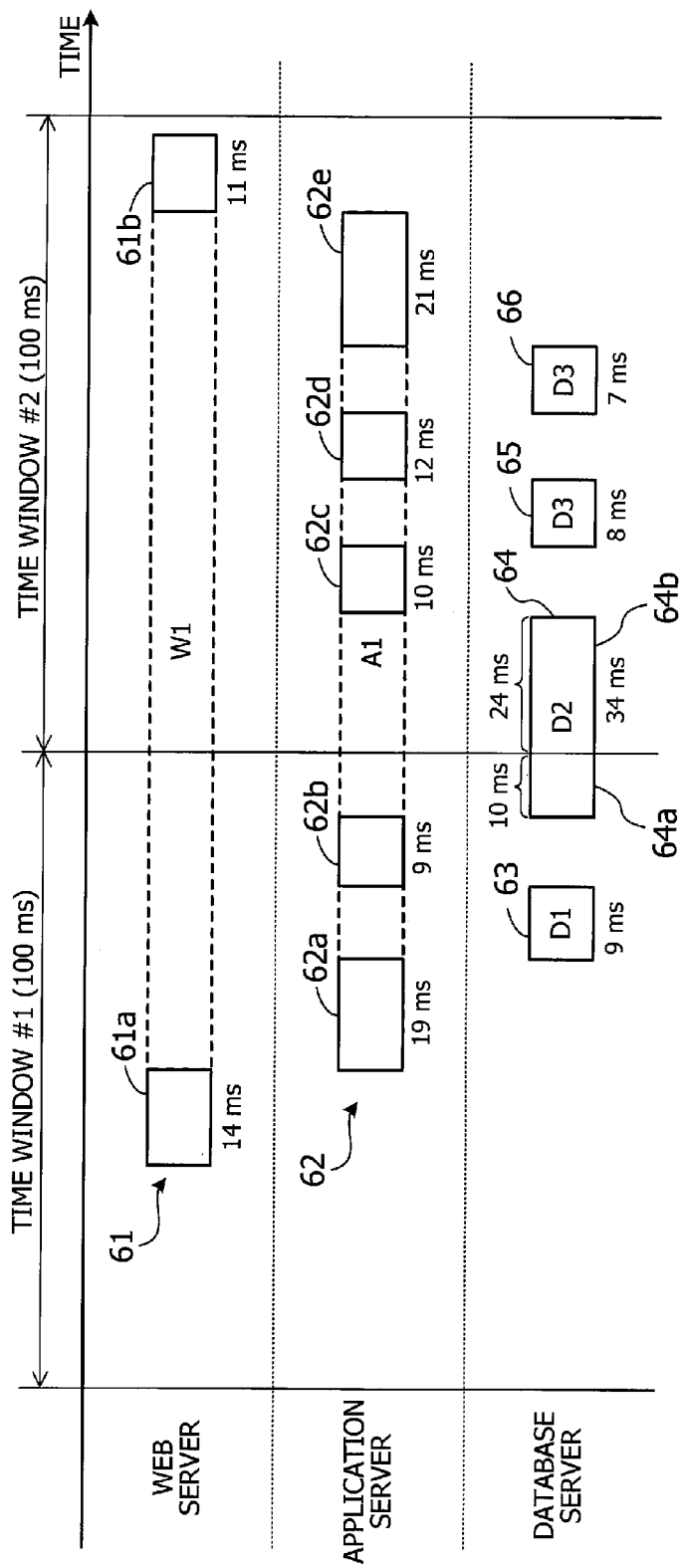
FIG. 16 illustrates an example of how execution periods are distributed among successive time windows.

FIG. 16 illustrates an example of how execution periods are distributed among successive time windows. The web server 21 executes a job 61 in two discrete execution periods 61*a* and 61*b*. The first execution period 61*a* belongs to time window #1 since it is entirely contained in that window period. Similarly the second execution period 61*b* belongs to time window #2 since it is entirely contained in that window period.

The application server 24, on the other hand, executes its job 62 in five discrete execution periods 62*a*, 62*b*, 62*c*, 62*d*, and 62*e*. The first and second execution periods 62*a* and 62*b* belong to time window #1 since they are entirely contained in that window period. The third to fifth execution periods 62*c*, 62*d*, and 62*e* belong to time window #2 since they are entirely contained in that window period.

The database server 26 executes four jobs 63 to 66, each in a single continuous execution period. The first job 63 belongs to time window #1 since it is executed within that window period. The third and fourth jobs 65 and 66 belong to time window #2 since they are both executed within that window period. The second job 64, unlike the others, is executed across time window #1 and time window #2. As seen, an execution period may extend beyond the boundary of time windows, in which case the execution period of that job belongs to a plurality of time windows. This type of execution periods will be divided into two or more periods such that each divided period belongs to a different time window. Regarding the job 64, its execution period is divided into two portions, a leading execution period 64*a* belonging to time window #1 and a trailing execution period 64*b* belonging to time window #2. These two divided execution periods 64*a* and 64*b* are thus distributed to separate time windows.

Figure 17:
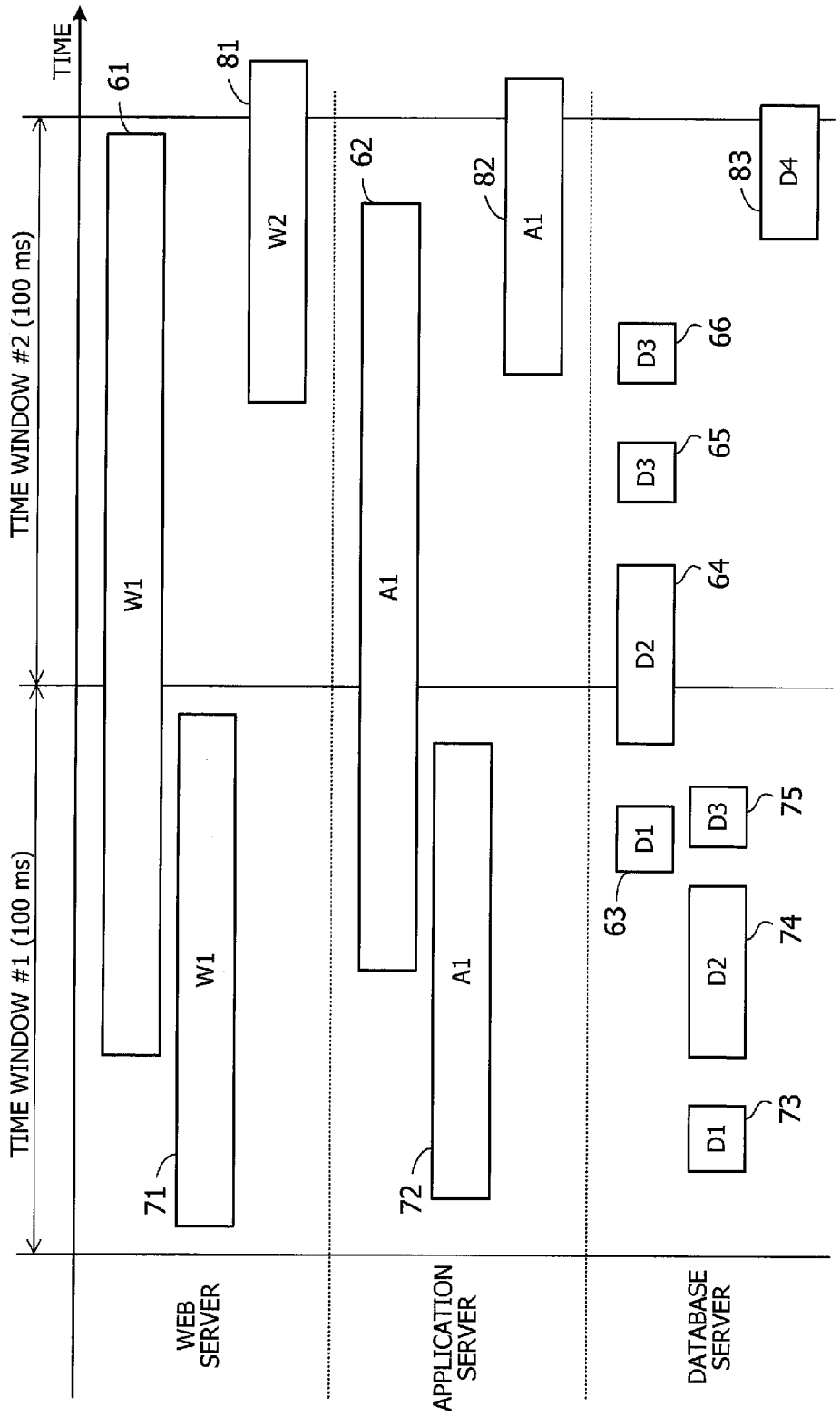
FIG. 17 illustrates an example how processes are executed in parallel.

The foregoing examples of FIG. 15 and FIG. 16 illustrate a series of processing operations initiated by a single transaction. However, the servers in different tiers may execute a plurality of transactions in a parallel fashion. FIG. 17 illustrates an example how processes are executed in parallel. In this example, the system is executing three transactions concurrently during the period of time windows #1 and #2. Specifically, jobs 61 to 66 accomplish one transaction. Jobs 71 to 75 accomplish another transaction. Jobs 81 to 83 accomplish yet another transaction. The letters seen in each box indicate the category of the job. The execution periods of those jobs in parallel transactions are distributed across time windows, depending on which time window contains which execution period, similarly to the case of FIG. 16.

Figure 18:
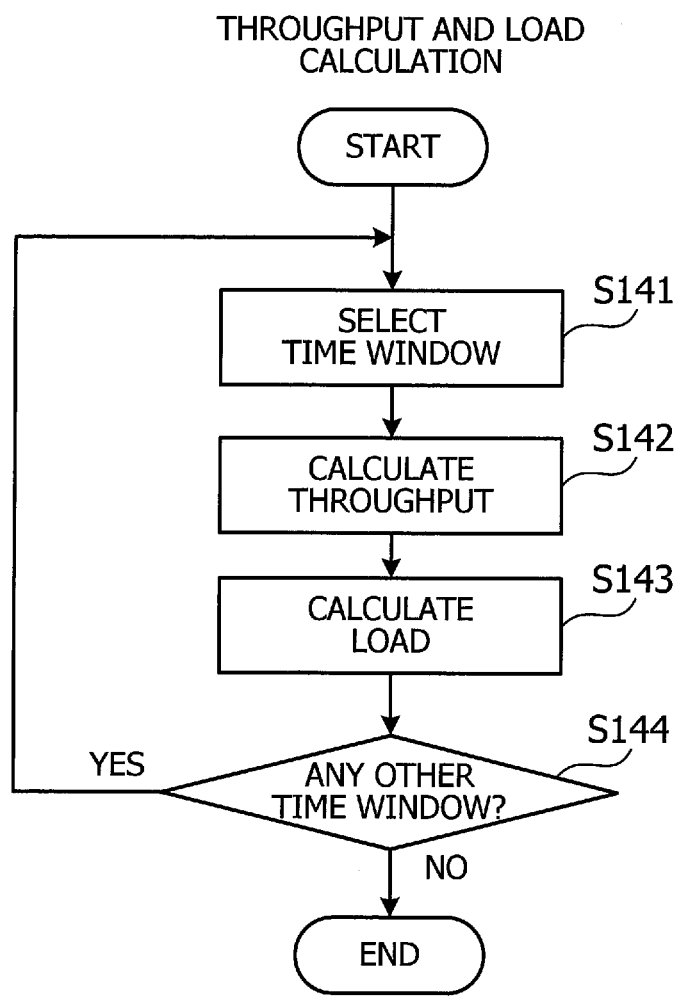
FIG. 18 is a flowchart illustrating an exemplary procedure of throughput and load calculation.

The calculation of throughput and load will now be described in detail below. FIG. 18 is a flowchart illustrating an exemplary procedure of throughput and load calculation. Each step of FIG. 18 will now be described below in the order of step numbers.

(Step S141) The data compilation unit 141 selects a time window that has not been subjected to the calculation. For example, the data compilation unit 141 selects the entries of time windows in the time window data storage unit 142 one by one, from the topmost entry to the endmost entry.

(Step S142) The data compilation unit 141 calculates a throughput value in the selected time window. For example, the data compilation unit 141 calculates a weighted sum of throughput values of individual jobs depending on their respective job categories, thereby outputting an accurate throughput value of the selected time window in which a plurality of jobs with different processing workloads are handled. For the purpose of weighting, the data compilation unit 141 uses normalized per-job throughput values determined for different job categories, as will be described in a separate section. The data compilation unit 141 stores the calculated throughput value in the time window data storage unit 142, for example.

(Step S143) The data compilation unit 141 then calculates a load in the selected time window. For example, the data compilation unit 141 first calculates a sum of processing times in the selected time window, for the jobs executed in the tier under analysis. The data compilation unit 141 then divides the sum by the time window length to obtain a load value in the time window. This load value thus represents an average load in a given time window. The data compilation unit 141 stores the calculated load value in the time window data storage unit 142, for example.

(Step S144) The data compilation unit 141 determines whether there are any other time windows that have not been subjected to the above processing of steps S141 to S143. For example, the data compilation unit 141 checks the remaining entries of time windows in the time window data storage unit 142. If the last entry has already been reached, the data compilation unit 141 determines that there are no pending time windows. When a pending time window is found, the data compilation unit 141 returns to step S141 to continue the process. When there is no pending process, the data compilation unit 141 exits from this process of throughput and load calculation.

Figure 19:
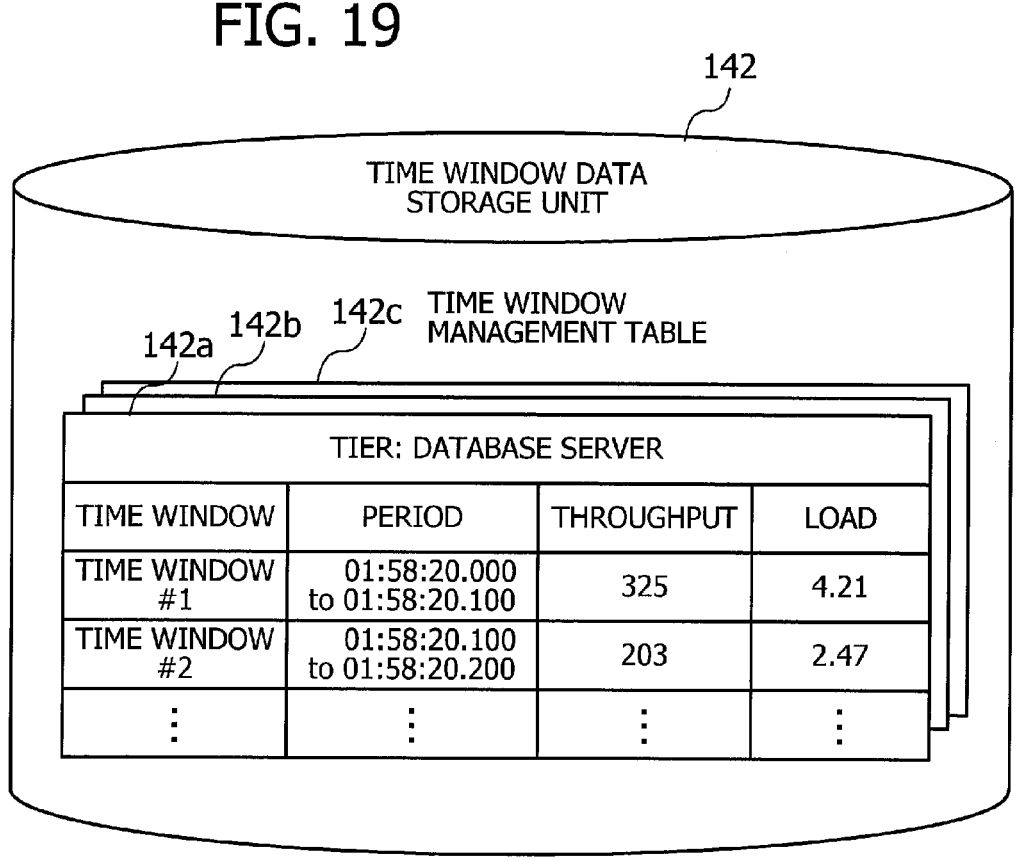
FIG. 19 illustrates an exemplary data structure of a time window data storage unit at the time of performance analysis.

FIG. 19 illustrates an exemplary data structure of a time window data storage unit at the time of performance analysis. The illustrated time window data storage unit 142 contains a plurality of time window management tables 142a, 142b, and 142c, one for each different tier. For example, the time window management table 142a corresponds to the database tier to which the database server 26 belongs.

The time window management table 142a has four data fields titled "Time Window," "Period," "Throughput," and "Load." The time window field contains the name of a time window. The period field provides details of the period of that time window. The throughput and load fields respectively contain throughput and load values calculated for the time window.

(a2) Calculation of Throughput and Load Values

This section will describe in detail how the throughput and load values are calculated.

(i) Calculation of Throughput Values

The throughput values are calculated as follows.

The data compilation unit 141 executes this calculation for each individual time window, on the basis of processing times of the jobs that belong to that time window. During this course, the data compilation unit 141 applies appropriate weighting coefficients to those jobs, taking into consideration the difference between job categories, thereby calculating a normalized throughput.

The throughput normalization offers several advantages as will be described below. According to the second embodiment, the analysis period is subdivided into short time windows to observe the relationships between load and throughput. Without normalization, the performance analysis could fail to determine correct relationships between load and throughput because the following two factors introduce some disturbance into the observation of those two variables, which degrades the credibility of the bottleneck isolation based on load-throughput correlation. The factors are: (i) Differences in hardware resource consumption among dissimilar kinds of jobs, and (ii) Differences in hardware resource consumption among individual jobs of the same kind.

The former factor is particularly dominant in terms of the absolute amount of differences, since shorter time windows mean smaller chances for different kinds of jobs to run together in a single time window. The latter factor, on the other hand, is expected to have a somewhat averaged distribution (e.g., normal distribution or the like) because of the similarity of jobs.

In consideration of the above, the second embodiment is configured to normalize the differences in hardware resource consumption among dissimilar kinds of jobs by using a set of data describing average processing time of each job category, which has been measured in low workload conditions. The second embodiment copes with the former factor in this way and can thus obtain correct throughput values. To achieve the normalization, the second embodiment determines how to weight different job categories. The information necessary for this determination is previously stored in the normalized throughput value storage unit 143.

Figure 20:
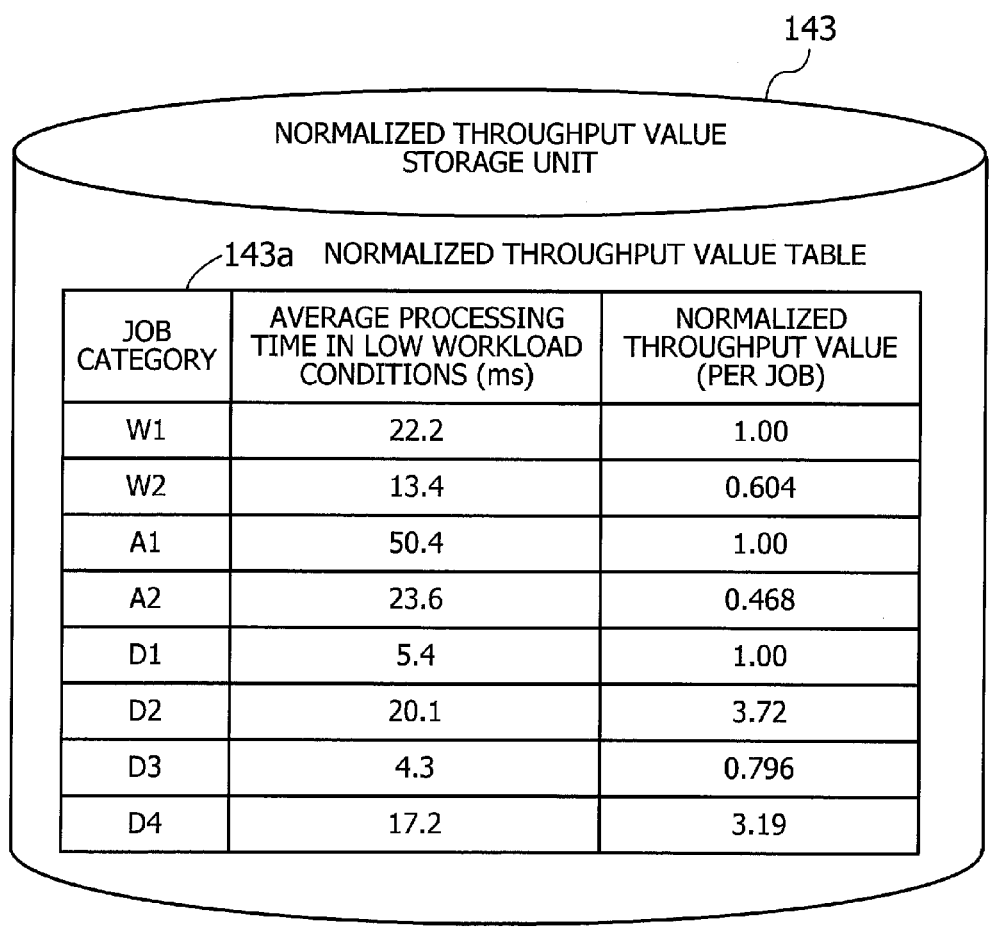
FIG. 20 illustrates an exemplary data structure of a normalized throughput value storage unit.

FIG. 20 illustrates an exemplary data structure of the normalized throughput value storage unit 143. The illustrated normalized throughput value storage unit 143 contains a normalized throughput value table 143a formed from three data fields titled "Job Category," "Average Processing Time in Low Workload Conditions," and "Normalized Throughput Value."

Specifically, the job category field of each table entry contains a job category name of jobs executed by a server in the web three-tier system. The next data field titled "Average Processing Time in Low Workload Conditions" indicates an average processing time of the corresponding job category in the case where servers execute jobs of that category under low workload conditions. In the example of FIG. 20, the average processing times are represented in units of ms. For example, the normalized throughput value table 143a stores average processing times previously measured by an administrator of the web three-tier system when the system workload is low.

The normalized throughput value field contains a per-job throughput value which is normalized for each corresponding job category in the way described below. For example, one representative job category is selected for each tier. Referring to the example of FIG. 20, job category W1 is selected as the representative job category of jobs executed by web servers 21, 22, and 23. Likewise, job category A1 is selected as the representative job category of jobs executed by application servers 24 and 25, and job category D1 is selected as the representative job category of jobs executed by a database server 26. Those representative job categories are given a normalized per-job throughput value of 1.00.

On the other hand, the normalized per-job throughput values of non-representative job categories are calculated as the ratio of their average processing time in low workload conditions to that of the representative job category for the same tier. For example, the average processing time of job category W2 in low workload conditions is 0.604 times that of the representative job category W1 (i.e., 13.4 ms/22.2 ms=0.604). Accordingly the normalized per-job throughput value of job category W2 is set to 0.604.

With those normalized per-job throughput values, the data compilation unit 141 calculates an average throughput for each subdivided time window. More specifically, the data compilation unit 141 weights throughput values on the basis of average processing times of different job categories which were measured in low workload conditions. For example, the data compilation unit 141 first gives a base score of 1 to each job's throughput (from request to response). The data compilation unit 141 then calculates weighted scores of the executed jobs by weighting their base scores with relevant normalized per-job throughput values. Further, in the case where a job is executed across two or more time windows, the data compilation unit 141 allocates the score of that job among those time windows in proportion to each time window's share in the entire execution period of the job. In the case where a job is executed within a single time window, the whole score of that job is allocated to that time window. The data compilation unit 141 then adds the distributed scores to the respective throughput values of time windows. The above-described throughput values in successive time windows indicate temporal changes of the throughput.

Figure 21:
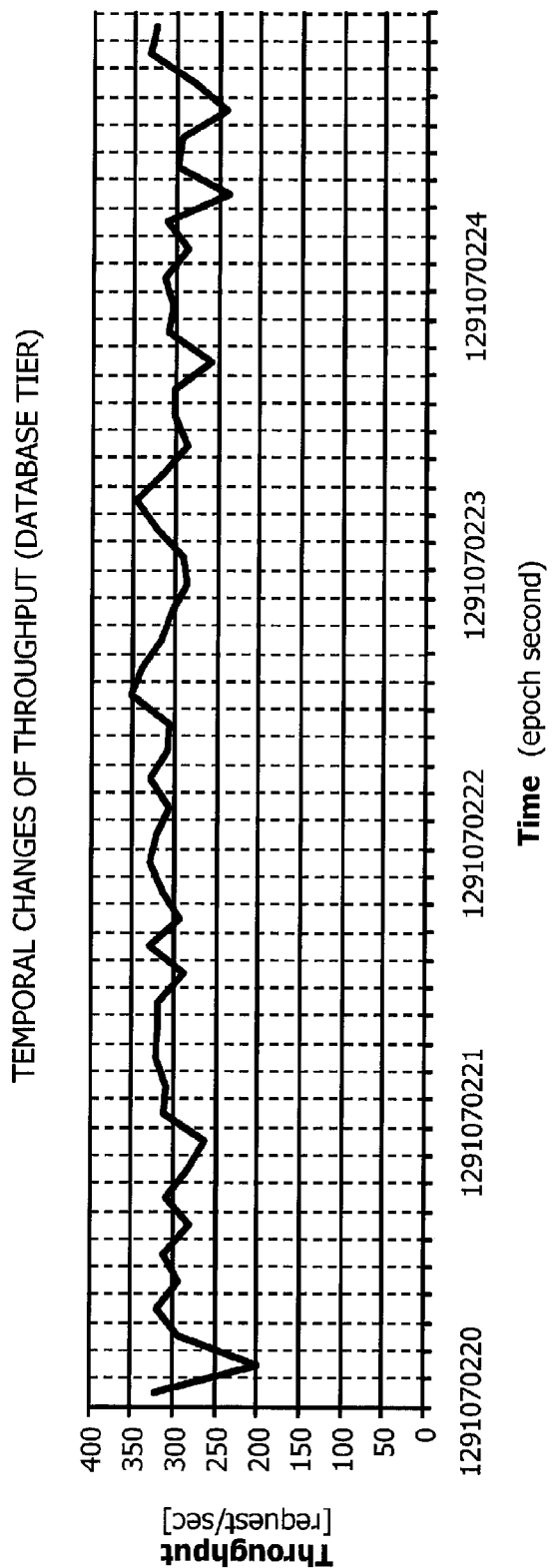
FIG. 21 depicts an example of temporal changes of throughput.

FIG. 21 depicts an example of temporal changes of throughput. Specifically, FIG. 21 is a graph that indicates how the throughput of the database server 400 varies with time. The horizontal axis of this graph represents time, and the vertical axis represents throughput. Each tick of the horizontal axis corresponds to one time window.

(ii) Calculation of Load Values

The load values are calculated as follows. In the context of the second embodiment, the term "load" refers to the average number of jobs executed concurrently in a given time window. The load in this sense can be calculated as follows.

[Load]=[Total job processing time in time window]/
[Time window length]

Here the "job processing time" in a tier only includes the period when the tier actually processes its jobs. It is noted that a tier other than the bottommost tier may delegate a part of its job to a lower tier and waits for a response from the lower tier. Such response waiting times have to be excluded from the job processing time of that tier.

Referring again to the example of FIG. 16, the load values of each tier are calculated below. In the tier of the web servers 21, 22, and 23, the load in time window #1 is 0.14 (=14/100), and that of time window #2 is 0.11 (~11/100). In the tier of the application servers 24 and 25, the load in time window #1 is 0.28 (=(19+9)/100), and that of time window #2 is 0.43 (=(10+12+21)/100). In the tier of the database server 26, the load in time window #1 is 0.19 (=(9+10)/100), and that in time window #2 is 0.39 (=(24+8+7)/100).

The same calculation method also applies to the cases where a plurality of transactions are running concurrently as in FIG. 17. That is, the processing times of a plurality of transaction jobs are added up for each time window, regardless of what kind of jobs they are. The resulting sum is then divided by the time window length.

Figure 22:
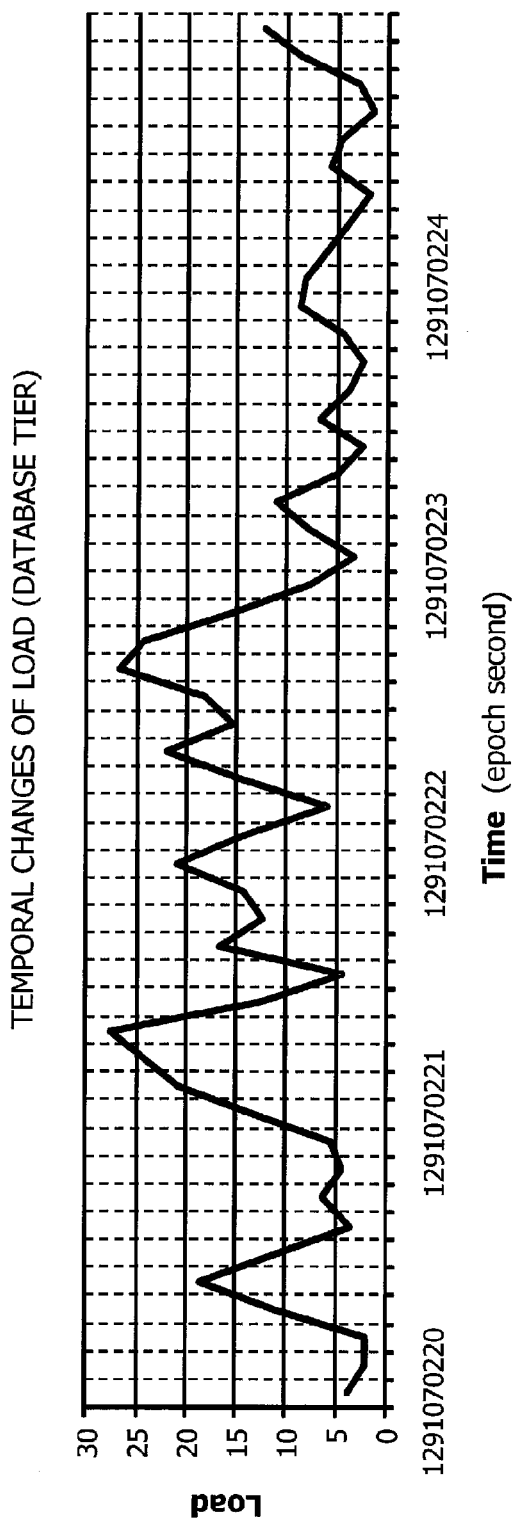
FIG. 22 depicts an example of temporal changes of load.

The load values calculated above for successive time windows form a time series indicating temporal changes of the load. FIG. 22 depicts an example of temporal changes of load. Specifically, FIG. 22 is a graph that indicates how the throughput of the database server 400 varies with time. The horizontal axis of this graph represents time, and the vertical axis represents load. Each tick of the horizontal axis corresponds to one time window.

(a3) Calculation of Saturation Point

This section will describe a detailed process of calculating a saturation point. The performance analysis unit 144 dynamically determines a saturation point depending on the relationship between throughput and load. For example, the performance analysis unit 144 investigates the relationship between throughput values and load values calculated for time windows and determines a saturation point at which the throughput stops increasing with load.

Figure 23:
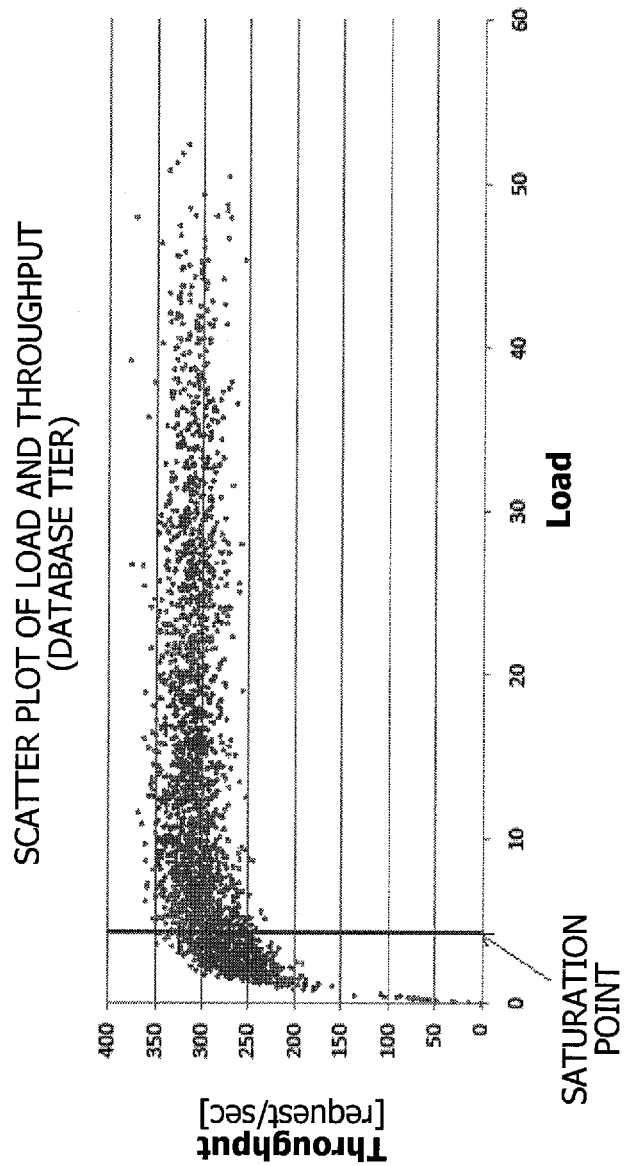
FIG. 23 is a scatter plot illustrating exemplary relationships between load and throughput.

The presence of such a point of throughput saturation can be recognized without difficulty by producing a scatter plot representing the distribution of load-throughput pairs observed in different time windows. FIG. 23 is a scatter plot illustrating exemplary relationships between load in the horizontal (X) axis and throughput in the vertical (Y) axis. The throughput and load values of each time window are plotted as a point on this load-throughput plane. As can be seen from the scatter plot of FIG. 23, the throughput increases to some extent along with an increase of load, but stops increasing when the load reaches a certain level. The performance analysis unit 144 determines this boundary line of the load as a saturation point.

Figure 24:
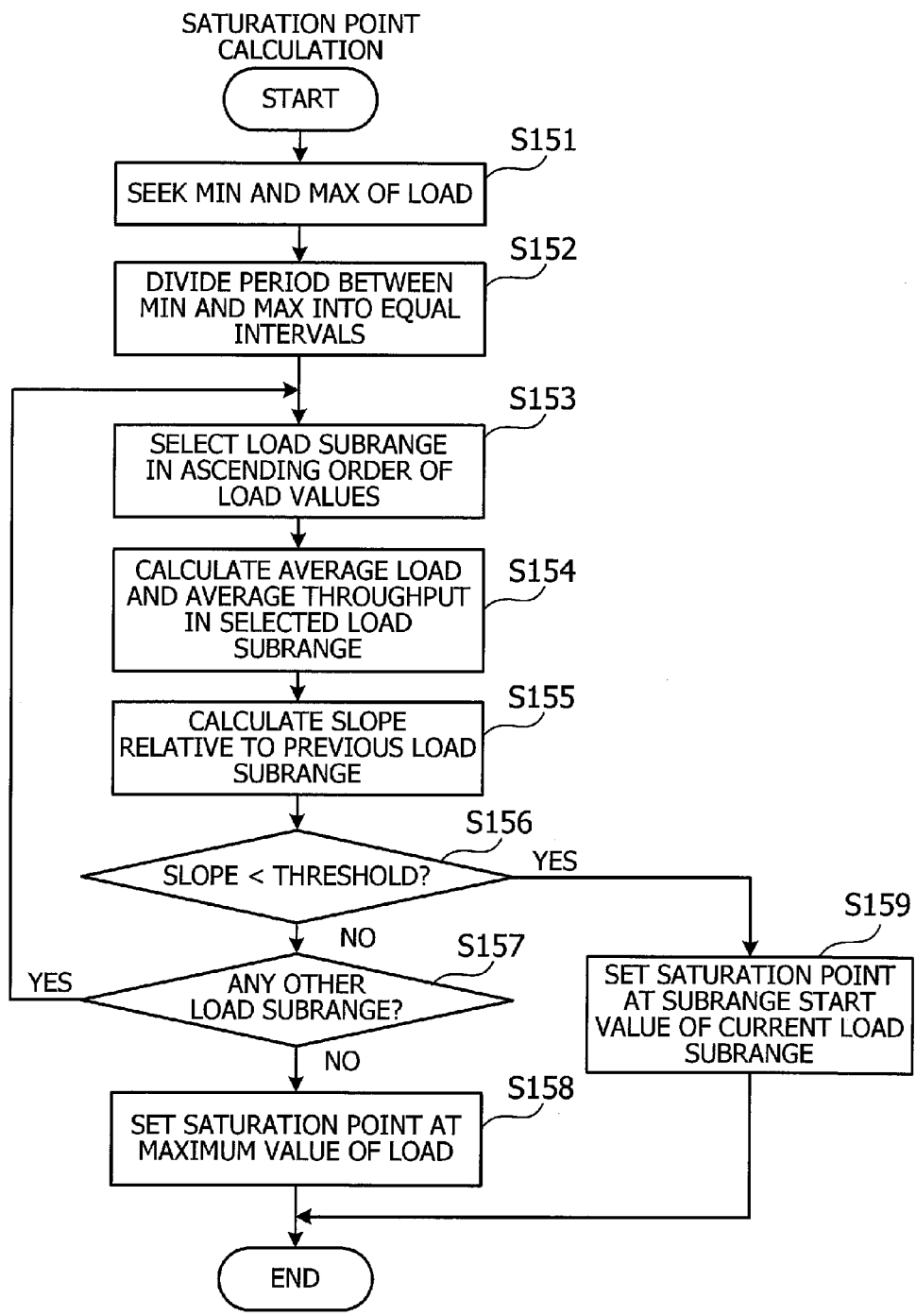
FIG. 24 is a flowchart illustrating an exemplary procedure of saturation point calculation.

FIG. 24 is a flowchart illustrating an exemplary procedure of saturation point calculation. Each step of FIG. 24 will now be described below in the order of step numbers.

(Step S151) The performance analysis unit 144 seeks the minimum and maximum load values. For example, the performance analysis unit 144 scans the load field of the time window management table of the currently selected tier, thereby extracting minimum and maximum load values.

(Step S152) The performance analysis unit 144 subdivides the range between the extracted minimum value and maximum value into equal small intervals. The resulting small sections of load are referred to herein as "load subranges." Each load subrange is delimited by its lower and upper end values. The former is referred to herein as a "subrange start value," and the latter is referred to herein as a "subrange end value."

For example, the performance analysis unit 144 subdivides the range between minimum and maximum into a predetermined number (e.g., 100) of load subranges. For example, when the minimum load is 0 and the maximum load is 50, the range between 0 to 50 is subdivided into 100 subranges with a step size of 0.5. Alternatively, the performance analysis unit 144 may subdivide the same range into a variable number of fixed-length subranges (e.g., 0.1).

(Step S153) The performance analysis unit 144 selects a load subrange in ascending order of load values.

(Step S154) The performance analysis unit 144 extracts time windows whose load values fall in the selected load subrange and calculates an average load $ld_i$ and an average throughput in the extracted time windows.

(Step S155) The performance analysis unit 144 calculates an increase rate (slope) of the throughput with respect to the load by comparing the currently selected load subrange with the previously selected load subrange (adjacent to the current one). Here the throughput slope is calculated by, for example, dividing the variation of average throughput relative to the immediately preceding load subrange by the variation of average load $ld_i$ relative to the same.

For example, let i be an integer variable from 1 to 100. The slope $\delta_i$ at the ith selected load subrange is expressed as follows:

$$\delta_i = \begin{cases} \overline{tq_i}/\overline{ld_i}: & i = 1 \\ \dfrac{\overline{tq_i} - \overline{tq_{i-1}}}{\overline{ld_i} - \overline{ld_{i-1}}}: & 1 < i \leq 100 \end{cases} \quad (1)$$

$\overline{ld_i}$: average load of the ith load subrange $\overline{tq_i}$: average throughput of the ith load subrange (Step S156) The performance analysis unit 144 determines whether the slope calculated at step S155 is smaller than a given threshold. This threshold may be obtained by, for example, multiplying the slope $\delta_1$ at a load subrange where the average load is minimum by a specified coefficient (e.g., 0.2) smaller than one. If the slope is smaller than the given threshold (e.g., $0.2\delta_1$), the performance analysis unit 144 advances to step S159. If the slope is equal to or greater than the given threshold, the performance analysis unit 144 advances to step S157.

(Step S157) The performance analysis unit 144 determines whether there are any other time windows that have not been subjected to the above processing of steps S153 to S156. When such a pending load subrange is found, the performance analysis unit 144 returns to step S153. When it is found that all load subranges have been finished, the performance analysis unit 144 proceeds to step S158.

(Step S158) This step is reached because the slope is equal to or greater than the threshold in every load subrange. Accordingly the performance analysis unit 144 sets a saturation point to the maximum value of load obtained at step S151 and terminates the process of saturation point calculation.

(Step S159) The performance analysis unit 144 sets a saturation point at the subrange start value of the currently selected load subrange.

Suppose, for example, that the slope at the ith load subrange does not fall below the threshold until the tenth subrange is reached, where the range of load between 0 to 50 is divided into 100 subranges with a step size of 0.5. The tenth load subrange ranges from 4.5 to 5.0, and the subrange start value, 4.5 (=0.5×9), is selected as the saturation point. As can be seen from this example, the performance analysis unit 144 scans the subdivided load subranges, from the lowest to the highest, to determine whether the slope falls below a specified threshold (e.g., $0.2\delta_1$). When the slope does not fall below the threshold until the ith subrange is reached, the subrange start value of the ith load subrange is selected as the saturation point.

(a4) Bottleneck Isolation

Based on the saturation point selected above, a process of bottleneck isolation is executed in the way described below. Briefly, the performance analysis unit 144 evaluates spare capacity of each tier from the ratio of time windows whose load values do not exceed the saturation point. When this ratio of a particular tier is smaller than a given value, the performance analysis unit 144 recognizes the tier as a performance bottleneck of the system.

Referring again to the scatter plot of FIG. 23, each dot corresponds to a particular time window. The plotted time windows are divided into two groups, i.e., one group having load values below the saturation point, and the other group having load values exceeding the saturation point. In the former group of time windows, the tier is considered to have some amount of room in its processing capacity. The performance analysis unit 144 therefore calculates the ratio of this group of time windows to the entire set of time windows, as an indicator of the tier's spare capacity. Suppose, for example, that the given time-series data is 180 seconds in length, which is divided into 1800 time windows with a step size of 100 ms. In the case where 385 out of 1800 time windows have small load values below the saturation point, it means that the tier had a spare capacity in 21.4% (=385/1800×100) of the time windows.

According to the second embodiment, the performance analysis unit 144 has a first threshold to compare with the ratio of time windows whose load values do not exceed the saturation point. If the ratio of such time windows is smaller than the first threshold, the performance analysis unit 144 determines that the tier is in a full-saturation state. In other words, the workload exceeds the tier's processing capacity. The performance analysis unit 144 thus sends a notice that indicates the presence of a bottleneck in the tier in full-saturation state.

According to the second embodiment, the performance analysis unit 144 also has a second threshold to compare with the ratio of time windows whose load values do not exceed the saturation point. The second threshold is higher than the first threshold noted above. If the ratio of such time windows is smaller than the second threshold, the performance analysis unit 144 determines that the tier is in a quasi-saturation state. In other words, the tier is facing a workload partly exceeding the tier's processing capacity. This indicates that the multi-tier system as a whole could be experiencing a bottleneck since a plurality of tiers simultaneously have fallen into quasi-saturation state.

Figure 25:
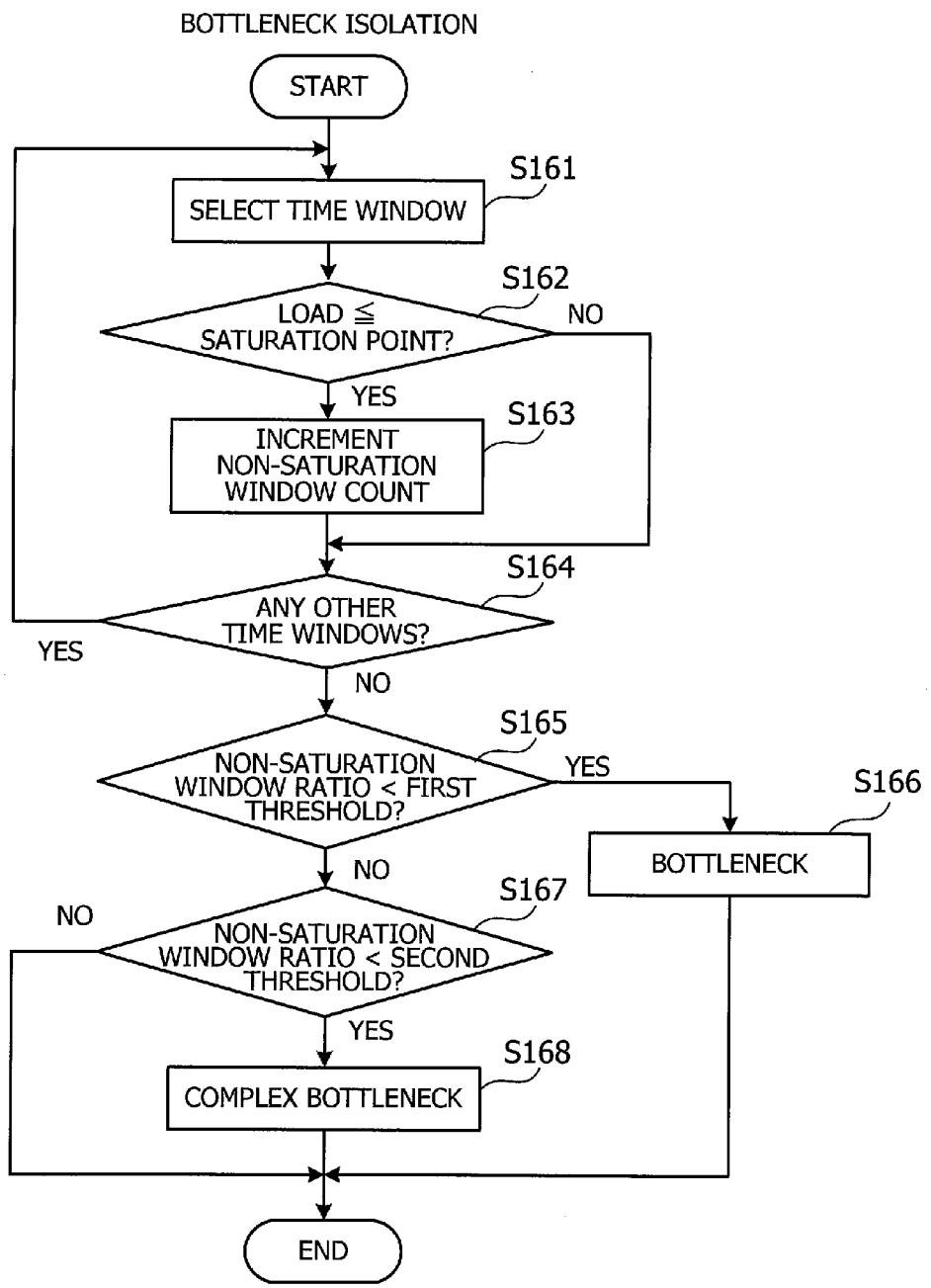
FIG. 25 is a flowchart illustrating an exemplary procedure of bottleneck isolation.

The above-outlined bottleneck isolation is accomplished as follows. FIG. 25 is a flowchart illustrating an exemplary procedure of bottleneck isolation. Each step of FIG. 25 will now be described below in the order of step numbers.

(Step S161) The performance analysis unit 144 selects a time window. For example, the performance analysis unit 144 selects time windows one by one, starting with the topmost entry of a time window management table (see FIG. 19) of the tier under analysis.

(Step S162) The performance analysis unit 144 compares the load value in the selected time window with the saturation point. If the load value is equal to or smaller than the saturation point, the performance analysis unit 144 proceeds to step S163. If the load is greater than the threshold, the performance analysis unit 144 skips to step S164.

(Step S163) The performance analysis unit 144 increments a counter of non-saturation windows. It is assumed here that this non-saturation window counter has been initialized to zero when the bottleneck isolation process is started.

(Step S164) The performance analysis unit 144 determines whether there are any other time windows that have not been subjected to the above steps. When such a pending time window is found, the performance analysis unit 144 returns to step S161. When no pending time windows are found, the performance analysis unit 144 advances to step S165.

(Step S165) The performance analysis unit 144 determines whether the ratio of non-saturation windows to the whole series of time windows is smaller than a first threshold that has previously been given to the performance analysis unit 144. Specifically, the performance analysis unit 144 calculates the ratio by dividing the number of non-saturation time windows by the total number of time windows, and then compares the resulting ratio with the given first threshold. If the ratio of non-saturation windows is smaller than the first threshold, the performance analysis unit 144 proceeds to step S166. If the ratio of non-saturation windows is equal to or greater than the first threshold, the performance analysis unit 144 proceeds to step S167.

(Step S166) The performance analysis unit 144 determines that the selected tier is causing a bottleneck of the system. The performance analysis unit 144 outputs this determination result to, for example, a screen of the monitor 11 and then exits from this process of bottleneck isolation.

(Step S167) The performance analysis unit 144 determines whether the ratio of non-saturation windows to the whole series of time windows is smaller than a second threshold. This second threshold is greater than the first threshold and has previously been given to the performance analysis unit 144. If the ratio of non-saturation windows is smaller than the second threshold, the performance analysis unit 144 proceeds to step S168. If the ratio of non-saturation windows is equal to or greater than the second threshold, the performance analysis unit 144 exits from this process of bottleneck isolation.

(Step S168) The performance analysis unit 144 determines that the currently selected tier could be a cause of a complex bottleneck of the system. This "complex bottleneck" means that the system is experiencing a bottleneck due to some combination of two or more tiers including this tier in question. The performance analysis unit 144 outputs this determination result to, for example, a screen of the monitor 11 and then exits from this process of bottleneck isolation.

As can be seen from the above steps, the second embodiment isolates a bottleneck of a multi-tier system on the basis of the ratio of non-saturation time windows that have a certain amount of spare capacity.

(b) Load Control

When at least one tier is found to be a bottleneck as a result of the above bottleneck isolation procedure, the performance analysis unit 144 informs the load control unit 145 of that bottleneck tier. The load control unit 145 recognizes the presence of a bottleneck and thus executes an analysis of allowable load, in conjunction with other functional blocks, to seek an allowable load range of the bottleneck tier.

Figure 26:
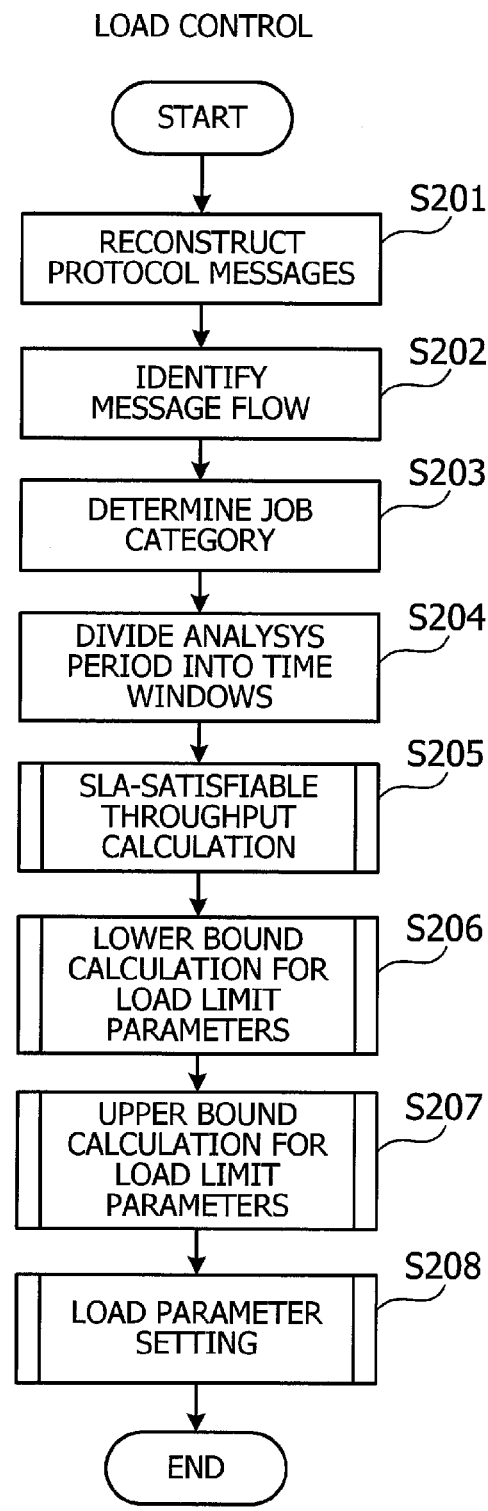
FIG. 26 is a flowchart illustrating an exemplary procedure of load control.

FIG. 26 is a flowchart illustrating an exemplary procedure of load control. Each step of FIG. 26 will now be described below in the order of step numbers.

(Step S201) The message parsing unit 121 reconstructs messages on the basis of IP packets contained in a given data file, and stores the reconstructed messages in the message data storage unit 122 in their temporal order.

(Step S202) The message flow detection unit 132 investigates messages stored in the message data storage unit 122 to detect message flows. A message flow is a series of messages transmitted and received in the multi-tier system as a consequence of a single transaction request. For details of this step, see the previous description of message flow detection at step S122 of FIG. 7.

(Step S203) The message flow detection unit 132 determines the job category of processes that the server of each tier executes in response to request messages in a detected message flow. For details of this step, see the previous description of job category determination at step S123 of FIG. 7.

It is noted here that steps S201 to S203 may use the outcome of the performance analysis at step S121 to S123, instead of newly executing steps S201 to S203 for the present load control process. When this is the case, the following steps S205 to S207 use message flow datasets produced and stored in the message flow data storage unit 133 at steps S121 to S123.

(Step S204) The data compilation unit 141 divides a given analysis period with a sufficiently fine granularity. For details of this step, see the previous description of time window division at step S131 of FIG. 14.

(Step S205) The data compilation unit 141 calculates an SLA-satisfiable throughput in each time window. Details of this step S205 will be described later with reference to FIG. 27.

(Step S206) The load control unit 145 calculates a lower bound of load limit parameters. Details of this step S205 will be described later with reference to FIG. 31.

(Step S207) The load control unit 145 calculates an upper bound of load limit parameters. Details of this step S205 will be described later with reference to FIG. 34. The calculated lower and upper bounds of load limit parameters define an allowable load range of servers in the bottleneck tier.

(Step S208) The load control unit 145 configures servers in the bottleneck tier or its upper tier with appropriate load limit parameters, such that the server load in the bottleneck tier falls within the allowable load range. Specifically, this step assigns a maximum load, or the maximum number of jobs that the server can execute in parallel. Details will be described later with reference to FIG. 34.

The above steps perform a load analysis. The following sections (b1) to (b4) will describe in greater detail the load control process of steps S205 to S208, respectively.

(b1) SLA-Satisfiable Throughput Calculation

Figure 27:
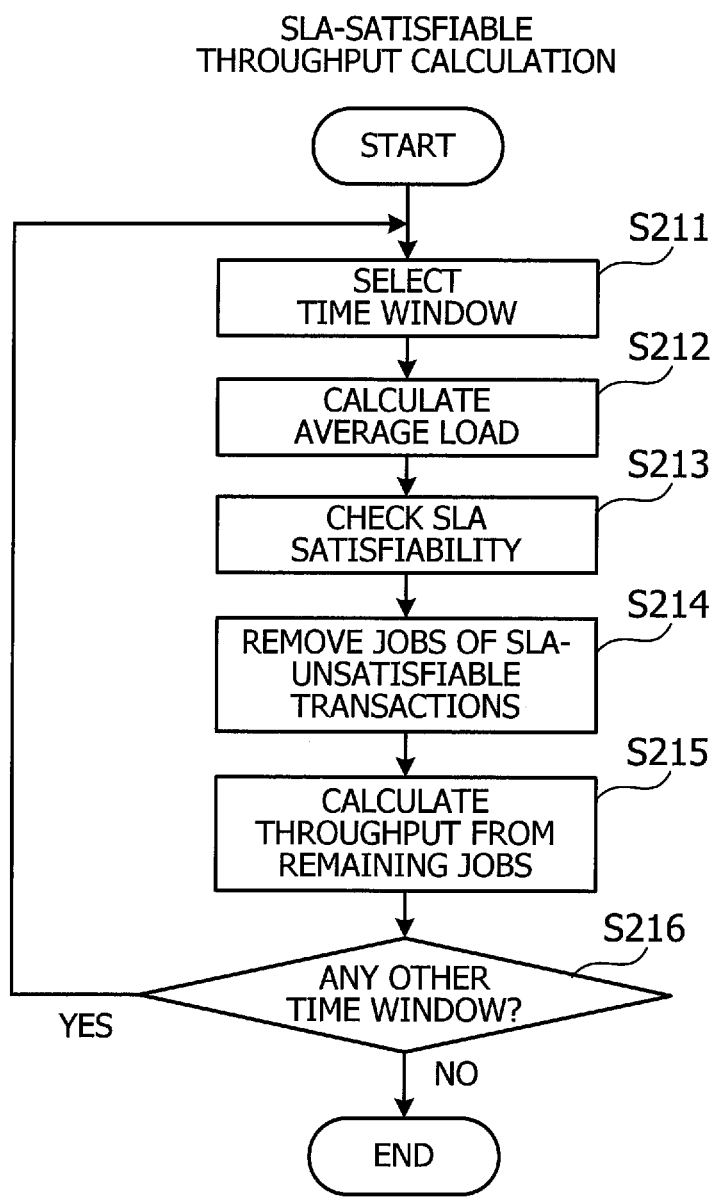
FIG. 27 is a flowchart illustrating an exemplary procedure of SLA-satisfiable throughput calculation.

This section describes how an SLA-satisfiable throughput is calculated. FIG. 27 is a flowchart illustrating an exemplary procedure of SLA-satisfiable throughput calculation. Each step of FIG. 27 will now be described below in the order of step numbers.

(Step S211) The data compilation unit 141 selects a time window that has not been subjected to the calculation.

(Step S212) The data compilation unit 141 calculates an average load of the bottleneck tier in the selected time window. For example, the data compilation unit 141 first calculates a sum of processing times in the selected time window, for the jobs executed in the tier under analysis. The data compilation unit 141 then divides the sum by the time window length to obtain a load value in the time window. This calculation is expressed as follows.

[Load]=[Total job processing time in time window]/ [Time window length]

The data compilation unit 141 stores the calculated load value in a time window data storage unit 142, for example.

(Step S213) The data compilation unit 141 checks the SLA satisfiability of a transaction that includes jobs executed by the bottleneck tier in the selected time window. For example, the data compilation unit 141 first extracts jobs executed by the bottleneck tier in the selected time window, by consulting each relevant message flow dataset stored in the message flow data storage unit 133. Then based on the message flow datasets involving the extracted jobs, the data compilation unit 141 calculates a response time (from HTTP request to HTTP response) of a transaction. If the response time is equal to or shorter than the given SLA, the data compilation unit 141 determines that the transaction satisfies the SLA. If the calculated response time exceeds the given SLA, the data compilation unit 141 determines that the transaction fails to satisfy the SLA.

(Step S214) The data compilation unit 141 erases the record of jobs derived from SLA-unsatisfiable transactions in the bottleneck tier. For example, the data compilation unit 141 deletes requests and responses of jobs in the bottleneck tier from message flow datasets pertinent to the SLA-unsatisfiable transactions, among those stored in the message flow data storage unit 133. It is noted here that the load control process uses no other job data than the bottleneck tier's. For this reason, the data compilation unit 141 is allowed to remove message flow datasets corresponding to SLA-unsatisfiable transactions from those in the message flow data storage unit 133.

(Step S215) The data compilation unit 141 calculates a throughput (SLA-satisfiable throughput in this context) by using the remaining jobs in the selected time window. For example, the data compilation unit 141 examines each message flow dataset retrieved from the message flow data storage unit 133 to extract the remaining jobs executed by the bottleneck tier in the selected time window. The data compilation unit 141 then calculates an SLA-satisfiable throughput on the basis of processing times of the jobs that belong to that time window. During this course, the data compilation unit 141 applies appropriate weighting coefficients to those jobs, taking into consideration the difference between job categories, thereby calculating a normalized SLA-satisfiable throughput. Information necessary for this normalization is previously stored in a normalized throughput value storage unit 143.

(Step S216) The data compilation unit 141 determines whether there are any other time windows that have not been subjected to the above processing of steps S211 to S215. When a pending time window is found, the data compilation unit 141 returns to step S211 to continue the process. When there is no pending process, the data compilation unit 141 exits from this process of SLA-satisfiable throughput calculation.

As can be seen from the above flowchart, the calculation process first investigates the SLA satisfiability of jobs in each message flow. That is, the data compilation unit 141 examines every log record of jobs executed by the bottleneck tier in each time window to check the response times of HTTP requests that produced those jobs. The data compilation unit 141 then compares the response time of each relevant HTTP request with a previously specified SLA (or a similar reference value). If the response time does not satisfy the SLA, the data compilation unit 141 neglects the jobs invoked by that SLA-unsatisfiable HTTP request when calculating SLA-satisfiable throughput of the bottleneck tier.

Figure 28:
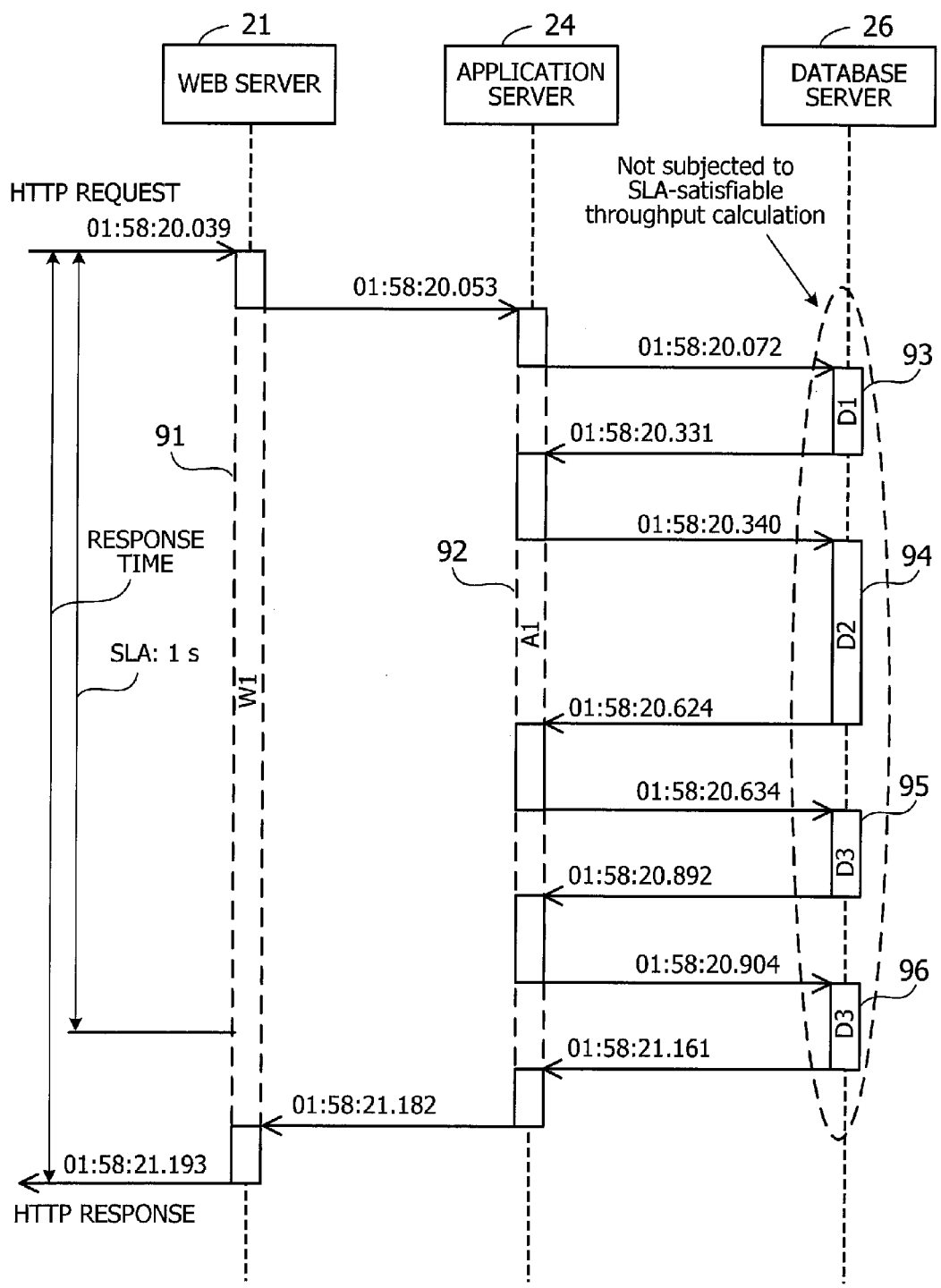
FIG. 28 illustrates an example of jobs excluded from SLA-satisfiable throughput calculation.

FIG. 28 illustrates an example of jobs excluded from SLA-satisfiable throughput calculation. Specifically, FIG. 28 illustrates a message flow of a transaction that is similar to the one discussed in FIG. 12 but affected by a bottleneck in the database tier.

The transaction seen in FIG. 28 invokes a job 91 on the web server 21 in response to an HTTP request from a terminal (not illustrated). During the course of this job 91, the web server 21 sends an IIOP request to the application server 24. In response to this IIOP request, the receiving application server 24 starts executing a job 92. During the course of this job 92, the application server 24 sends four DB requests to the database server 26. The database server 26 executes four jobs 93, 94, 95, and 96 corresponding to the respective DB requests.

When the database tier falls into a bottleneck condition, the database server 26 takes longer times to finish its jobs. FIG. 28 indicates such longer execution periods of jobs 93, 94, 95, and 96 on the database server 26, relative to the transaction seen in FIG. 12. This results in an elongated time from HTTP request to HTTP response, i.e., a longer response time of the web server 21.

Suppose now that the SLA specifies an acceptable response time of one second. Since the response time of the exemplary transaction of FIG. 28 is longer than one second, none of the jobs 93, 94, 95, and 96 on the database server 26 will be taken into consideration in the calculation of SLA-satisfiable throughput of their pertinent time window. In other words, the SLA-satisfiable throughput is calculated as if those jobs 93, 94, 95, and 96 were not executed by the database server 26. The next section describes a more specific example of SLA-satisfiable throughput calculation.

The calculation of SLA-satisfiable throughput is conducted on the basis of processing times of remaining jobs that are considered as being SLA-satisfiable. Referring back to FIG. 16, an example SLA-satisfiable throughput calculation will now be discussed below. As discussed in FIG. 16, the execution of jobs 61 to 66 involves interactions between tiers, and when a first tier delegates its job to a second tier, the first tier waits for a response from the second tier. Such response waiting times are excluded from the execution period in the first tier, and the remaining period is solely subjected to the calculation of SLA-satisfiable throughput.

Referring first to the tier of a web server 21 in FIG. 16, the illustrated job 61 has two separate execution periods 61a and 61b, of which only the first execution period 61a belongs to time window #1. The second execution period 61b, on the other hand, belongs to time window #2. The first execution period 61a has a length (processing time) of 14 ms, while the second execution period 61b has a length of 11 ms. Thus the total processing time of this job 61 is 25 ms. The job 61 falls in job category W1, whose normalized per-job throughput value is 1.00 as seen in the normalized throughput value table 143a of FIG. 20. Accordingly, this score 1.00 of normalized throughput is allocated among time window #1 and time window #2 in proportion to the ratio of their processing times. More specifically, time window #1 earns a score of 0.56 (=1.00×14/25), while time window #2 earns a score of 0.44 (=1.00×11/25). Those two scores are added to the respective SLA-satisfiable throughput values of time windows #1 and #2 for the tier of web servers 21, 22, and 23.

Referring next to the tier of application servers 24 and 25, the job 62 is executed in intermittent execution periods 62a, 62b, 62c, 62d, and 62e. Of those five periods, only the first two execution periods 62a and 62b belong to time window #1, while the remaining three execution periods 62c, 62d, and 62e belong to time window #2. The first execution period 62a is 19 ms, the second execution period 62b is 9 ms, the third execution period 62c is 10 ms, the fourth execution period 62d is 12 ms, and the fifth execution period 62e is 21 ms in length. Thus the total processing time of this job 62 amounts to ms. The job 62 falls in job category A1, whose normalized per-job throughput value is 1.00 as seen in the normalized throughput value table 143a of FIG. 20. Accordingly, this score 1.00 of normalized throughput is allocated among time window #1 and time window #2 in proportion to the ratio of their processing times. More specifically, time window #1 earns a score of 0.394 (=1.00×(19+9)/71), while time window #2 earns a score of 0.606 (=1.00×(10+12+21)/71). Those two scores are added to the respective SLA-satisfiable throughput values of time windows #1 and #2 for the tier of application servers 24 and 25.

Referring lastly to the tier of a database server 26, the first job 63 entirely belongs to time window #1 and is 9 ms in length. The job 63 falls in job category D1, whose normalized per-job throughput value is 1.00 as seen in the normalized throughput value table 143a of FIG. 20. Accordingly, this score 1.00 is added to the SLA-satisfiable throughput value of time window #1 for the tier of the database server 26.

The second job 64 is executed across two time windows in the example of FIG. 16. The leading execution period 64a belongs to time window #1, and the trailing execution period 64b belongs to time window #2. The leading execution period 64a has a length (processing time) of 10 ms, while the trailing execution period 64b has a length of 24 ms. Thus the total processing time of this job 64 amounts to 34 ms. The job 64 falls in job category D2, whose normalized per-job throughput value is 3.72 as seen in the normalized throughput value table 143a of FIG. 20. Accordingly, this score 3.72 of normalized throughput is distributed to time window #1 and time window #2 in proportion to the ratio of their processing times. More specifically, time window #1 earns a score of 1.09 (=3.72×10/34), while time window #2 earns a score of 2.63 (=3.72×24/34). Those two scores are added to the respective SLA-satisfiable throughput values of time windows #1 and #2 for the tier of the database server 26.

In the example of FIG. 16, the third job 65 entirely belongs to time window #2 and is 8 ms in length. The job 65 falls in job category D3, whose normalized per-job throughput value is 0.796 as seen in the normalized throughput value table 143a of FIG. 20. Accordingly, this score 0.796 is added to the SLA-satisfiable throughput value of time window #2 for the tier of the database server 26. Likewise, the fourth job 66 entirely belongs to time window #2 and is 7 ms in length in the example of FIG. 16. The job 66 falls in job category D3, whose normalized per-job throughput value is 0.796 as seen in the normalized throughput value table 143a of FIG. 20. Accordingly, this score 0.796 is added to the SLA-satisfiable throughput value of time window #2 for the tier of the database server 26.

From the above scores in the tier of the database server 26, the throughput in time window #1 is calculated to be 2.09, which is the total score of the whole job 63 and leading execution period 64a. The SLA-satisfiable throughput in time window #2 is calculated to be 4.222, which is the total score of the trailing execution period 64b and whole jobs 65 and 66.

When a plurality of transactions are running concurrently in multiple tiers as illustrated in FIG. 17, the scores of jobs relating those transaction are added up for each time window, and for each different tier. The resulting total scores are output as the SLA-satisfiable throughput value of each time window and each tier.

The method used to calculate SLA-satisfiable throughput may also be applied to the step of throughput calculation in the foregoing performance analysis (step S142 in FIG. 18). The latter calculation, however, takes all jobs into consideration, no matter whether their corresponding transactions satisfy the SLA. This is unlike the load control process, in which the SLA-satisfiable throughput is calculated based on the jobs derived only from SLA-satisfiable transactions. The performance analysis is also different from the load analysis in that the former calculates throughput of every tier whereas the latter calculates SLA-satisfiable throughput of only a bottleneck tier.

Figure 29:
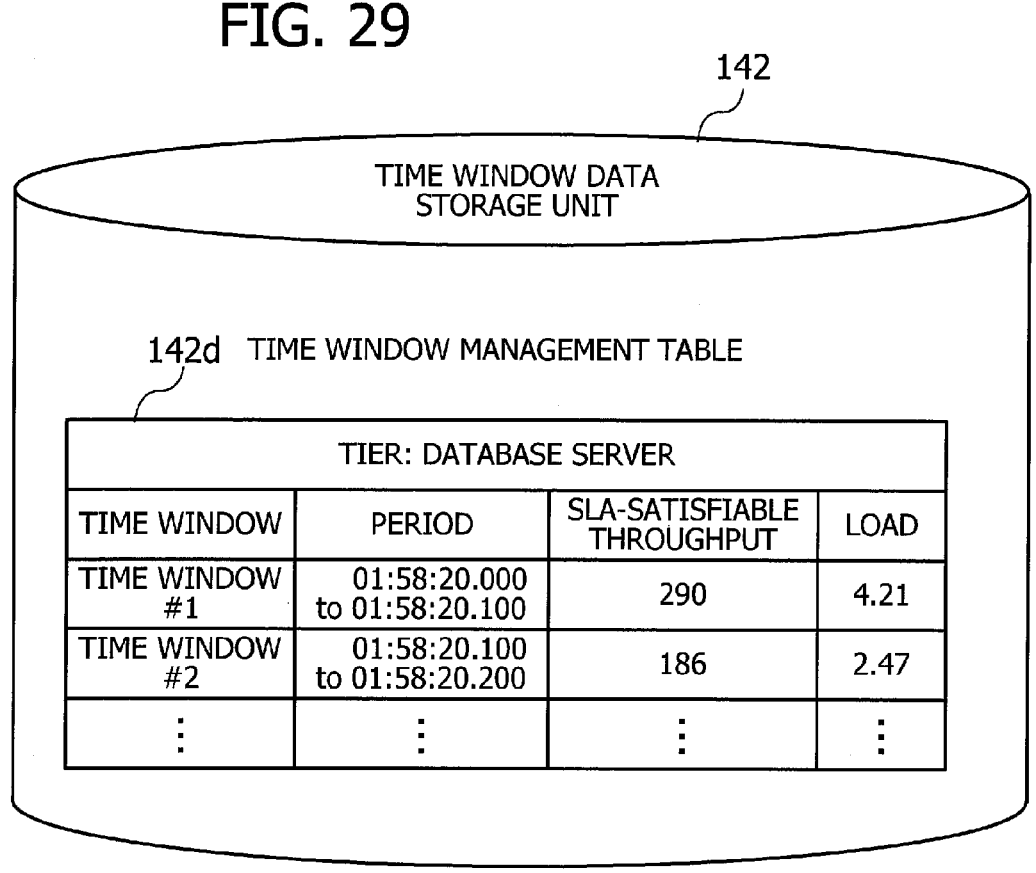
FIG. 29 illustrates an exemplary data structure of a time window data storage unit at the time of load analysis.

FIG. 29 illustrates an exemplary data structure of a time window data storage unit at the time of load analysis. The illustrated time window data storage unit 142 stores a time window management table 142d at the time of load analysis. This example of FIG. 29 assumes that the database tier is in a bottleneck condition. The illustrated time window management table 142d thus correspond to the tier accommodating a database server 26.

The time window management table 142d has four data fields titled "Time Window," "Period," "SLA-satisfiable Throughput," and "Load." The time window field contains the name of a time window. The period field provides details of the period of that time window. The SLA-satisfiable throughput and load fields respectively indicate the values of SLA-satisfiable throughput and load that are calculated for that time window.

(b2) Calculation of Lower Bound of Load Limit Parameters

This section provides more details about the calculation of lower bound of load limit parameters. The temporal variations of load and SLA-satisfiable throughput values of the bottleneck tier may be represented in the graphs of FIGS. 21 and 22, respectively. In both graphs of FIGS. 21 and 22, each tick on the horizontal axis indicates a 100-ms time window. A scatter plot of FIG. 30 is obtained by mapping those load values and SLA-satisfiable throughput values in the two graphs onto the X-Y coordinates.

Figure 30:
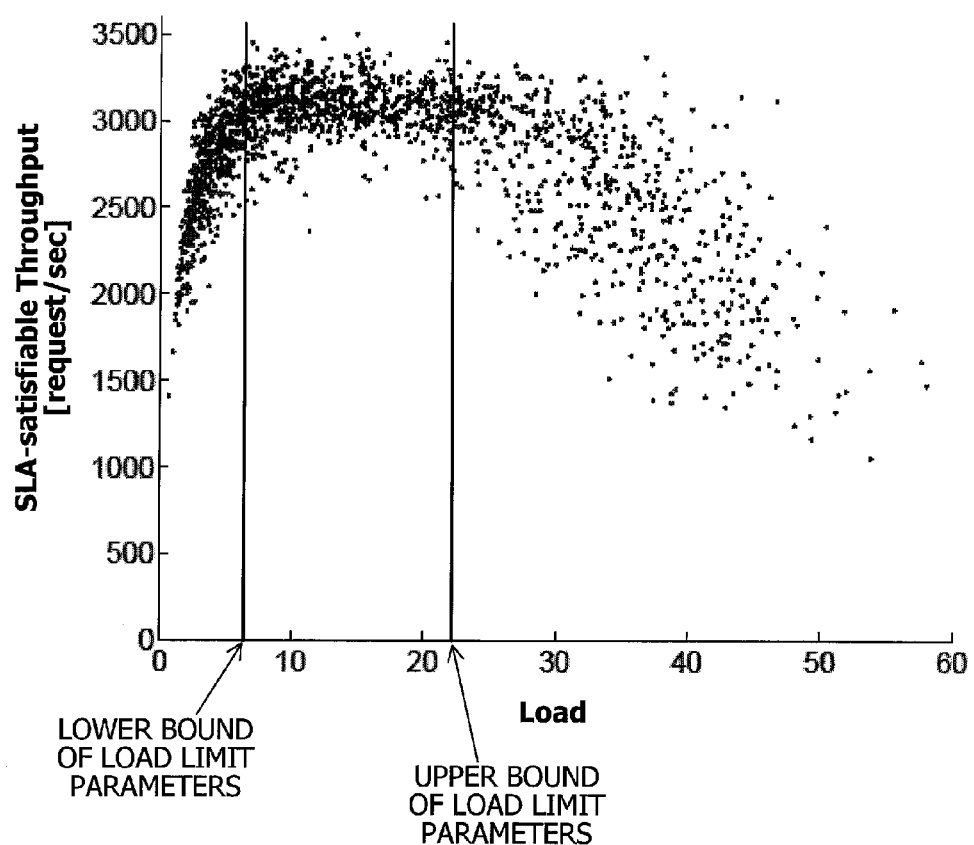
FIG. 30 is a scatter plot illustrating exemplary relationships between load and SLA-satisfiable throughput.

FIG. 30 is a scatter plot illustrating exemplary relationships between load and SLA-satisfiable throughput. As can be seen from this FIG. 30, the SLA-satisfiable throughput increases with the load in the beginning, but stops increasing when the load reaches a certain point. This point may be determined by using, for example, the same technique used to obtain a saturation point in the performance analysis. In other words, the foregoing saturation point serves as the lower bound of load limit parameters.

The foregoing saturation point calculation (FIG. 24) for performance analysis finds a saturation point by calculating an increase rate (slope) of the throughput with respect to the load and determining whether the calculated slope is smaller than a threshold. The embodiments discussed herein is not limited by that specific method. For example, various statistical methods may be used to obtain a more accurate saturation point. The next section will present an example of an alternative method based on statistics.

This alternative method takes advantage of a particular relationship between load and SLA-satisfiable throughput. That is, the SLA-satisfiable throughput and load in a tier are nearly directly proportional when the load is relatively low, and the distribution of the slope has a small statistical dispersion in that low-load range. However, as the tier's performance approaches its upper limit (bottleneck), the proportional relationship between load and SLA-satisfiable throughput is lost abruptly, and the slope begins to exhibit increased dispersions. This increase in the dispersion leads to a wider statistical confidence interval of the slope. The alternative method uses this nature to calculate a saturation point where a change is seen in the correlation between load and SLA-satisfiable throughput, without being affected by small variations of source data.

For example, the load control unit 145 subdivides the range between minimum and maximum load values into a predetermined number (e.g., 100) of subranges, or into a variable number of subranges with a fixed size (e.g., 0.1). In the case of FIG. 30, the range of 0 to 50 is divided into 100 subranges with a step size of 0.5. Load values over 50 are neglected for simplicity of explanation. Then, for each ith load subrange ($1 \leq i \leq 100$), the load control unit 145 calculates an average load and an average SLA-satisfiable throughput from all data pairs (load and SLA-satisfiable throughput values) belonging to that load subrange. For example, the load control unit 145 calculates a slope $\delta_i$ between two adjacent load subranges, based on the variations of average load and average SLA-satisfiable throughput. Specifically, the load control unit 145 uses formula (2) to perform this calculation, as is done at step S155 of FIG. 24 for performance analysis.

$$\delta_i = \begin{cases} \overline{tp_i}/\overline{ld_i}: & i = 1 \\ \dfrac{\overline{tp_i} - \overline{tp_{i-1}}}{\overline{ld_i} - \overline{ld_{i-1}}}: & 1 < i \le 100 \end{cases} \quad (2)$$

$\overline{ld_i}$: average load of the ith load subrange $\overline{tp_i}$: average SLA-satisfiable throughput of the ith load subrange Then, by examining the calculated slopes in N subranges (N is an integer in the range of $1 \le N \le 100$) selected from the lowermost one, the load control unit 145 calculates a statistic confidence interval expressed as follows:

$$\frac{1}{n} \times \sum_{i=1}^{n} \delta_i \pm 1.96 \times \sqrt{\frac{1}{n-1} \times \sum_{i=1}^{n} \left(\delta_i - \frac{1}{n}\sum_{j=1}^{n}\delta_j\right)^2} \quad (3)$$

The value "1.96" is a constant for the 95% confidence level.

The load control unit 145 seeks the largest N at which the lower end of the confidence interval is not below a predetermined threshold. The saturation point is then set as the load value at that point. The lower end of a confidence interval is obtained by taking the symbol "±" as a minus sign "−" in the above formula (3). The second embodiment uses $0.2\delta_1$ as the threshold. In the case, for example, the lower end of the confidence interval does not fall below the threshold until N reaches ten, the saturation point is set to 4.5 (=0.5×9). This saturation point serves as the lower bound of load limit parameters. A more specific procedure of the lower bound calculation will be described below.

Figure 31:
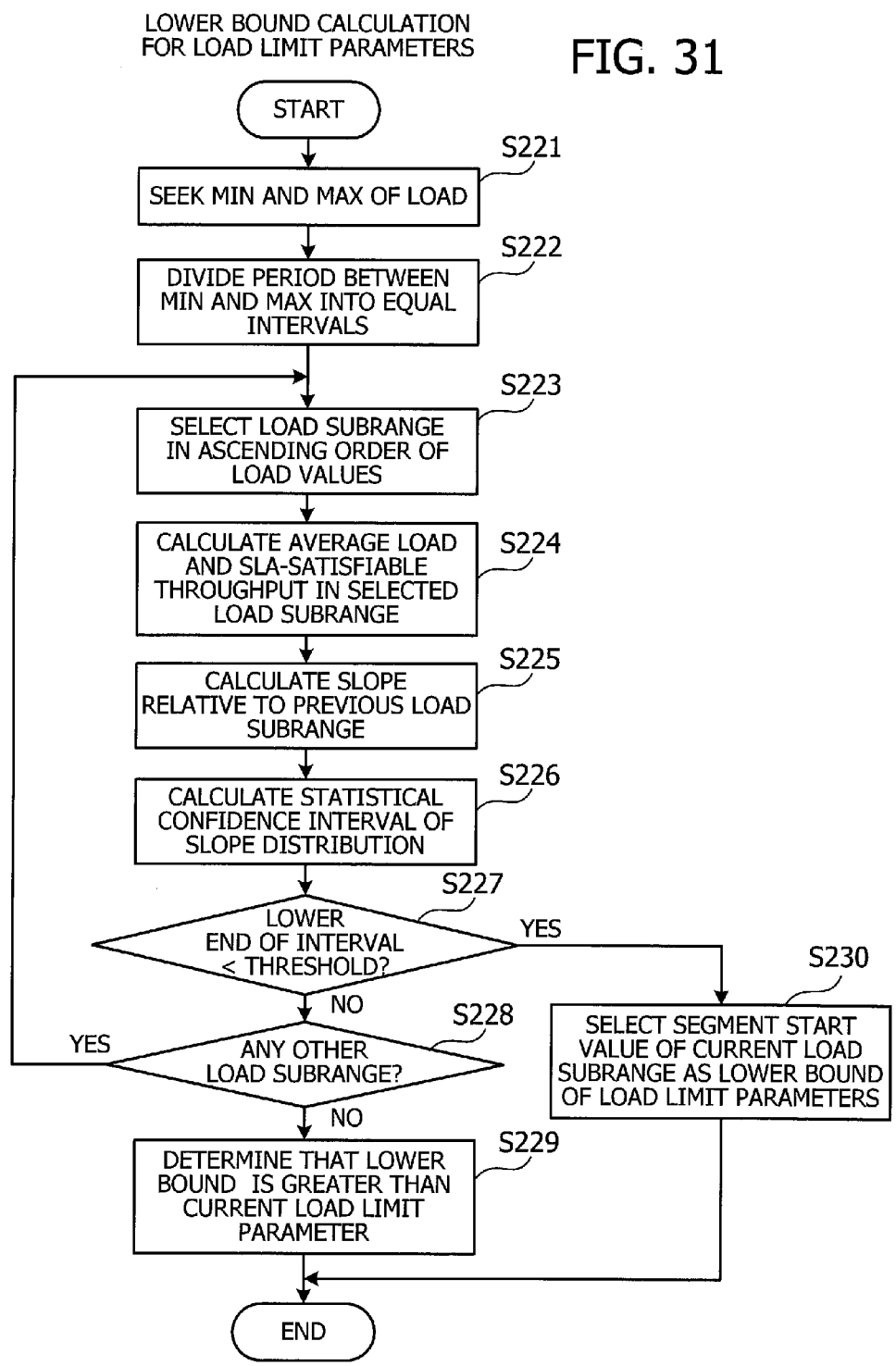
FIG. 31 is a flowchart illustrating an exemplary procedure that calculates a lower bound of load limit parameters.

FIG. 31 is a flowchart illustrating an exemplary procedure that calculates a lower bound of load limit parameters. Each step of FIG. 31 will now be described below in the order of step numbers.

(Step S221) The load control unit 145 seeks minimum and maximum load values. For example, the load control unit 145 scans the load field of the time window management table 142d stored in the time window data storage unit 142, thereby finding minimum and maximum load values.

(Step S222) The load control unit 145 subdivides the range between the extracted minimum value and maximum value into equal small intervals. The resulting small sections of load are referred to herein as "load subranges." Each load subrange is delimited by its lower and upper end values. The former is referred to herein as a "subrange start value," and the latter is referred to herein as a "subrange end value."

(Step S223) The load control unit 145 selects a load subrange in ascending order of load values.

(Step S224) The load control unit 145 extracts time windows whose load values fall in the selected load subrange and calculates an average load and an average SLA-satisfiable throughput in the extracted time windows.

(Step S225) The load control unit 145 calculates an increase rate (slope) of the average SLA-satisfiable throughput with respect to the load by comparing the currently selected load subrange with the previously selected load subrange (adjacent to the current one). Here the slope is calculated by using the foregoing formula (2).

(Step S226) The load control unit 145 calculates a statistical confidence interval of the distribution of slopes. For example, the load control unit 145 uses the foregoing formula (3) for this calculation.

(Step S227) The load control unit 145 determines whether the lower end of the confidence interval is lower than a predetermined threshold. For example, the threshold may be set to $0.2\delta_1$, where $\delta 1$ is a slope calculated according to formula (2) with i=1, i.e., by dividing the average SLA-satisfiable throughput in the first load subrange by the average load in the same. If the lower end of the confidence interval is lower than the given threshold, the load control unit 145 proceeds to step S230. If the lower end of the confidence interval is equal to or greater than the given threshold, the load control unit 145 advances to step S228.

(Step S228) The load control unit 145 determines whether there are any other load subranges that have not been subjected to the above processing of steps S223 to S226. When such a pending load subrange is found, the load control unit 145 returns to step S223. When it is found that all load subranges have been finished, the load control unit 145 proceeds to step S229.

(Step S229) This step is reached because the lower end of the confidence interval is equal to or higher than the threshold in every load subrange. Accordingly the load control unit 145 determines that the lower bound of load limit parameters is greater than the current server's load limit parameter, and thus terminates the process of lower bound calculation.

(Step S230) Since the lower end of the confidence interval is found to be smaller than the threshold, the load control unit 145 chooses the subrange start value of the currently selected load subrange as the lower bound of load limit parameters.

As can be seen from this example, the load control unit 145 scans subdivided load subranges, from the lowest to the highest, to determine whether the slope falls below a specified threshold (e.g., $0.2\delta_1$). When the slope does not fall below the threshold until the ith subrange is reached, the subrange start value of the ith load subrange is selected as the lower bound of load limit parameters.

(b3) Calculation of Upper Bound of Load Limit Parameters

This section provides more details about the calculation of an upper bound of load limit parameters. As can be seen in the graph of FIG. 30, the SLA-satisfiable throughput, once increased together with the load until the saturation point (or lower bound of load limit parameters) is reached, forms a plateau of highest throughput values. In this post-saturation region, a further increase of the load causes longer response times while the throughput stays at the plateau. A still further increase of the load makes it difficult for the transactions to satisfy SLA, and thus the SLA-satisfiable throughput begins to decline.

Using the knowledge of the above nature, the load control unit 145 identifies the plateau of SLA-satisfiable throughput (where a maximum throughput is maintained) in the post-saturation region. According to the second embodiment, the load control unit 145 is designed to perform Student's t-test (simply, t-test) in the load subranges in which the lower end of the confidence interval exceeds a given threshold. The t-test is one of the statistical techniques used to determine whether there is any statistically significant difference between two sets of values. The load control unit 145 performs t-tests to identify a range of load in which the values of SLA-satisfiable throughput stay at the same distribution in terms of the statistical significance. The upper bound of load limit parameters is then determined as the upper end of the identified range, at which a statistically significant difference in SLA-satisfiable throughput appears (i.e., the SLA-satisfiable throughput begins to decline).

Specifically, the load control unit 145 subdivides the range between minimum and maximum load values into a predetermined number (e.g., 100) of subranges, or into a variable number of subranges with a fixed size (e.g., 0.1). In the case of FIG. 30, the range of 0 to 50 is divided into 100 subranges with a step size of 0.5. Load values over 50 are neglected for simplicity of explanation. The load control unit 145 obtains an upper bound of load limit parameters by performing t-tests in a plurality of load subranges above the saturation point.

Figure 32:
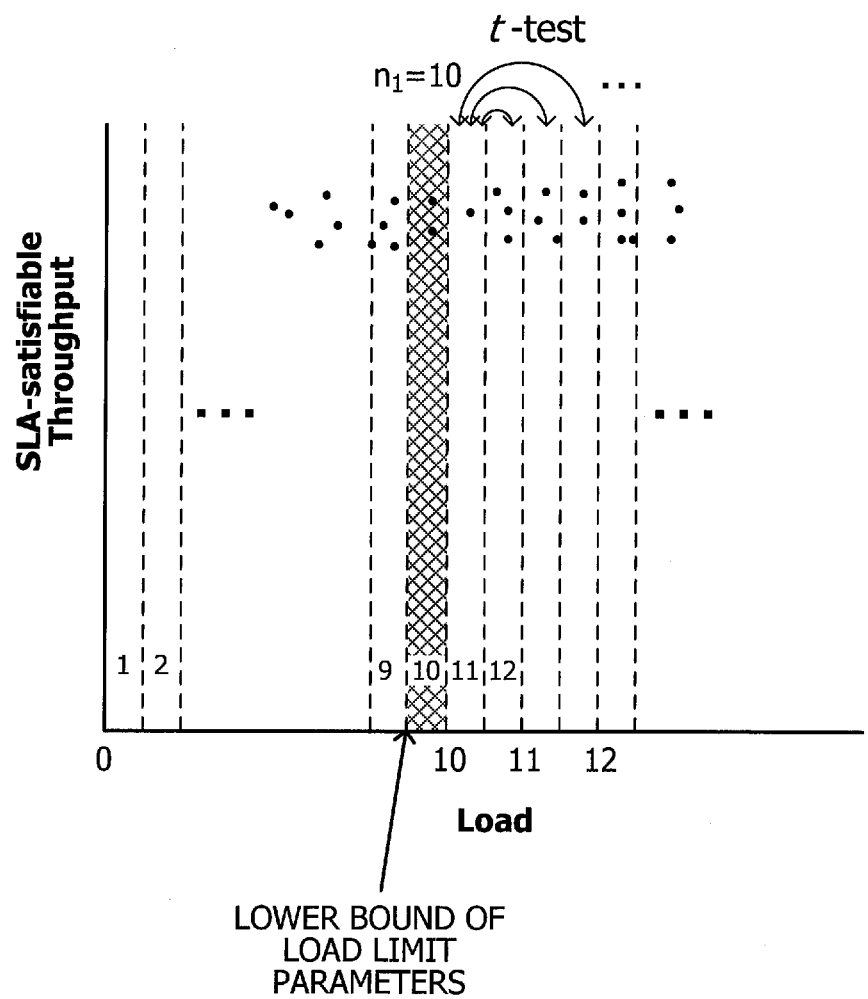
FIG. 32 depicts an example of load subranges in which t-tests are conducted as part of upper bound calculation for load limit parameters.

FIG. 32 depicts an example of load subranges in which t-tests are conducted as part of upper bound calculation for load limit parameters. The load control unit 145 selects a first load subrange from among those above the lower bound of load limit parameters. Here the number $n_1$ is an integer equal to or greater than one which is used to designate individual load subranges in ascending order of their load values. Referring to the example of FIG. 32, $n_1$ is currently set to 10. The load control unit 145 calculates a mean value and an unbiased sample variance ($Utp_1$) of SLA-satisfiable throughput, from the data of all time windows (each having specific load and SLA-satisfiable throughput values) whose load values fall in the $n_1$th load subrange. Here, an integer $m_1$ ($\geq 1$) is used to represent the number of such time windows whose load values fall in the $n_1$th load subrange.

The load control unit 145 also calculates a mean value and an unbiased sample variance ($Utp_n$) of SLA-satisfiable throughput, from the data of all time windows that belong to the nth load subrange, where n is another integer that is greater than $n_1$ ($10<n\leq 100$ in the example of FIG. 32). Yet another integer $m_n$ ($\geq 1$) is used to represent the number of time windows whose load values fall in the nth load subrange.

To compare the two sets of SLA-satisfiable throughput values in the $n_1$th and nth load subranges, the load control unit 145 calculates a test statistic $t_n$ as in the following formula (4):

$$t_n = \frac{|\overline{tp_1} - \overline{tp_n}|}{\sqrt{\frac{(m_1-1)Utp_1 + (m_n-1)Utp_n}{m_1 + m_n - 2}}\left(\frac{1}{m_1} + \frac{1}{m_n}\right)} \quad (4)$$

$\overline{tp_1}$: mean value of *SLA*-satisfiable throughput in time windows belonging to the $n_1$th load subrange $\overline{tp_n}$: mean value of *SLA*-satisfiable throughput in time windows belonging to the *n*th load subrange The load control unit 145 compares the calculated test statistic $t_n$ with a specific t value for $m_1+m_n-2$ degrees of freedom. This t-test determines whether the set of SLA-satisfiable throughput values in the nth load subrange is significantly different from that in the first ($n_1$th) load subrange. Suppose, for example, that the degree of freedom is 60. Student's t-distribution table then provides at value of 1.671 for a one-tailed test with a statistical significance (significance level) of 5%. When the above formula (4) yields 1.671 or smaller value for $t_n$, it is not possible to reject the null hypothesis that means "the set of SLA-satisfiable throughput values in the first ($n_1$th) load subrange is different from that in the nth load subrange" in the present context. The load control unit 145 thus concludes that there is no significant difference between the two sets. When, on the other hand, the calculated $t_n$ is greater than 1.671, the null hypothesis is rejected. The load control unit 145 thus concludes that there is a significant difference between the two sets. Note that a one-tailed test is used in the above process because the process intends to find a point at which the SLA-satisfiable throughput begins to decline (that is, once saturated, the throughput does not rise again).

Suppose now that the $n_2$th load subrange is where a significant difference with the test statistic $t_n$ is found in the first place. According to the second embodiment, the subrange start value of this $n_2$th load subrange is chosen as the upper bound of load limit parameters. For example, in the case of $n_2=47$ (i.e., the 47th load subrange is the first place where the test statistic $t_n$ exceeds a specified t value), the upper bound of load limit parameters will be 23 (=0.5×46).

As seen in FIG. 32, the second embodiment performs t-tests between one reference subrange and other subranges. While the reference subrange includes the lower bound of load limit parameters, the second embodiment is not limited by this specific example. A different load subrange may also serve as the reference subrange. For example, the foregoing calculation of slopes at step S255 may be continued beyond the lower bound of load limit parameters until the calculated slope indicates a substantially zero increase. The load subrange at that zero-increase point is then chosen as the reference subrange.

Figure 33:
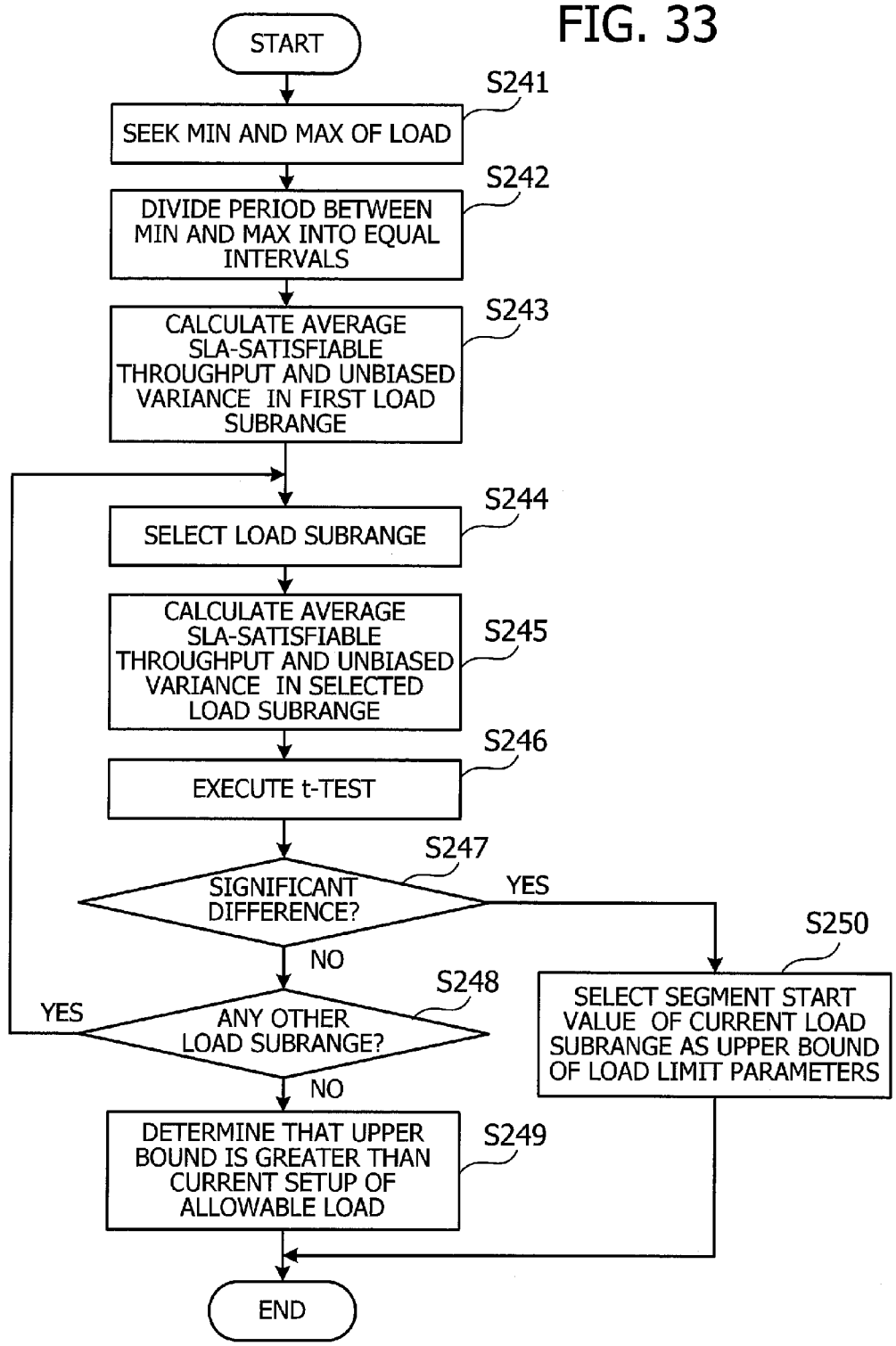
FIG. 33 is a flowchart illustrating an exemplary procedure that calculates an upper bound of load limit parameters.

FIG. 33 is a flowchart illustrating an exemplary procedure that calculates an upper bound of load limit parameters. Each step of FIG. 33 will now be described below in the order of step numbers.

(Step S241) The load control unit 145 seeks minimum and maximum load values.

(Step S242) The load control unit 145 subdivides the range between the extracted minimum value and maximum value into equal small intervals. The resulting small sections of load are referred to herein as "load subranges."

For details of steps S241 and S242, see the previous description of steps S221 and S222 in FIG. 31. It may therefore be possible to eliminate those steps S241 and S242 in the upper bound calculation and, instead, use the result of steps S221 and S222 in the previous lower bound calculation.

(Step S243) The load control unit 145 first selects a load subrange whose subrange start value matches with the lower bound of load limit parameters. This load subrange is referred to as a reference subrange. The load control unit 145 calculates a mean value and an unbiased sample variance for the time windows that belong to the reference subrange.

(Step S244) The load control unit 145 newly selects a load subrange subsequent to (or above) the first-selected load subrange. For example, the load control unit 145 selects higher load subranges one by one, beginning with a load subrange immediately next to the reference load subrange.

(Step S245) The load control unit 145 extracts time windows whose load values fall in the selected load subrange and calculates a mean value and an unbiased sample variance of SLA-satisfiable throughput values in the extracted time windows.

(Step S246) The load control unit 145 performs a t-test between the reference subrange and the selected load subrange.

(Step S247) The load control unit 145 determines whether the t-test result of step S246 indicates a significant difference between the tested subranges. If a significant difference is found, the load control unit 145 proceeds to step S250. If no significant difference is found, the load control unit 145 advances to step S248.

(Step S248) The load control unit 145 determines whether there are any pending load subranges subsequent to the first-selected load subrange. When a pending load subrange is found, the load control unit 145 returns to step S244 to continue. When no pending load subranges are found, the load control unit 145 proceeds to step S249.

(Step S249) This step is reached because no significant differences are found in any combinations of load subranges. Accordingly the load control unit 145 determines that the upper bound of load limit parameters is greater than the current setup of allowable server load, and thus terminates the process of upper bound calculation.

(Step S250) This step is reached because a significant difference is found in the currently selected load subrange. Accordingly the load control unit 145 chooses the subrange start value of that load subrange as the upper bound of appropriate load limit parameters. The load control unit 145 now terminates the process of upper bound calculation.

The above steps yield an upper bound of appropriate load limit parameters. It is noted here that the above-described load control process, including calculation of lower and upper bounds, has to handle some exceptions.

One exception is when it is unable to find a saturation point (or a lower bound of load limit parameters). In this case, the load control unit 145 determines that the allowable load parameters currently used in the bottleneck tier is too small for its servers. To determine a lower bound or an upper bound of appropriate load limit parameters, the load control unit 145 retries the load control process from scratch while giving the servers in the bottleneck tier a larger value for their allowable load parameters.

Another exception is when it is unable to find an upper bound of load limit parameters. In this case, the load control unit 145 determines that the upper bound of appropriate load limit parameters is presumably larger than the allowable load parameters currently used in the bottleneck tier. Here the load control unit 145 has two choices: (i) To retry the load control process from scratch, with a larger value for the allowable load parameter, and (ii) To select a new load limit parameter from the range between the obtained lower bound and the current parameter value.

(b4) Load Parameter Setting

This section describes how the allowable load of servers are set up and changed. Basically, this setup processing selects a value of allowable load for servers in the bottleneck tier, from among those between the lower and upper bounds of load limit parameters. For example, the load control unit 145 chooses the middle point between the upper and lower bounds as an allowable server load of the bottleneck tier.

For example, the load control unit 145 controls the allowable load of servers in the bottleneck tier by limiting the total number of concurrent requests to those servers. Specifically, the load control unit 145 may configure upper-tier servers immediately above the bottleneck tier in such a way that the total number of concurrent requests from those upper-tier servers to the bottleneck tier will not exceed the limit of allowable load of the receiving servers. The load control unit 145 may also configure the servers in the bottleneck tier in such a way that the number of concurrent jobs will not exceed the limit of their allowable load.

The setup for allowable load of servers is changed when their tier is found to be a bottleneck. The other tiers in the system may maintain the current setup of servers when their allowable load levels has been appropriate. One thing to consider here is that multi-tier systems are dynamically scalable, and their tiers can be scaled out by adding as many computers as necessary. When this is the case, the previous setup of allowable load may no longer be appropriate. If it is not sure that the allowable load of servers in a non-bottleneck tier is properly set up, the load control unit 145 performs one of the following setups, depending on whether the subject tier is above or below the bottleneck tier: (i) For servers in an upper tier, the load control unit 145 raises their total allowable load so as to be larger than that of the bottleneck tier by a specific ratio (e.g., twofold). (ii) For servers in a lower tier, the load control unit 145 changes their total allowable load to be equal to that of the bottleneck tier.

Figure 34:
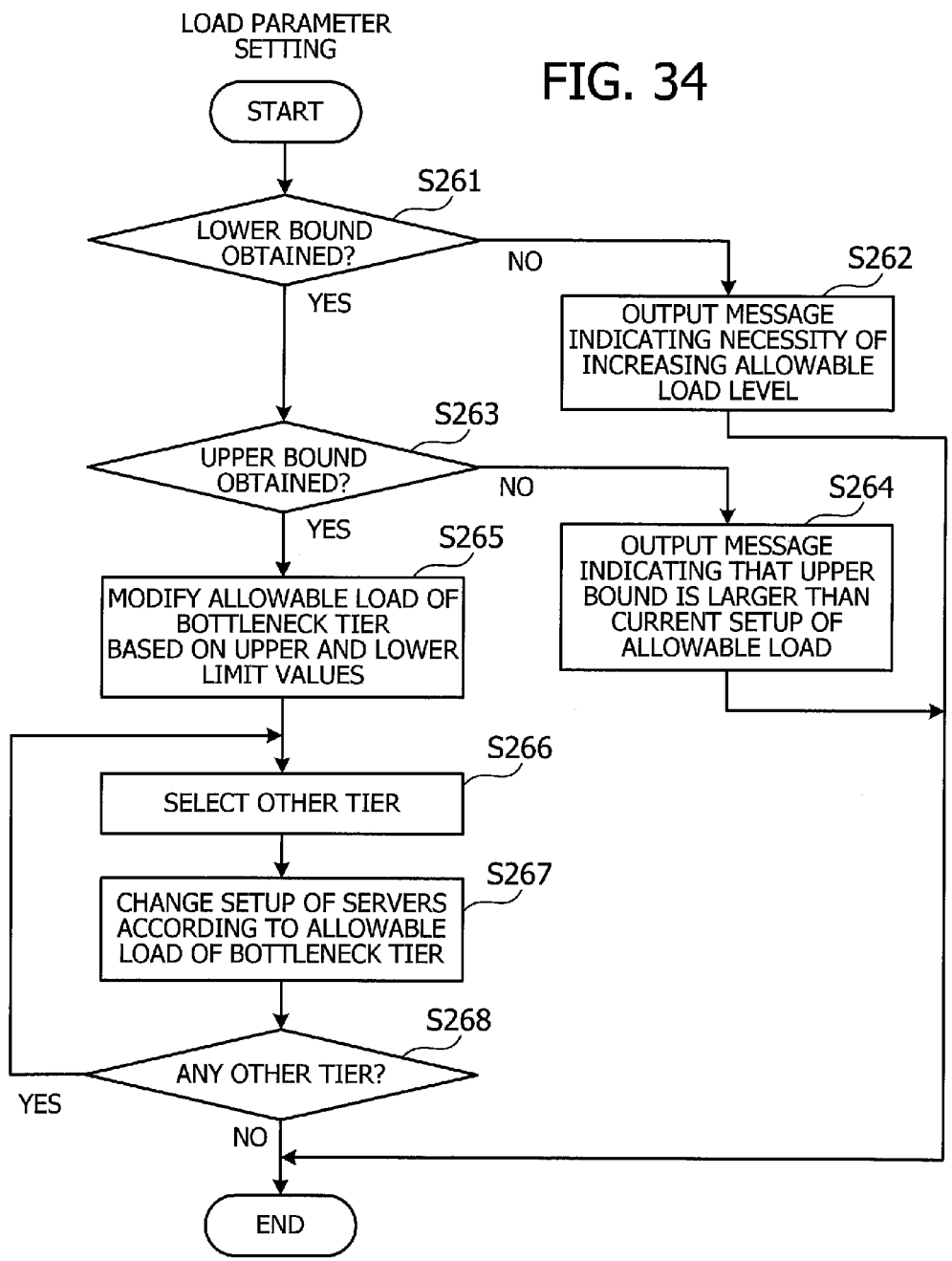
FIG. 34 is a flowchart illustrating an exemplary procedure of load parameter setting.

FIG. 34 is a flowchart illustrating an exemplary procedure of load parameter setting. Each step of FIG. 34 will now be described below in the order of step numbers.

(Step S261) The load control unit 145 determines whether a lower bound of appropriate load has been obtained. If such a lower bound has been obtained, the load control unit 145 advances to step S263. If not, the load control unit 145 proceeds to step S262.

(Step S262) The load control unit 145 produces a message indicating that the current setup of allowable load in the bottleneck tier has to be changed to increase the level. For example, the load control unit 145 outputs this message on a screen of the monitor 11. The load control unit 145 then terminates the load setting process.

(Step S263) The load control unit 145 determines whether an upper bound of appropriate load has been obtained. If such an upper bound has been obtained, the load control unit 145 advances to step S265. If not, the load control unit 145 proceeds to step S264 and, afterwards, terminates the load setting process.

(Step S264) The load control unit 145 produces a message indicating that the upper bound of load limit parameters in the bottleneck tier is larger than the current setup of allowable load. For example, the load control unit 145 outputs this message on a screen of the monitor 11. The load control unit 145 then terminates the present process of load parameter setting.

(Step S265) Based on the upper bound and lower bound of appropriate load limit parameters, the load control unit 145 modifies the allowable load of servers in the bottleneck tier. For example, the load control unit 145 reconfigures pertinent servers so that their allowable load level will be set at the middle point between the upper and lower bounds of appropriate load limit parameters.

(Step S266) The load control unit 145 selects a tier other than the bottleneck tier.

(Step S267) The load control unit 145 changes the setup of servers in the selected tier to harmonize them with the new allowable load of the bottleneck tier. For example, when the selected tier is above the bottleneck tier, the load control unit 145 assigns a larger value than the allowable load of the bottleneck tier to servers in the selected tier. The load control unit 145 also configures those upper-tier servers in such a way that the number of their concurrent requests to the bottleneck tier will not exceed the allowable load of the bottleneck tier. When the selected tier is below the bottleneck tier, the load control unit 145 adjusts its total allowable load to be equal to that of the bottleneck tier.

(Step S268) The load control unit 145 determines whether there are any other tiers that have not been subjected to the above processing of steps S266 and S267. When a pending tier is found, the load control unit 145 returns to step S266 to continue. When every tier is finished, the load control unit 145 terminates the present process of load parameter setting.

The second embodiment has been described above in various aspects. The proposed processing functions are used in a multi-tier system to determine the minimum and maximum values of load limit parameters for a bottleneck tier. This feature of the second embodiment makes it possible to set up the system with appropriate load limit parameters and thus provides stability of the system in maximum throughput conditions, as well as ensuring specified response times of SLA.

The second embodiment enables the system to operate with some spare capacity for handling an increased load as long as the load is within a reasonable range. While there are an enormous number of combinations of load limit parameters, the second embodiment provides an efficient way to obtain an appropriate combination, without the need for trying every possible combination in different tiers one by one. Based on the rage of such allowable load limit parameters, the second embodiment selects load limit parameters for servers constituting the multi-tier system to properly control the server load in the bottleneck tier.

(C) Other Embodiments and Variations

The above-described second embodiment is designed to isolate a bottleneck tier on the basis of the ratio of time windows whose load values are equal to or smaller than a saturation point of the load. The second embodiment may be modified to use other methods to isolate a bottleneck tier.

As noted earlier, the processing functions discussed in the preceding sections are implemented by using one or more processors or CPUs. The same processing functions may also be implemented wholly or partly by using a digital signal processor (DSP), application-specific integrated circuit (ASIC), programmable logic device (PLD), or other electronic circuit.

(D) Conclusion

Several embodiments and their variations have been disclosed above. According to an aspect of those embodiments, the proposed techniques make it possible to determine an upper bound of load limit parameters to maintain the response time in an acceptable range.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A computer-readable non-transitory recording medium storing therein an analyzing program, that causes a computer to execute a process comprising:
    determining whether a response time of each transaction falls within an acceptable time range that is specified previously, based on transaction data that records a plurality of transactions executed in a coordinated way by a plurality of servers in a multi-tier system during a given analysis period, the transaction data indicating execution periods of processes executed by the servers in each tier of the multi-tier system;
    dividing the given analysis period into a plurality of time windows and calculating, for each window, a load of the processes executed in parallel by the servers in a specified tier, based on the transaction data of the individual transactions;
    calculating, based on the transaction data of the transactions whose response times are determined to fall within the acceptable time range, a total throughput in each time window by adding up throughputs of the processes executed, as part of the transactions whose response times are determined to fall within the acceptable time range, by the servers in the specified tier during said each time window, a throughput of a process executed in a time window being calculated as a ratio of a portion of the process that is executed in the time window to the entire process invoked in response to a processing request therefor, the ratio being weighted according to a processing time, in low workload conditions, of a process category to which the executed process belongs; and
    determining, based on the calculated load and total throughput of each time window, a first load value as a first threshold at which the total throughput begins to decrease in spite of an increase of the load.

2. The computer-readable non-transitory recording medium according to claim 1, the procedure further comprising:
    determining, based on the calculated load and total throughput of each time window, a second load value as a second threshold at which a ratio of an increase of the total throughput to an increase of the load begins to fall below a specified value; and
    configuring the servers in the specified tier with an allowable limit of concurrent processes, such that the load of the servers falls within a range delimited by the first threshold and second threshold even when the servers are loaded with as many concurrent processes as the allowable limit.

3. The computer-readable non-transitory recording medium according to claim 1, wherein the determining of the first threshold comprises:
    obtaining a minimum value and a maximum value among the loads in the time windows, and dividing a range between the minimum value and the maximum value into a plurality of subranges,
    calculating an average throughput in each subrange by averaging the total throughputs in the time windows whose respective loads fall within said each subrange, and
    comparing the average throughputs between the plurality of subranges to determine at which load value the total throughput begins to decrease in spite of an increase of the load.

4. The computer-readable non-transitory recording medium according to claim 3, wherein:
    the procedure further comprises determining, based on the calculated load and total throughput of each time window, a second load value as a second threshold at which a ratio of an increase of the total throughput to an increase of the load begins to fall below a specified value; and
    the determining of the first threshold further comprises:
    selecting one of the subranges which contains the first load value determined as the second threshold,
    detecting one of the subranges whose average throughput has a statistically significant difference from the average throughput in the selected subrange, and
    determining the first threshold from among load values in the detected subrange.

5. The computer-readable non-transitory recording medium according to claim 4, wherein the detecting of one of the subranges uses t-tests to determine whether there is a statistically significant difference in the average throughputs.

6. The computer-readable non-transitory recording medium according to claim 1, wherein the specified tier in the multi-tier system is a tier accommodating one or more servers that have reached performance limit thereof.

7. An analyzing method executed by a computer, the analyzing method comprising:

dividing the given analysis period into a plurality of time windows and calculating, for each window, a load of the processes executed in parallel by the servers in a specified tier, based on the transaction data of the individual transactions;

determining whether a response time of each transaction falls within an acceptable time range that is specified previously, based on transaction data that records a plurality of transactions executed in a coordinated way by a plurality of servers in a multi-tier system during a given analysis period, the transaction data indicating execution periods of processes executed by the servers in each tier of the multi-tier system;

calculating, based on the transaction data of the transactions whose response times are determined to fall within the acceptable time range, a total throughput in each time window by adding up throughputs of the processes executed, as part of the transactions whose response times are determined to fall within the acceptable time range, by the servers in the specified tier during said each time window, a throughput of a process executed in a time window being calculated as a ratio of a portion of the process that is executed in the time window to the entire process invoked in response to a processing request therefor, the ratio being weighted according to a processing time, in low workload conditions, of a process category to which the executed process belongs; and determining, based on the calculated load and total throughput of each time window, a first load value as a first threshold at which the total throughput begins to decrease in spite of an increase of the load.

8. An information processing apparatus, comprising:

a memory configured to store transaction data that records a plurality of transactions executed in a coordinated way by a plurality of servers in a multi-tier system during a given analysis period, the transaction data indicating execution periods of processes executed by the servers in each tier of the multi-tier system; and a processor configured to perform a procedure including:

determining whether a response time of each transaction falls within an acceptable time range that is specified previously, based on the transaction data dividing the given analysis period into a plurality of time windows and calculating, for each window, a load of the processes executed in parallel by the servers in a specified tier, based on the transaction data of the individual transactions;

calculating, based on the transaction data of the transactions whose response times are determined to fall within the acceptable time range, a total throughput in each time window by adding up throughputs of the processes executed, as part of the transactions whose response times are determined to fall within the acceptable time range, by the servers in the specified tier during said each time window, a throughput of a process executed in a time window being calculated as a ratio of a portion of the process that is executed in the time window to the entire process invoked in response to a processing request therefor, the ratio being weighted according to a processing time, in low workload conditions, of a process category to which the executed process belongs; and determining, based on the calculated load and total throughput of each time window, a first load value as a first threshold at which the total throughput begins to decrease in spite of an increase of the load.

* * * * *